(12) United States Patent
Takagi et al.

(10) Patent No.: US 11,019,928 B2
(45) Date of Patent: Jun. 1, 2021

(54) ARMREST AND CHAIR

(71) Applicant: OKAMURA CORPORATION, Yokohama (JP)

(72) Inventors: Yuuichirou Takagi, Yokohama (JP); Hiroshi Masunaga, Yokohama (JP); Ryo Igarashi, Yokohama (JP); Syouichi Izawa, Yokohama (JP)

(73) Assignee: OKAMURA CORPORATION, Yokohama (JP)

( * ) Notice: Subject to any disclaimer, the term of this patent is extended or adjusted under 35 U.S.C. 154(b) by 94 days.

(21) Appl. No.: 16/307,836

(22) PCT Filed: Jun. 9, 2017

(86) PCT No.: PCT/JP2017/021475
§ 371 (c)(1),
(2) Date: Dec. 6, 2018

(87) PCT Pub. No.: WO2017/213253
PCT Pub. Date: Dec. 14, 2017

(65) Prior Publication Data
US 2019/0307251 A1    Oct. 10, 2019

(30) Foreign Application Priority Data

Jun. 10, 2016 (JP) ................................. 2016-116566
Jun. 10, 2016 (JP) ................................. 2016-116568
Jun. 10, 2016 (JP) .............................. JP2016-116567

(51) Int. Cl.
*A47C 1/03*    (2006.01)
*A47C 7/54*    (2006.01)
(Continued)

(52) U.S. Cl.
CPC .............. *A47C 1/0307* (2018.08); *A47C 7/54* (2013.01); *A47C 7/541* (2018.08); *F16C 11/12* (2013.01); *F16H 19/0645* (2013.01)

(58) Field of Classification Search
CPC ....... A47C 1/03; A47C 1/0303; A47C 1/0305; A47C 1/0307; A47C 7/54; A47C 7/541; A47C 7/543; A47C 7/546
(Continued)

(56) References Cited

U.S. PATENT DOCUMENTS 5,380,065 A    1/1995  Rohrer
5,439,268 A *  8/1995  Dozsa-Farkas .......... A47C 1/03
                                                     297/411.35
(Continued)

FOREIGN PATENT DOCUMENTS

CA    2229177 A1 *  8/1999  ................ A47C 1/03
CA    2472070 A1 *  8/2003  .......... A47C 1/03255
(Continued)

OTHER PUBLICATIONS

European Search Report for Application No. 17810425.3, dated Nov. 29, 2019.
(Continued)

*Primary Examiner* — Ryan D Kwiecinski
(74) *Attorney, Agent, or Firm* — Nixon Peabody; Jeffrey Costellia

(57) ABSTRACT

An armrest according to the present invention includes a support member (8*a*, 215, 308*a*) which is a support structure, and an armrest main body (8*b*, 216, 308*b*), the armrest main body (8*b*, 216, 308*b*) includes a lower layer member (8*j*) including an operation lever (8*p*, 235, 308*p*) which is supported by a support member (8*a*, 215, 308*a*) to be movable in a forward-and-rearward direction and is operated by a seated person, and an upper layer member (8*k*) sup-
(Continued)

ported by the lower layer member (8j) to be movable in right-and-left direction, and the upper layer member (8k) covers the operation lever (8p, 235, 308p) at a base position in the right-and-left direction.

4 Claims, 35 Drawing Sheets

(51) Int. Cl.
*F16C 11/12* (2006.01)
*F16H 19/06* (2006.01)

(58) Field of Classification Search
USPC ........................................ 297/411.35, 411.37
See application file for complete search history.

(56) References Cited

U.S. PATENT DOCUMENTS

| | | | | |
|---|---|---|---|---|
| 7,201,450 | B1* | 4/2007 | Chen | A47C 1/0308 297/411.37 |
| 7,367,628 | B1* | 5/2008 | Tsai | A47C 1/03 297/411.35 |
| 7,387,341 | B1* | 6/2008 | Tsai | A47C 1/0307 297/411.35 |
| 7,815,259 | B2* | 10/2010 | Fookes | A47C 1/0305 297/411.35 |
| 8,226,171 | B2* | 7/2012 | Fang | A47C 1/03 297/411.35 |
| 8,403,417 | B2* | 3/2013 | Huang | A47C 1/0307 297/411.35 |
| 8,474,914 | B2* | 7/2013 | Chen | A47C 1/03 297/411.37 |
| 8,678,503 | B2* | 3/2014 | Machael | A47C 1/03 297/411.37 |
| 9,084,487 | B1* | 7/2015 | Su | A47C 1/0308 |
| 9,901,175 | B2* | 2/2018 | Chen | A47C 1/03 |
| 2003/0030317 | A1* | 2/2003 | Chen | A47C 1/03 297/411.35 |
| 2004/0017102 | A1 | 1/2004 | Igarashi et al. | |
| 2005/0146192 | A1* | 7/2005 | Trego | A47C 1/0307 297/411.37 |
| 2006/0250018 | A1* | 11/2006 | Tsai | A47C 1/0307 297/411.36 |
| 2011/0248542 | A1* | 10/2011 | Tsai | A47C 1/0305 297/411.36 |
| 2012/0025584 | A1* | 2/2012 | Chen | A47C 1/0307 297/411.37 |
| 2012/0175933 | A1* | 7/2012 | Tsai | B60N 2/77 297/411.36 |
| 2013/0264855 | A1* | 10/2013 | Huang | A47C 1/0305 297/411.35 |
| 2014/0183922 | A1* | 7/2014 | Cvek | A47C 1/03 297/411.36 |
| 2016/0316917 | A1* | 11/2016 | Qi | A47C 1/03 |
| 2019/0174921 | A1* | 6/2019 | Chen | A47C 1/03 |

FOREIGN PATENT DOCUMENTS

| | | | | |
|---|---|---|---|---|
| CN | 201026030 Y | | 2/2008 | |
| CN | 202361014 U | | 8/2012 | |
| JP | 2001-211962 | | 8/2001 | |
| JP | 2002051870 A | * | 2/2002 | ............ A47C 1/03 |
| JP | 2004-049692 | | 2/2004 | |
| JP | 2004-113501 | | 4/2004 | |
| JP | 2004113502 A | * | 4/2004 | ............ A47C 1/03 |
| JP | 2013-233165 | | 11/2013 | |
| JP | 2013-233166 | | 11/2013 | |
| JP | 2013248374 A | * | 12/2013 | .......... A47C 1/0308 |
| JP | 2014-083103 | | 5/2014 | |
| JP | 2014-083116 | | 5/2014 | |
| JP | 2014-083118 | | 5/2014 | |
| JP | 5605898 | | 10/2014 | |
| JP | 5653601 | | 1/2015 | |
| WO | WO-2012062032 A1 | * | 5/2012 | ............ A47C 1/03 |

OTHER PUBLICATIONS

Japan Notice of Allowance (Application No. 2016-116566) dated Oct. 29, 2019.
Japan Notice of Allowance (Application No. 2016-116567) dated Oct. 29, 2019.
International Search Report for PCT/JP2017/021475 dated Sep. 12, 2017.
Chinese Office Action issued in App. No. 201780035373.4, dated Mar. 5, 2021.

* cited by examiner

ARMREST AND CHAIR

TECHNICAL FIELD

The present invention relates to an armrest, a furniture component, and a chair.

Priority is claimed on Japanese Patent Application Nos. 2016-116566, 2016-116567, and 2016-116568, filed Jun. 10, 2016, the contents of which are incorporated herein by reference.

BACKGROUND

Patent Document 1 discloses a chair including an armrest with a movable elbow pad. In Patent Document 1, the elbow pad is installed to be slidable with respect to an elbow support portion having an operation lever, and a seated person can arbitrarily change a position of the elbow pad in a forward-and-rearward direction.

Also, in Patent Document 2, as an armrest for a chair, an armrest in which an armrest main body which receives an elbow load of a seated person is supported by a support structure therebelow to be rotatable in a substantially horizontal direction is disclosed.

Further, in the armrest described in Patent Document 2, an accommodating recessed portion is provided in an upper surface of the support structure, a bush which is a pivot portion protruding upward protrudes in the accommodating recessed portion, and a slider block on the elbow rest main body-side is rotatably installed at an upper portion of the bush. In the slider block, a base member of the armrest main body is held to be slidable in the forward-and-rearward direction. Further, a non-circular rotary block disposed in the accommodating recessed portion of the support structure is integrally rotatably connected to the slider block. The rotary block is rotatably disposed in the accommodating recessed portion of the support structure and restricts rotational displacement of the armrest main body with respect to the support structure by a side wall thereof spaced apart from a rotation center of the rotary block coming into contact with an inner wall of the accommodating recessed portion. In the case of this armrest, a fitting portion of the bush and the slider block constitutes a rotary mechanism, and the side wall of the rotary block and the inner wall of the accommodating recessed portion constitute a rotation restricting mechanism.

Furthermore, Patent Document 3 discloses an armrest having an operation member which is linked to a functional portion of a chair main body via an operation cable in the armrest of a chair. This armrest includes a support structure which is installed on the chair main body to form an upward extending portion, and an armrest main body which is supported by an upper end of the upward extending portion, extends in forward and rearward and is movable in a horizontal direction. Additionally, the operation cable is disposed to extend once rearward and then to extend forward again, and thereby a curved deflection portion is formed in the operation cable such that the armrest main body can be moved with respect to the support structure in the horizontal direction even when the operation cable is arranged in the armrest main body. Even when the armrest main body is moved horizontally, there is a margin in the operation cable due to this curved deflection portion, and thus regardless of the movement position at which the armrest main body is located in the horizontal direction, the functional portion can be operated by operating the operation member.

DOCUMENT OF RELATED ART

Patent Document

[Patent Document 1] Japanese Patent Granted Publication No. 5605898
[Patent Document 2] Japanese Patent Granted Publication No. 565389801
[Patent Document 3] Japanese Unexamined Patent Application, First Publication No. 2014-083116

SUMMARY

Technical Problem

Meanwhile, in Patent Document 1, the elbow pad is moved relative to the elbow support portion having the operation lever. Therefore, when the elbow pad is moved forward, the operation lever provided on the elbow support portion which does not move is disposed at a position greatly retracted from a front end of the elbow pad, and it becomes difficult to operate the operation lever. Therefore, for example, a constitution in which the elbow support portion can be moved together with the elbow pad and the elbow pad does not move relative to the elbow support portion can be considered.

However, in both the constitution disclosed in Patent Document 1 and the constitution in which the elbow pad and the elbow support portion are integrally movable, there is no change in a positional relationship between the elbow pad and the operation lever in a width direction of the chair. Thus, it is always difficult to see the operation lever in a seated state, and there is a possibility that a seated person may need to deliberately bend forward to confirm a position of the operation lever.

The present invention has been made in view of the above-described problems, and an object thereof is to make it possible to see an operation portion in a seated state while facilitating an operation of the operation portion such as an operation lever in an armrest installed in a chair.

Further, recently, an armrest in which an operation portion such as an operation lever is provided on an armrest main body and a functional portion (an operation target portion) such as a lifting mechanism of a chair can be operated by an operation of the operation portion has been devised. In such an armrest, the operation portion and the operation target portion on the chair are usually linked by an operation cable. The operation cable is drawn into the support structure from the chair main body and is connected to the operation portion of the armrest main body through an inner side of the support structure and the armrest main body.

However, it is difficult to use the rotation restricting mechanism described in Patent Document 2 in the armrest in which the operation cable is arranged inside the support structure and the armrest main body. That is, in the rotation restricting mechanism described in Patent Document 2, the bush which is the pivot portion protrudes in the recessed portion formed in the upper surface of the support structure, and the rotary block which is a rotation restricting element on the armrest main body is fitted to a circumferential region of the bush in the recessed portion. Therefore, the operation cable drawn out from the upper portion of the support structure cannot be inserted into the armrest main body at a position close to an axial center of the pivot portion (bush), and thus the operation cable should be drawn into the armrest main body at a position spaced apart from the axial center of the pivot portion. However, in this case, since the armrest main body is rotatable about the pivot portion in the substantially horizontal direction with respect to the support structure, a bending change of the operation cable due to rotation of the armrest main body increases. Such an increase in the bending change of the operation cable is not desirable in a stable operation by the operation cable or for durability of the operation cable.

Therefore, the present invention provides an armrest having a rotation restricting mechanism for restricting rotation of the armrest main body with respect to the support structure and capable of drawing the operation cable into the armrest main body from the vicinity of an axial center of a pivot portion, and a chair having the armrest.

Further, assuming there is a member which holds the armrest main body to be horizontally movable with respect to the support structure and which does not move itself, in the case in which the member comes into contact with or presses the operation cable when the armrest main body is moved horizontally, sliding resistance of the operation cable may increase, and operability of the operation member may deteriorate. Further, the curved deflection portion itself is a factor that increases the sliding resistance of the operation cable. The operation cable is constituted with an outer cable and an inner cable. However, in particular, a curvature of the outer cable is likely to influence the sliding resistance of the inner cable. When the curvature of the operation cable changes due to the horizontal movement of the armrest main body, the sliding resistance of the inner cable and the operability of the operation member also change. When the size of each portion of the armrest is increased to reduce the curvature of the operation cable (i.e., to obtain a gentle curve), it is difficult for the armrest to have a fashionable exterior.

The present invention has been made in view of the above-described technical problem, and an object thereof is to limit an increase of sliding resistance of an operation cable while limiting the size of an armrest and also to limit a change in operability of an operation member due to movement of an armrest main body in an armrest (a furniture component) of a chair in which the armrest main body (a second structure) is movably supported by a support structure (a first structure) and a predetermined function portion is also linked to the operation member supported by the armrest main body via the operation cable.

Solution to Problem

A first invention for solving the above-described problems is an armrest for being provided in a chair, including a support member which is a support structure, and an armrest main body, wherein the armrest main body includes a lower layer member supported by the support member to be movable in a first horizontal direction and including an operation portion to be operated by a seated person, and an upper layer member supported by the lower layer member to be movable in a second horizontal direction different from the first horizontal direction, and the upper layer member covers the operation portion at a base position thereof in the second horizontal direction.

According to the present invention, when the upper layer member is moved in the first horizontal direction, the lower layer member having the operation portion is moved together with the upper layer member in the first horizontal direction. That is, when the upper layer member is moved in the first horizontal direction, the upper layer member and the lower layer member are integrally moved. Therefore, a positional relationship between the upper layer member and the operation portion does not change, and it is possible to prevent the operation portion from reaching a position in which it is difficult for the operation portion to perform an operation in the positional relationship with the upper layer member.

On the other hand, when the upper layer member is moved in the second horizontal direction different from the first horizontal direction, the lower layer member having the operating portion is not moved, and the upper layer member is moved with respect to the lower layer member. Therefore, it is possible to change the positional relationship between the upper layer member and the operation portion, and thus a seated person can change a visual recognition state of the operation portion without changing his/her posture.

Therefore, in the present invention, when the visual recognition of the operation portion is not requested, the seated person can adjust a position of the armrest in the horizontal direction without changing operability of the operation portion by moving the upper layer member in the first horizontal direction. Further, when the visual recognition of the operation portion is requested, the positional relationship between the upper layer member and the operation portion can be changed by moving the upper layer member in the second horizontal direction. Thus, according to the present invention, it is possible to change or not to change the relative positional relationship between the upper layer member and the operation portion according to a desire of the seated person.

According to a second invention, in the first invention, the lower layer member may be supported by the support member to be movable in a forward-and-rearward direction of the chair which is the first horizontal direction, and the upper layer member may be supported by the lower layer member to be movable in a width direction of the chair which is the second horizontal direction.

According to the present invention, when the upper layer member is moved in a rearward direction of the chair, the lower layer member moves together, and when the upper layer member is moved in a width direction of the chair, the lower layer member moves with respect to the upper layer member. Therefore, a position of the armrest in the forward-and-rearward direction can be adjusted without changing operability of the operating portion by moving the upper layer member in the forward-and-rearward direction. Further, the positional relationship between the upper layer member and the operation portion can be changed by moving the upper layer member in the width direction of the chair. Generally, since the position adjustment of the armrest is considered to be more frequent in the forward-and-rearward direction than in the width direction, according to the present invention, the positional relationship between the upper layer member and the operation portion does not change at the time of the movement in the forward-and-rearward direction which has high adjustment frequency, and thus convenience of the chair and the armrest can be further improved.

Further, generally, the armrest of the chair is located outward in the width direction with respect to a seat on which a person sits and is provided at a position lower than the eyes of the seated person. That is, the seated person is located on an inner side in the width direction and can see the armrest from an upper side. Therefore, the visual recognition of the operation lever can be made easier by moving the upper layer member outward in the width direction.

According to a third invention, in the first or second invention, the operation portion may be provided at a front end of the lower layer member in a forward-and-rearward direction of the chair.

According to the present invention, the seated person can operate the operation portion while holding the arm on the upper layer member.

According to a fourth invention, in the first invention, the upper layer member may be disposed such that at least a part of the operation portion is exposed upward by moving the upper layer member in the second horizontal direction from the base position.

According to the present invention, the operating portion is exposed upward by moving the upper layer member from the base position in the second horizontal direction. Therefore, it is easier to see the operation portion.

In a fifth invention, the armrest may further include a rotation mechanism which connects the armrest main body supported by the support structure, to the support structure to be rotatable in a substantially horizontal plane, a rotation restricting mechanism configured to restrict a rotation angle of the armrest main body with respect to the support structure, and an operation cable disposed in the armrest main body from the support structure and configured to operate an operation target portion by an operation of the operation portion provided on the armrest main body, the rotation mechanism may include a pivot portion which protrudes upward from the support structure, and a bearing portion provided in the armrest main body and rotatably fitted to the pivot portion, the support structure may include a cable insertion portion which causes the operation cable to pass below the pivot portion from an inside of the support structure and which guides the operation cable from a vicinity of the pivot portion into an inside of the armrest main body, the rotation restricting mechanism may include a rotation restricting element on the armrest main body and another rotation restricting element on the support structure which come into contact with each other at the time of rotation restriction, and the rotation restricting element on the armrest main body and the rotation restricting element on the support structure may be disposed at positions opposite to an opening of the cable insertion portion facing the inside of the armrest main body, an axis of the pivot portion being disposed between the opening and the positions.

In the case of the present invention, the operation cable is drawn out from the vicinity of the pivot portion into the armrest main body through the cable insertion portion which passes through a lower side of the pivot portion of the support structure. The armrest main body can rotate around the pivot portion of the rotation mechanism, and the rotation of the armrest main body with respect to the support structure is restricted by the rotation restricting mechanism. Further, the rotation restricting element on the armrest main body and the rotation restricting element on the support structure are disposed at positions opposite to the opening of the cable insertion portion in the vicinity of the pivot portion with the axis of the pivot portion interposed therebetween. Therefore, it is possible to easily avoid interference between the operation cable drawn from the vicinity of the pivot portion and the rotation restricting element of the rotation restricting mechanism.

In a sixth invention, the rotation mechanism may be disposed inside the armrest main body, the rotation restricting mechanism may be disposed inside the support structure, and the rotation restricting element on the armrest main body may protrude inward of the support structure from a position opposite to the opening of the cable insertion portion facing the inside of the armrest main body, the axis of the pivot portion being disposed between the opening and the position.

In this case, since the rotation mechanism is disposed inside the armrest main body and the rotation restricting mechanism is disposed inside the support structure, it is possible to prevent the rotation restricting mechanism from occupying a space inside the armrest main body together with the rotation mechanism and to prevent the armrest main body from enlarging in the substantially horizontal direction.

In a seventh invention, the armrest main body may include a base member provided with an insertion hole through which the pivot portion is inserted upward from below, and a clamping block rotatably attached via the bearing portion to the pivot portion protruding upward from the base member through the insertion hole, and the base member and the clamping block may engage with each other via a guide mechanism allowing only relative movement in one direction which is substantially horizontal.

In this case, the base member of the armrest main body is rotatably installed in the pivot portion on the support structure in a state in which the displacement from the upper side is restricted by the clamping block, and only the relative displacement in one direction through the guide mechanism is allowed in the base member of the armrest main body and the clamping block. Therefore, although the base member of the armrest main body is displaced relative to the clamping block only in one direction, it is possible to reliably restrict separation of the base member from the pivot portion of the support structure due to the clamping block.

In an eighth invention, the rotation restricting element on the armrest main body may be provided on the clamping block and may pass downward through the insertion hole of the base member to protrude inward of the support structure.

In this case, the rotation restricting element of the clamping block protrudes inward of the support structure through the insertion hole common to a hole of the base member through which the pivot portion of the support structure is inserted. Since the base member rotates integrally with the clamping block around the pivot portion, the insertion hole formed in the base member can have an elongated hole shape which allows movement of the rotation restricting element of the clamping block in one direction at the time of relative displacement of the clamping block and the base member in one direction. Therefore, due to such a constitution, the insertion hole formed in the base member can be easily formed to have a small opening area.

In a ninth invention, the cable insertion portion may be formed of a continuous hole which extends from a lower surface of an upper wall portion of the support structure on one side of the axis of the pivot portion to an upper surface of the upper wall portion of the support structure on another side of the axis of the pivot portion and to an outer side surface of the pivot portion, the axis of the pivot portion being disposed between the one side and the other side.

In this case, the operation cable is drawn out from the lower surface of the upper wall portion of the support structure on one side with the pivot portion interposed therebetween toward the upper surface thereof on the other side with the pivot portion interposed therebetween and the outer surface of the pivot portion. Therefore, due to such a constitution, it is possible to reduce bending of the operation cable drawn out from the support structure and to smooth the operation of the operation cable.

A tenth invention is a chair including one of the above-described armrest.

The chair of the present invention has the above-described armrest of the present invention. Therefore, in the armrest, the movement of the upper layer member which facilitates the operation of the operation portion such as the operation lever or the like and the movement of the upper layer member which facilitates the visual recognition of the operation portion in the seating state can be arbitrarily performed.

An eleventh invention may include an operation cable which transmits an operation performed on an operation member which is the operation portion to the support structure, wherein the armrest main body further includes a movable body which supports the operating member and is movable in a first movement direction with respect to the supporting structure, and a fixed body connected to the support structure and incapable of moving in the first movement direction with respect to the support structure, the operation cable includes an outer cable and an inner cable, the fixed body includes an outer locking portion which locks a locking end of the outer cable, and an inner locking portion which locks a locking end of the inner cable drawn out from the outer cable, the operation member engages with the inner cable in an arrangement path of the inner cable drawn out from the outer cable, and the movable body includes an inner drawing length maintaining mechanism which changes the arrangement path of the inner cable when moving in the first movement direction and which limits a change in the length of the inner cable drawn out from the outer cable.

According to such a constitution, since only the inner cable is arranged in the armrest main body while an operation of a functional portion separated from the armrest main body is enabled by an operation of the operation lever via the operation cable, an increase in the size of the armrest main body can be limited, and an increase in sliding resistance of the inner cable due to the bending of the outer cable in the armrest main body can be limited.

Additionally, when the movable body of the armrest main body is moved in the first movement direction, the arrangement path of the inner cable is changed by the inner drawing length maintaining mechanism provided on the movable body (for example, moved like the movable body), and thus a change in the drawing length of the inner cable drawn out from the outer cable locked to the fixed body is limited. Therefore, the inner cable is prevented from being pulled or loosened when the armrest main body moves in the first movement direction, and unintentional operation of the functional portion and an excessive margin of the operation lever can be prevented.

In a twelfth invention, the inner drawing length maintaining mechanism may include a first turning member which extends the inner cable in the first movement direction and which turns the inner cable back to protrude toward one side in the first movement direction, and a second turning member which extends the inner cable in the first movement direction and which turns the inner cable back to protrude toward the other side in the first movement direction.

In this case, when the movable body of the armrest main body is moved to one side in the first movement direction, the first turning member increases a folding length of the inner cable, and the second turning member reduces the folded length of the inner cable by the same amount as the increment due to the first turning member.

Similarly, when the moving body of the armrest main body is moved to the other side in the first movement direction, the first turning member reduces the folding length of the inner cable, and the second turning member increases the folding length of the inner cable by the same amount as the reduction due to the first turning member. That is, the increase or decrease in the folding length of the inner cable is offset on both sides in the first movement direction, and the inner cable can be prevented from being pulled or loosened when the armrest main body moves in the first movement direction.

In a thirteenth invention, at least one of the first turning member and the second turning member may be connected to the operation member to be capable of interlocking therewith.

In this case, since the inner cable and the operation lever can engage with each other using the turning member of the inner cable, it is possible to simplify the cable arrangement and to reduce the number of parts, as compared with a case in which a means for engaging the inner cable and the operation lever is additionally provided.

In a fourteenth invention, at least one of the first turning member and the second turning member may be a pulley on which the inner cable is wound.

In this case, it is possible to reduce the resistance when the inner cable is turned back and to smoothly move the arrangement path of the inner cable.

In a fifteenth invention, the first movement direction may be a forward-and-rearward direction of the chair, and at least a rear turning member located at a rear side among the first turning member and the second turning member may turn back the inner cable such that two portions of the inner cable are arranged right and left.

In this case, in at least the rear turning member, a height dimension of the turning member and a height dimension of the armrest main body are limited as compared with a case in which the inner cable is turned to be lined up and down, and it is possible to limit the increase in size of the armrest main body. In particular, in the case in which a rearward and downward armrest surface is formed, this armrest surface can be easily formed.

A sixteenth invention provides a furniture component including a first structure for being attached to a furniture main body, a second structure supported by the first structure, an operation member supported by the second structure and subjected to an operation prescribed by a user, and an operation cable which transmits an operation performed on the operation member to the first structure, wherein the second structure includes a movable body which supports the operating member and is movable in a first movement direction with respect to the first structure, and a fixed body connected to the first structure and incapable of moving in the first movement direction with respect to the first structure, the operation cable includes an outer cable and an inner cable, the fixed body includes an outer locking portion which locks a locking end of the outer cable, and an inner locking portion which locks a locking end of the inner cable drawn out from the outer cable, the operation member engages with the inner cable in an arrangement path of the inner cable drawn out from the outer cable, and the movable body includes an inner drawing length maintaining mechanism which changes the arrangement path of the inner cable when moving in the first movement direction and which limit s a change in the length of the inner cable drawn out from the outer cable.

According to such a constitution, since only the inner cable is arranged in the second structure while an operation of a functional portion separated from the second structure is enabled by an operation of the operation lever via the operation cable, an increase in the size of the second structure can be limited, and an increase in the sliding resistance of the inner cable due to the bending of the outer cable in the second structure can be limited.

Additionally, when the movable body of the second structure is moved in the first movement direction, the arrangement path of the inner cable is changed by the inner drawing length maintaining mechanism provided on the movable body (for example, moved like the movable body), and thus the drawing length of the inner cable drawn out from the outer cable locked to the fixed body is limited. Therefore, the inner cable is prevented from being pulled or loosened when the second structure moves in the first movement direction, and unintentional operation of the functional portion and an excessive margin of the operation lever can be prevented.

Effects

According to the present invention, it is possible to change or not to change the relative positional relationship between the upper layer member and the operation portion according to the desire of the seated person, the movement of the upper layer member which facilitates the operation of the operation portion such as the operation lever and so on as well as the movement of the upper layer member which facilitates the visual recognition of the operation portion in the seated state can be arbitrarily performed, and the usability of the chair and the armrest can be improved.

Also, according to the present invention, the cable insertion portion which passes through the lower side of the pivot portion of the support structure opens into the armrest main body in the vicinity of the pivot portion, and the rotation restricting element on the armrest main body and the rotation restricting element on the support structure are disposed at a position opposite to the opening of the cable insertion portion in the vicinity of the pivot portion with the axis of the pivot portion interposed therebetween. Therefore, according to the present invention, it is possible to draw out the operation cable from the vicinity of the pivot portion into the armrest main body without trouble with the structure having the rotation restricting mechanism.

Further, according to the present invention, in the armrest (furniture component) of the chair in which the armrest main body (the second structure) is movably supported by the support structure (the first structure) and a predetermined functional portion is linked to the operation member supported by the armrest main body via the operation cable, it is possible to limit an increase in sliding resistance of the operation cable while limiting an increase in size of the armrest and to limit a change in operability of the operation member due to movement of the armrest main body.

DESCRIPTION OF EMBODIMENTS

First Embodiment

Hereinafter, a first embodiment of an armrest and a chair according to the present invention will be described with reference to the drawings.

In the following drawings, the scale of each member is appropriately changed so that each member has a recognizable size.

Figure 1:
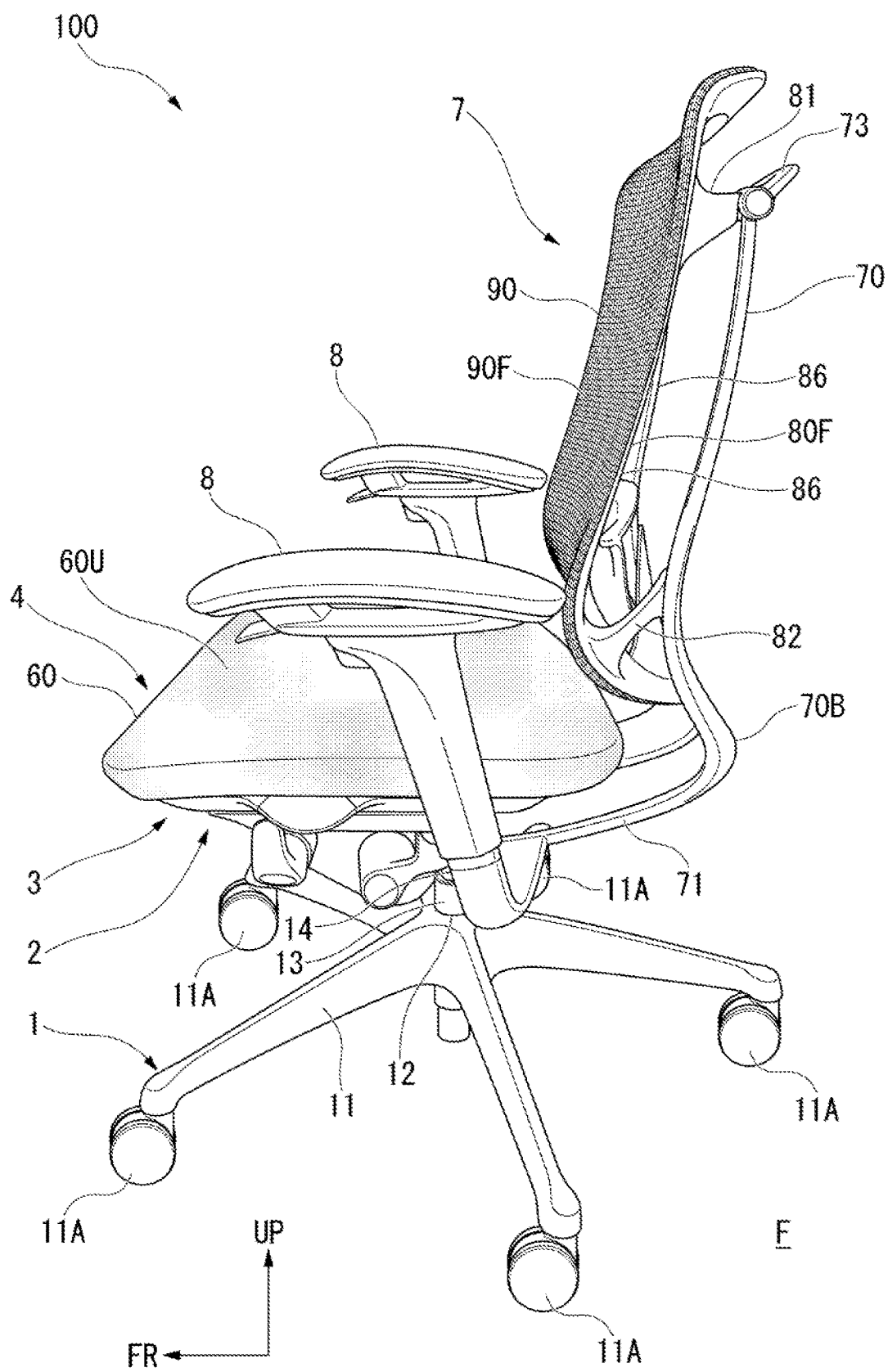
FIG. 1 is a perspective view of a chair according to a first embodiment of the present invention as seen from a side.
Figure 2:
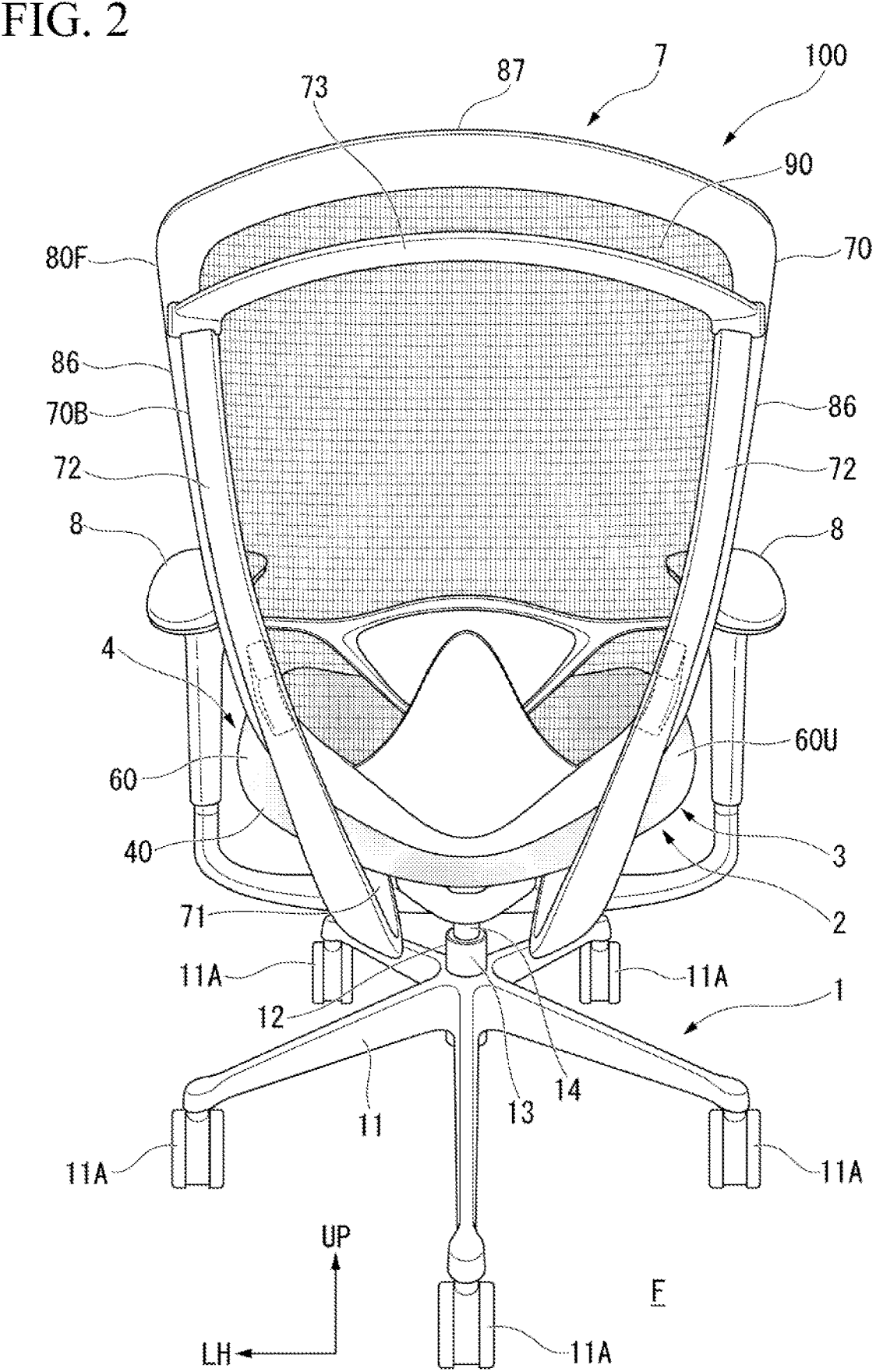
FIG. 2 is a perspective view of the chair according to the first embodiment of the present invention as seen from behind.

FIG. 1 is a perspective view of a chair according to the first embodiment of the present invention as seen from a side. FIG. 2 is a perspective view of the chair according to the first embodiment of the present invention as seen from behind (a back rest side).

As shown in FIGS. 1 and 2, a chair 100 includes a leg portion 1 installed on a floor surface F, a box-shaped support base 2 (not shown) installed on an upper portion of the leg portion 1, a seat receiving member 3 installed on an upper portion of the support base 2, a seat body 4 slidably supported on the seat receiving member 3 and on which a person sits, a hack rest 7 extending from the support base 2 and supporting a back of the person seated on the seat body 4, and an armrest 8 disposed on a side portion of the back rest 7.

In the following description, for convenience, a direction in which the person seated on the seat body 4 faces forward is referred to as "frontward," and the opposite direction is referred to as "rearward." Also, a direction connecting the floor surface F-side on which the chair 100 is installed and the opposite side is referred to as a "vertical direction." Also, a width direction of the chair 100, that is, a horizontal direction orthogonal to the forward-and-rearward direction, is referred to as a "right-and-left direction." Further, in the drawing, the forward direction is indicated by an arrow FR, an upward direction is indicated by an arrow UP, and a left side is indicated by an arrow LH.

The leg portion 1 has a multi-branched leg 1 with casters 11A, and a leg post 12 standing up from a center of the multi-branched leg 11 and in which a gas spring (not shown) is built as a lifting mechanism. An outer cylinder 13 constituting a lower portion of the leg post 12 is fitted to and supported on the multi-branched leg 11 in a non-rotatable manner. An inner cylinder 14 constituting an upper portion of the leg post 12 fixes and supports the support base 2 at an upper end thereof, and a lower portion thereof is supported by the outer cylinder 13 to be rotatable in the horizontal direction.

A lifting adjustment mechanism of the leg post 12 and a tilt adjustment mechanism of the back rest 7 are built in the support base 2. The seat receiving member 3 includes four link arms (not shown; the same hereinafter) installed on the upper portion of the support base 2, and a pair of right and left fixed frames (not shown; the same hereinafter) for connecting the link arms to each other.

The seat body 4 has a seat frame 40 and a tension member 60 stretched around the seat frame 40. An upper surface of the tension member 60 serves as a load supporting surface 60U which receives a load of the seated person.

The back rest 7 has a back frame 70 and a tension member 90 stretched around the back frame 70. A front surface of the tension member 90 serves as a load supporting surface 90F which receives the load of the seated person. The back frame 70 includes a rear frame 70B connected to the support base 2, and a front frame 80F provided in front of the rear frame 70B.

The rear frame 70B has a lower side portion 71, a side portion 72, and an upper side portion 73. The lower side portion 71, the side portion 72 and the upper side portion 73 are formed integrally of, for example, a metal such as aluminum or a resin having a predetermined strength.

The lower side portion 71 is connected to the tilt adjustment mechanism in the support base 2 and extends from both right and left sides of a rear portion of the support base 2. The lower side portion 71 is gradually inclined rearward toward the upper side. Also, the armrest 8 extending laterally is provided on each lower side portion 71.

The side portion 72 is connected to an upper end of each lower side portion 71. Each side portion 72 is gradually inclined outward toward the upper side in the right-and-left direction.

A lower portion of the side portion 72 is gradually inclined forward toward the upper side.

An upper portion of the side portion 72 is gradually inclined rearward toward the upper side. The upper portions of the side portions 72 are connected by the upper side portion 73.

The front frame 80F includes an upper arm portion 81 connected to the upper portion of the side portion 72 of the rear frame 70B, a lower arm portion 82 connected to a lower portion of the side portion 72, a pair of vertical rods 86 disposed to be spaced apart from each other in the right-and-left direction (along the load supporting surface 60U), and an upper rod 87 which connects upper ends of the pair of vertical rods 86 to each other. The upper arm portion 81, the lower arm portion 82, the vertical rods 86 and the upper rod 87 are integrally formed of, for example, a resin or the like. The vertical rods 86 and the upper rod 87 are elastically deformable according to a force acting from the tension member 90. An upper portion of each of the vertical rods 86 is connected to the upper arm portion 81, and a lower portion thereof is connected to the lower arm portion 82. Each of the vertical rods 86 extends in the vertical direction.

In detail, the vertical rods 86 are gradually inclined inward toward the lower side in the right-and-left direction. Lower ends of the pair of vertical rods 86 are connected to each other.

The armrest 8 is provided on each of a left side and a right side of the chair 100 in the width direction (the right-and-left direction).

These armrests 8 have a bilaterally symmetrical shape. Therefore, in the following description, the armrest 8 installed on the right side of the chair 100 will be described in detail with reference to the drawings.

Figure 3:
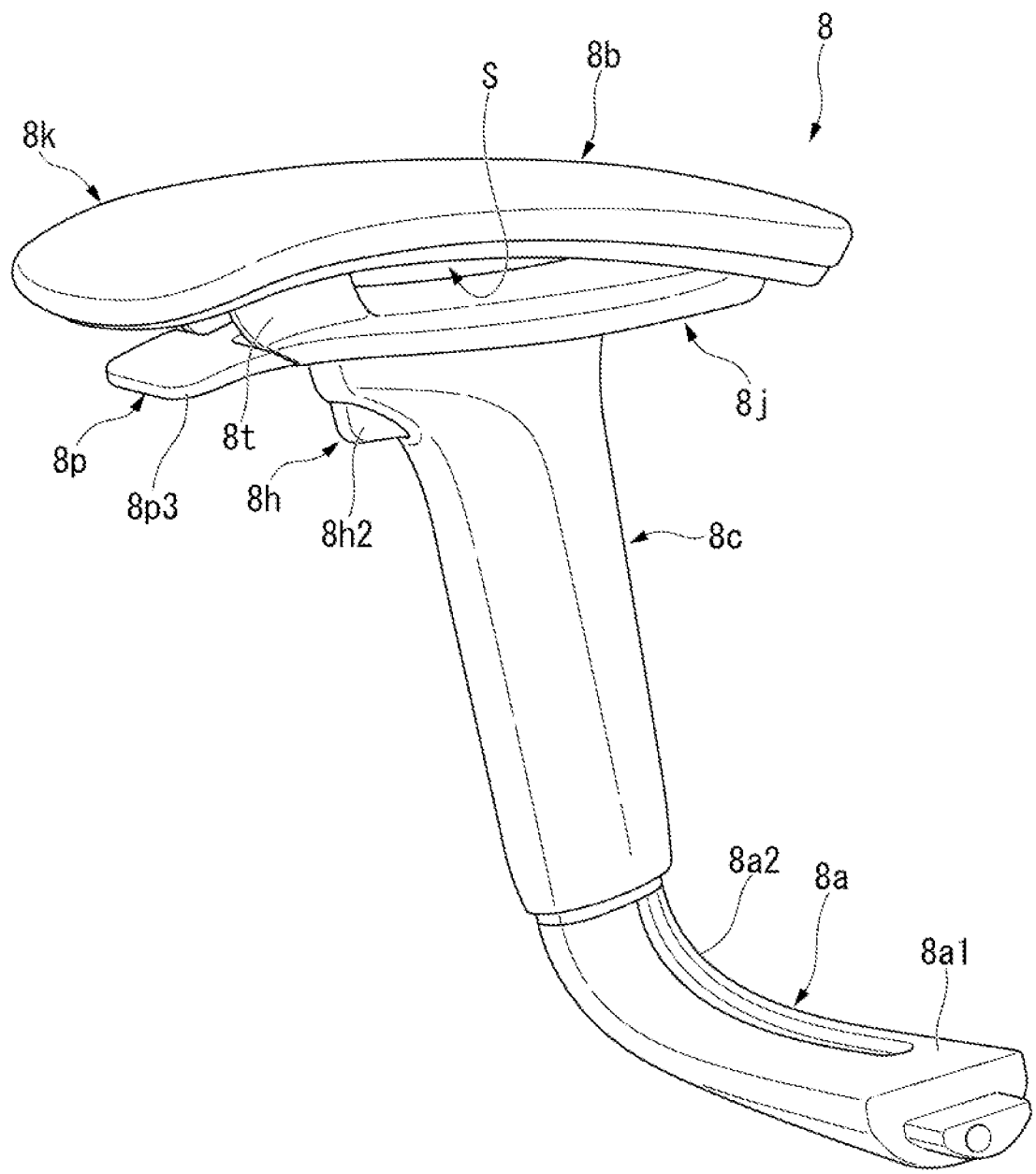
FIG. 3 is a perspective view of an armrest provided in the chair according to the first embodiment of the present invention.

FIG. 3 is a perspective view of the armrest 8. The armrest 8 includes a support rod 8*a* (support member) which has an L shape in a front view and extends outward from the lower side portion 71 of the back frame 70 in the width direction, is then curved upward and extends, an armrest main body 8*b* supported by an upper end of the support rod 8*a* and extending in the forward-and-rearward direction, and a lifting cylinder 8*c* movably supporting the armrest main body 8*b* in the forward-and-rearward direction.

The support rod 8*a* includes an outer extending portion 8*a*1 which extends outward from the lower side portion 71 of the back frame 70 in the width direction, an upper curved portion 8*a*2 which continues to an outer side of the outer extending portion 8*a*1, and an upper standing portion 8*a*3 (refer to FIG. 4) which continues to an upper side of the upper curved portion 8*a*2.

The outer extending portion 8*a*1 and the upper curved portion 8*a*2 are integrally formed as a solid lower support rod formed of, for example, an aluminum alloy. The upper standing portion 8*a*3 is formed as a hollow upper support rod formed of, for example, a steel plate to have a pipe shape extending linearly in the vertical direction.

Figure 4:
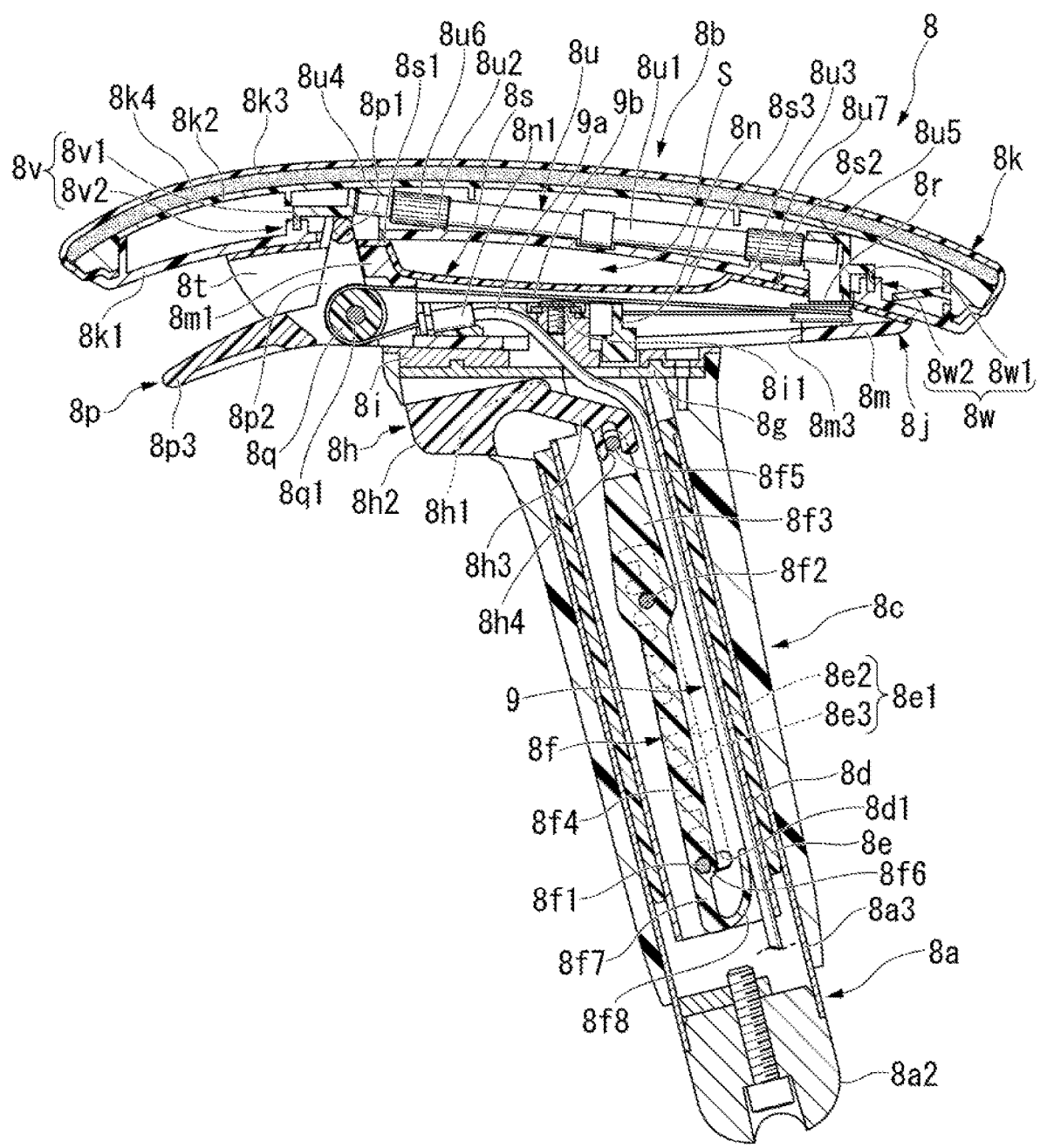
FIG. 4 is a side cross-sectional view of the armrest cut along a cross section passing through an upper upright portion.

FIG. 4 is a side cross-sectional view of the armrest 8 cut along a cross section passing through the upper standing portion 8*a*3. As shown in FIG. 4, the lifting cylinder 8*c* capable of being lifted up and down along an axis (in an extending direction) is externally fitted to the upper standing portion 8*a*3 (the upper support rod), and an inner pipe 8*d* capable of being lifted up and down along the axis is internally fitted thereto. The lifting cylinder 8*c* and the inner pipe 8*d* can be lifted up and down integrally with the armrest main body 8*b*.

Further, the armrest main body 8*b* is movable in the forward-and-rearward direction with respect to the lifting cylinder 8*c* and is also rotatable about a center of a pivot which will be described later in a plan view, and an upper layer member 8*k* which will be described later can also move in the right-and-left direction with respect to a lower layer member 8*j* and the support rod 8*a*.

An inner sleeve 8*e* in which a comb-shaped height adjustment slit 80 in a side view is formed is internally fitted to the upper standing portion 8*a*3. The inner sleeve 8*e* is fitted into the upper standing portion 8*a*3 and fixed by a snap fit or the like. The height adjustment slit 8*e*1 includes a lifting guide slit 8*e*2 which extends in an axial direction and a plurality of locking slits 8*e*3 which extend forward from the lifting guide slit 8*e*2.

A locking pin 8*f*1 which is lockable to one of the locking slits 8*e*3 of the height adjustment slit 8*e*1 is held on a swing lever 8*f* which will be described later. The locking pin 8*f*1 extends in the right-and-left direction. An elongated hole-shaped pin moving hole 8*d*1 which is long in the forward-and-rearward direction in a side view is formed in right and left side walls of the inner pipe 8*d*. Right and left ends of the locking pin 8*f*1 are inserted into the pin moving hole 8*d*1 to be movable in the forward-and-rearward direction.

When the locking pin 8*f*1 is moved to a front end of the pin moving hole 8*d*1, it can be locked to any one of the locking slits 8*e*3 of the height adjustment slit 8*e*1. At this time, lifting of the armrest main body 8S is locked. That is, the fixing height of the armrest main body 8*b* can be adjusted in multiple stages according to the locking slits 8*e*3 to which the locking pin 8*f*1 is locked.

When the locking pin 8*f*1 moves to a rear end of the pin moving hole 8*d*1, it releases the locking to the locking slit 8*e*3 and reaches the lifting guide slit 8*e*2. At this time, lifting lock of the armrest main body 8*b* is released, and the armrest main body 8*b* can be lifted up and down (a height thereof can be changed).

The swing lever 8*f* is swingably supported inside the inner pipe 8*d* via a support shaft 8*f*2 extending in the right-and-left direction. The swing lever 8*f* includes an upward extending portion 8*f*3 which extends upward of the support shaft 8*f*2 and a downward extending portion 8*f*4 which extends downward of the support shaft 8*f*2. An engagement pin 8*f*5 which slidably engages with a rear lower engagement groove 8*h*4 of a lifting operation lever 8*ph* to be described later is provided at an upper end of the upward extending portion 8*f*3. A pin holding portion 8*f*6 which holds the locking pin 8*f*1 is provided at a lower end of the downward extending portion 8*f*4. An extending portion 8*f*7 which extends downward is provided and a spring piece 8*f*8 which folds upward in an arc shape from a rear side of a lower end of the extending portion 8*f*7 are also provided below the pin holding portion 8*f*6.

A top plate 8*g* which overhangs around the inner pipe 8*d* in a plan view is fixed to an upper end of the inner pipe 8*d*. The lifting operation lever 8*ph* is swingably supported on a lower surface of the top plate 8*g* in front of the inner pipe 8*d* via a support shaft 8*h*1 extending in the right-and-left direction. The lifting operation lever 8*ph* includes a forward extending portion 8*h*2 which extends forward of the support shaft 8*h*1 and a rearward extending portion 8*h*3 which extends rearward of the support shaft 8*h*1. A front lower portion of the forward extending portion 8*h*2 protrudes to an outer side of an upper end of the lifting cylinder 8*c* so that the seated person can push it upward. The rear lower engagement groove 8*h*4 in which the engagement pin 8*f*5 of an upper end of the swing lever 8*f* is engaged is provided on a lower side of a rear end of the rearward extending portion 8*h*3.

The swing lever 8*f* is biased so that a rear upper end of the spring piece 8*f*8 comes into contact with an inner wall (including an operation cable 9 which will be described later and passes through the inner pipe 8*d*) of the inner pipe 8*d* from a front side to displace a lower end thereof forward. At this time, the locking pin 8*f*1 moves to a front end of the pin moving hole 8*d*1 and is locked to one of the locking slits 8*e*3 of the height adjustment slit 8*e*1. When the lower end of the swing lever 8*f* is biased forward, the upper end of the swing lever 8*f* is displaced rearward to displace a rear end of the rearward extending portion 8*h*3 of the lifting operation lever 8*ph* upward and to project the forward extending portion 8*h*2 downward. When the forward extending portion 8*h*2 is pushed upward, a rear end of the lifting operation lever 8*ph* displaces the upper end of the swing lever 8*f* forward and displaces the lower end of the swing lever 8*f* rearward against a biasing force of the spring piece 8*f*8. Then, the locking pin 8f1 moves to the rear end of the pin moving hole 8d1, releases the locking to the locking slit 8e3 of the height adjustment slit 8e1, reaches the lifting guide slit 8e2 and allows the armrest main body 8b to be lifted up and down.

An end plate 8i having a pivot 8i1 is fixed on the top plate 8g. The end plate 8i is disposed to close an upper end opening of the lifting cylinder 8c. The armrest main body 8b is supported on the end plate 8i to be rotatable around the pivot 8i1.

The armrest main body 8b includes the lower layer member 8j placed on the end plate 8i and an upper layer member 8k placed on the lower layer member 8j.

Figure 5:
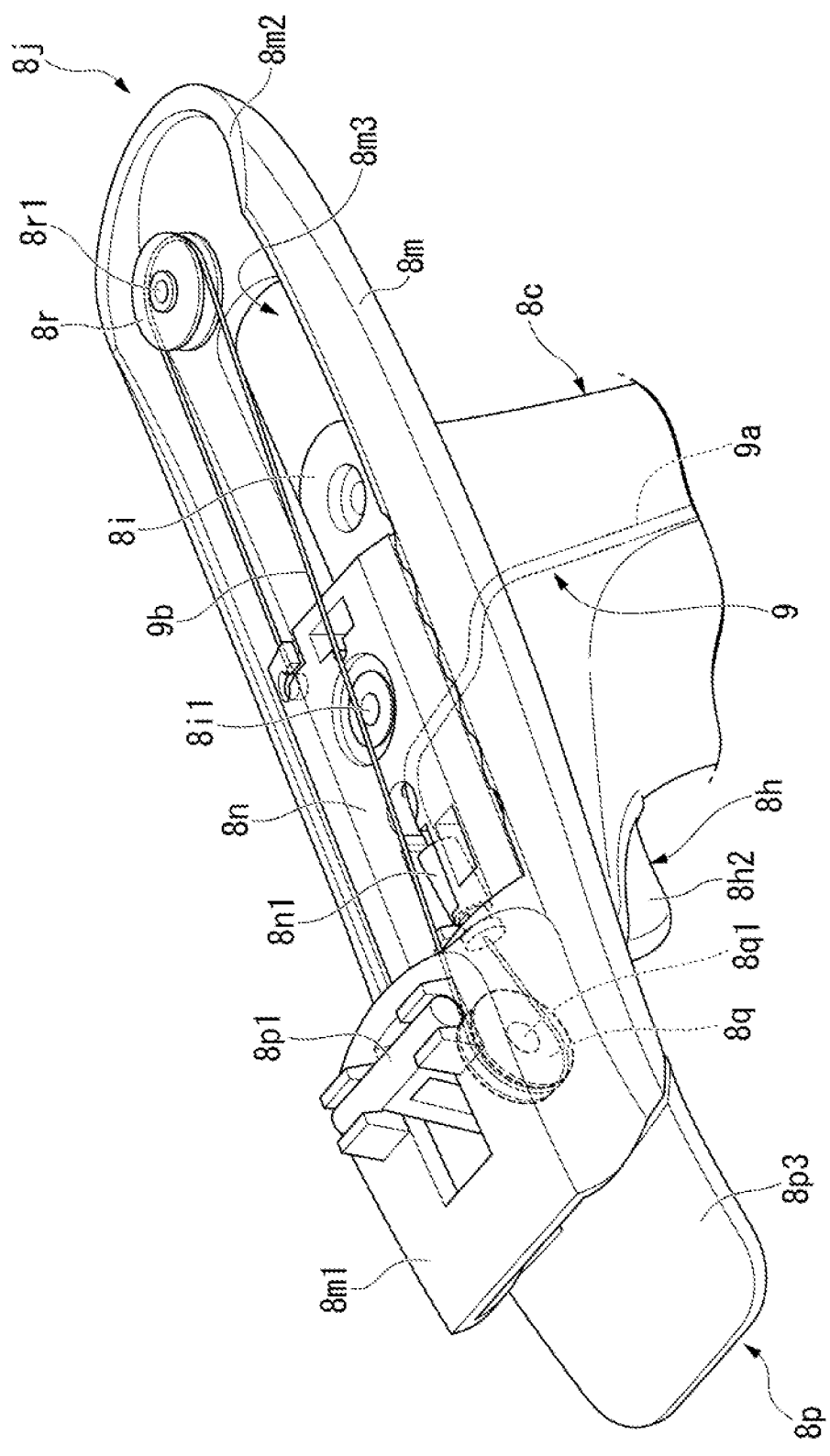
FIG. 5 is an enlarged perspective view including a lower layer member in which a cover member is omitted.

FIG. 5 is an enlarged perspective view including the lower layer member 8j in a state in which a cover member 8s described below is omitted. As shown in this drawing, the lower layer member 8j includes a base member 8m which forms an accommodation space which opens upward and is placed on the end plate 8i in a state in which the pivot 8i1 protrudes into the accommodation space, a rotary member 8n fitted to the base member 8m to be relatively non-rotatable and to be movable forward and rearward within the accommodation space and fitted to the pivot 8i1 to be rotatable, an operation lever 8p which remotely operates a device (the lifting adjustment mechanism of the leg post 12 and the tilt adjustment mechanism of the back rest 7) in the support base 2 via the operation cable 9, a front pulley 8q and a rear pulley 8r which winds an inner cable 9b of the operation cable 9 within the lower layer member 8j, and the cover member 8s (refer to FIG. 4) which closes an upper opening portion of the accommodation space. The lower layer member 8j is supported from a lower side by the support rod 8a.

A front stepped portion 8m1 which is changed stepwise upward with respect to the accommodation space is formed at a front end of the base member 8m to support a front portion of the upper layer member 8k. A rear inclined portion 8m2 which is inclined rearward and downward is formed at a rear end of the base member 8m to support a rear portion of the upper layer member 8k. The rear inclined portion 8m2 is formed so that a depth of a rear end of the accommodation space becomes shallower toward a rear side. An elongated hole 8m3 which passes through the pivot 8i1 and extends in the forward-and-rearward direction is formed in a bottom wall of the base member 8m.

The rotary member 8n is formed in a flat rectangular parallelepiped shape in which the width in the vertical direction (a direction along an axis of the pivot 8i1) is limited. In a plan view, the rotary member 8n is disposed so that front and rear surfaces thereof are directed in the right-and-left direction and right and left side surfaces thereof are directed in the forward-and-rearward direction (a direction along right and left side walls of the base member 8m).

The operation lever 8p is formed in an L shape in a side view. The operation lever 8p includes a support shaft 8p1 which extends in the right-and-left direction and is rotatably supported on the front stepped portion 8m1, a downward extending portion 8p2 which extends downward from the support shaft 8p1, and a forward extending portion 8p3 which extends forward from a lower end of the downward extending portion 8p2. The operation lever 8p is swingable around the support shaft 8p1 in a swing space inside the front stepped portion 8m1. A front portion of the forward extending portion 8p3 protrudes to a front of a lower portion of the front stepped portion 8m1 and can be pushed up. The forward extending portion 8p3 is located below a front portion of the upper layer member 8k. The forward extending portion 8p3 is formed so that the seated person whose an arm is placed on the upper layer member 8k can pull it up with a fingertip.

The front pulley 8q is rotatably supported by the lower end of the downward extending portion 8p2 of the operation lever 8p via a support shaft 8q1 extending in the right-and-left direction. When the downward extending portion 8p2 rotates forward and upward due to the pulling-up operation of the forward extending portion 8p3, the front pulley 8q moves forward in accordance with rotation of the downward extending portion 8p2.

The rear pulley 8r is rotatably supported by a rear end of the bottom wall of the base member 8m via a support shaft 8r1 extending in the vertical direction. The rear pulley 8r is disposed at the rear end of the accommodation space in which the depth thereof is reduced by the rear inclined portion 8m2. The rear pulley 8r is disposed to be laid, and thus it is easier to dispose the rear pulley 308r even in a shallow space as compared with the case in which it is disposed to be upright like the front pulley 8q.

The operation cable 9 includes an outer cable 9a and an inner cable 9b. The operation cable 9 extends from the support base 2 through the inner pipe 8d and reaches an inside of the lower layer member 8j.

In the outer cable 9a of the operation cable 9, a tip end thereof is locked to an outer cable locking portion 8n1 formed in the rotary member 8n. The inner cable 9b of the operation cable 9 extends forward from the tip end of the outer cable 9a and is then wound upward from a lower side on the front pulley 8q and turns rearward. Thereafter, the inner cable 9b is wound on the rear pulley 8r from one side in the width direction to the other side (from an inner side in the width direction to an outer side in the drawing) and is turned forward. Then, a tip end of the inner cable 9b is locked to an outer side of a rear end of the rotary member 8n in the width direction.

When the forward extending portion 8p3 of the operation lever 8p is pulled up with the above-described constitution, the front pulley 8q moves forward and upward to draw out the inner cable 9b and operates the device in the support base 2.

Here, also when the armrest main body 8b is moved in the forward-and-rearward direction, the front pulley 8q moves in the forward-and-rearward direction, but at this time, the front pulley 8q moves forward and rearward in front of the tip end of the outer cable 9a, and the rear pulley 8r moves forward and rearward behind the tip end of the inner cable 9b. Therefore, even when the length of the inner cable 9b in front of the tip end of the outer cable 9a increases or decreases, the length of the inner cable 9b behind the tip end of the inner cable 9b decreases or increases by the same dimension. Therefore, a change in a drawing length of the inner cable 9b is limited, and thus the inner cable 9b is prevented from being pulled when the armrest main body 8b moves forward, or the inner cable 9b is prevented from being loosened when the armrest main body 8b moves rearward.

The cover member 8s includes a front stepped cover portion 8s1 formed stepwise to be matched with the front stepped portion 8m1, a rear inclined cover portion 8s2 which is inclined to be matched with the rear inclined portion 8m2 and extends forward of the rear inclined portion 8m2, and an intermediate wall portion 8s3 provided to be spaced apart from the upper layer member 8k between the front stepped cover portion 8s1 and the rear inclined cover portion 8s2. The front stepped cover portion 8s1 forms a front standing portion which stands upward from a front end of the intermediate wall portion 8s3, and the rear inclined cover portion 8s2 forms a rear standing portion which stands upward from a rear end of the intermediate wall portion 8s3 to be relatively low and gentle. A through-space S which passes through the armrest main body 8b in the right-and-left direction is formed between the intermediate wall portion 8s3 and the upper layer member 8k. A front support portion 8t formed by the front stepped portion 8m1 and the front stepped cover portion 8s1 to support the front portion of the upper layer member 8k is provided in front of the through-space S. The front support portion 8t forms the through-space S by separating a part of the lower layer member 8j from a part of the upper layer member 8k. The through-space S is formed to penetrate in the width direction of the chair 100 and can be used as a space for inserting a finger of the seated person when the upper layer member 8k is moved in the right-and-left direction with respect to the lower layer member 8j.

The upper layer member 8k includes a base member 8k1 fixed on the front support portion 8t and the rear inclined cover portion 8s2 of the lower layer member 8j, a cover member 8k2 overlapped on the base member 8k with an accommodating space therebetween, a pad member 8k3 which covers the cover member 8k2 from an upper side, and a cushion member 8k4 interposed between the cover member 8k2 and the pad member 8k3 and formed of urethane or the like. In a side view, the upper layer member 8k has a gentle curved shape protruding upward, the front portion thereof is inclined forward and downward, and the rear portion thereof is inclined rearward and downward. The base member 8k1 is placed on the lower layer member 8j and is slidable in the right-and-left direction. Furthermore, the cover member 8k2, the pad member 8k3 and the cushion member 8k4 are also movable together with the base member 8k1 in the right-and-left direction with respect to the lower layer member 8j. The upper layer member 8k is supported from a lower side by the lower layer member 8j, forms the through-space S between the upper layer member 8k and a part (a center portion in the forward-and-rearward direction) of the lower layer member 8j and is disposed to partially face the above-described part of the lower layer member 8j.

A movement equalizing mechanism 8u for moving right and left the upper layer member 8k which is long in the forward-and-rearward direction in parallel is provided in the accommodation space of the upper layer member 8k.

When the upper layer member 8k which is long in the forward-and-rearward direction is moved in the right-and-left direction, a tilt in a plan view may be generated in the upper layer member 8k and may obstruct smooth right and left movement, or the armrest main body 8b may unintentionally rotate around the pivot 8i1 during an operation performed by grasping any one of the front and rear ends of the upper layer member 8k. Meanwhile, it is possible to assist the parallel movement of the upper layer member 8k in the right-and-left direction by equalizing the right and left movement of the front and rear ends of the upper layer member 8k due to the movement equalizing mechanism 8u.

The movement equalizing mechanism 8u includes an interlocking shaft 8u1 which extends in the forward-and-rearward direction in the accommodation space of the upper layer member 8k, a front rack 8u2 and a rear rack 8u3 formed on the base member 8k1 to extend in the right-and-left direction, a front bearing portion 8u4 disposed on a front side of the interlocking shaft 8u1, and a rear bearing portion 8u5 disposed on a rear side of the interlocking shaft 8u1.

A front end of the interlocking shaft 8u1 is rotatably supported by the front bearing portion 8u4 which is accommodated in the upper layer member 8k to be movable in the right-and-left direction. A rear end of the interlocking shaft 8u1 is rotatably supported by the rear bearing portion 8u5 which is accommodated in the upper layer member 8k to be movable in the right-and-left direction. A front pinion gear 8u6 is formed at a front portion of the interlocking shaft 8u1. A rear pinion gear 8u7 is formed at a rear portion of the interlocking shaft 8u1. The front rack 8u2 is meshed with the front pinion gear 8u6. The rear rack 8u3 is meshed with the rear pinion gear 8u7. The front bearing portion 8u4 and the rear bearing portion 8u5 are fixed to the lower layer member 8j and are fixed even when the upper layer member 8k moves.

A guide protruding portion 8v1 of which a tip end is directed downward is provided at a front end of the front bearing portion 8u4. A guide groove portion 8v2 formed in the right-and-left direction (a movement direction of the upper layer member 8k) is provided in a front upper surface of the base member 8k1. The guide protruding portion 8v1 slidably engages with the guide groove portion 8v2. The guide protruding portion 8v1 and the guide groove portion 8v2 form a front guide portion 8v.

A guide protruding portion 8w1 of which a tip end is directed downward is provided at a rear end of the rear bearing portion 8u5. A guide groove portion 8w2 formed in the right-and-left direction (the movement direction of the upper layer member 8k) is provided in a rear upper surface of the base member 8k1. The guide protruding portion 8w1 slidably engages with the guide groove portion 8w2. The guide protruding portion 8w1 and the guide groove portion 8w2 form a rear guide portion 8w.

When the upper layer member 8k is intended to be moved right and left by grasping the front end or the rear end of the upper layer member 8k with the above-described constitution, the rack (the front rack 8u2 or the rear rack 8u3) moves, and the pinion gear (the front pinion gear 8u6 or the rear pinion gear 8u7) at one of the front and rear ends of the upper layer member 8k on a side (a driving side) grasped by the seated person rotates. Therefore, the interlocking shaft 8u1 rotates, and an opposite side (a driven side) of the upper layer member 8k which is separated by the length of the interlocking shaft 8u1 is moved right and left by the same amount as the end on the driving side due to the pinion gear and the rack located at the end on the opposite side. Thus, the parallel movement of the upper layer member 8k in the right-and-left direction is promoted.

Figure 6A:
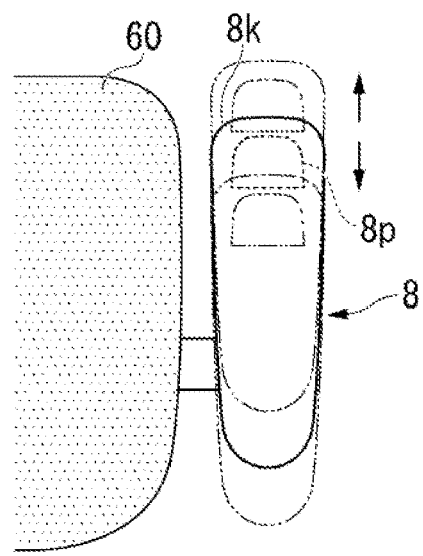
FIG. 6A is a schematic plan view showing an operation of the armrest.
Figure 6B:
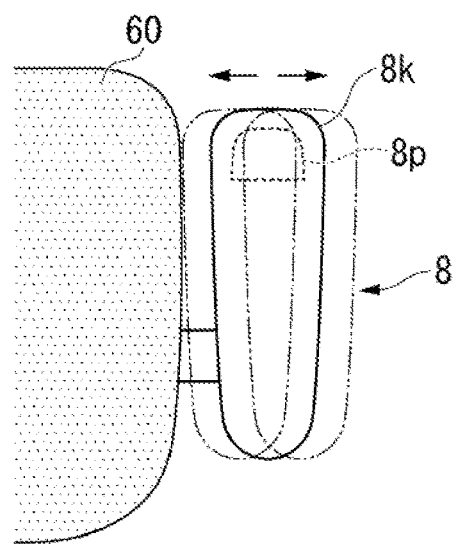
FIG. 6B is a schematic plan view showing the operation of the armrest.
Figure 6C:
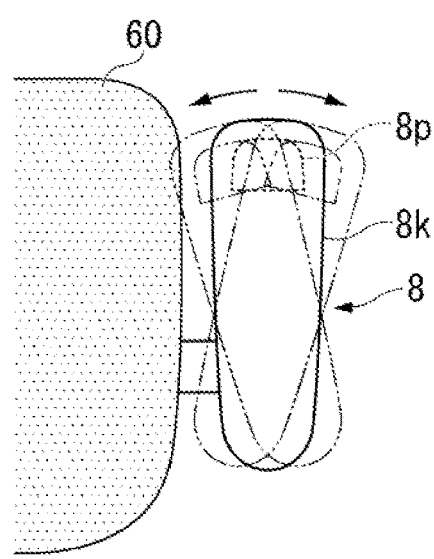
FIG. 6C is a schematic plan view showing the operation of the armrest.

FIGS. 6A to 6C are schematic plan views showing the operation of the armrest 8. In FIGS. 6A to 6C, FIG. 6A is a schematic view showing a case in which the upper layer member 8k is moved in the forward-and-rearward direction, FIG. 6B is a schematic view showing a case in which the upper layer member 8k is moved in the right-and-left direction, and FIG. 6C is a schematic view showing a case in which the upper layer member 8k is rotated along a horizontal plane.

In the case in which the upper layer member 8k is moved in the forward-and-rearward direction (first horizontal direction), since the upper layer member 8k is not movable in the forward-and-rearward direction with respect to the lower layer member 8j and the lower layer member 8j is movable in the forward-and-rearward direction with respect to the support rod 8a, the lower layer member 8j is also moved together with the upper layer member 8k in the forward-and-rearward direction. Therefore, as shown in FIG. 6A, a relative positional relationship between the operation lever 8p provided on the lower layer member 8j and the upper layer member 8k does not change.

In the case in which the upper layer member 8k is moved in the right-and-left direction (second horizontal direction different from the first horizontal direction), since the upper layer member 8k is movable in the right-and-left direction with respect to the lower layer member 8j and the lower layer member 8j is not movable in the right-and-left direction with respect to the support rod 8a, the lower layer member 8j does not move, and only the upper layer member 8k is moved in the right-and-left direction. Therefore, as shown in FIG. 6B, the relative positional relationship between the operation lever 8p provided on the lower layer member 8j and the upper layer member 8k changes.

Figure 7A:
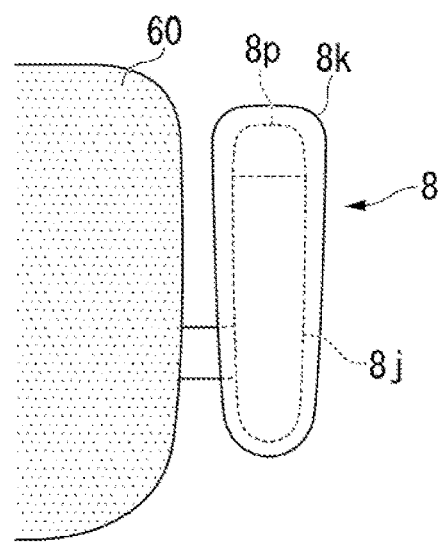
FIG. 7A is a schematic plan view showing an operation in the case in which an upper layer member is moved to a left side or a right side.
Figure 7B:
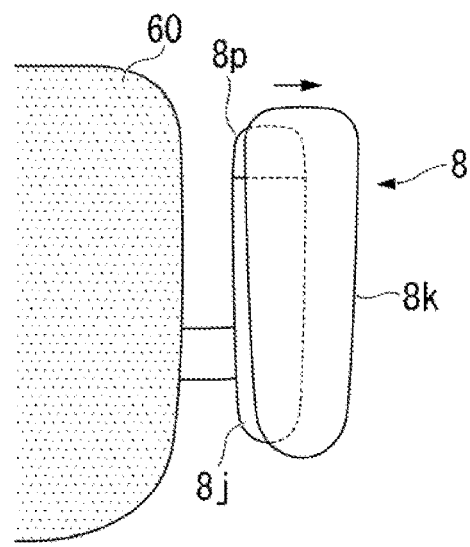
FIG. 7B is a schematic plan view showing the operation in the case in which the upper layer member is moved to the left side or the right side.
Figure 7C:
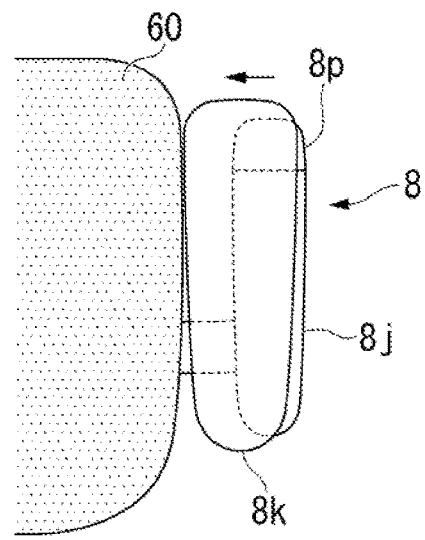
FIG. 7C is a schematic plan view showing the operation in the case in which the upper layer member is moved to the left side or the right side.

FIGS. 7A to 7C are schematic plan views showing the operation in a case in which the upper layer member 8k is moved to the left side or the right side. In FIGS. 7A to 7C, FIG. 7A is a schematic view showing a case in which the upper layer member 8k is located at a base position thereof, FIG. 7B is a schematic view showing a case in which the upper layer member 8k moves to the right side with respect to the base position, and FIG. 7C is a schematic view showing a case in which the upper layer member 8k moves to the left side with respect to the base position. When a position in which a center line of the upper layer member 8k in the right-and-left direction overlaps a center line of the lower layer member 8j in the right-and-left direction is set as the base position of the upper layer member 8k, the upper layer member 8k covers the operation lever 8p from the upper side, as shown in FIG. 7A. Further, as shown in FIGS. 7B and 7C, when the upper layer member 8k moves to the right side or the left side with respect to the base position, a movable range of the upper layer member 8k in the right-and-left direction is set such that a part of the operation lever 8p is exposed upward.

In the case in which the upper layer member 8k is rotated along the horizontal plane, since the upper layer member 8k is not rotatable with respect to the lower layer member 8j and the lower layer member 8j is rotatable with respect to the support rod 8a, the lower layer member 8j is also rotated together with the upper layer member 8k. Therefore, as shown in FIG. 6C, the relative positional relationship between the operation lever 8p provided on the lower layer member 8j and the upper layer member 8k does not change.

The chair 100 and the armrest 8 of the first embodiment as described above include the support rod 8a, the lower layer member 8j supported on the support rod 8a to be movable in the forward-and-rearward direction and including the operation lever 8p to be operated by the seated person, and the upper layer member 8k supported by the lower layer member 8j to be movable in the right-and-left direction. Further, the upper layer member 8k covers the operation lever 8p at the base position in the right-and-left direction. Therefore, when the upper layer member 8k is moved in the forward-and-rearward direction, the lower layer member 8j on which the operation lever 8p is provided is moved together with the upper layer member 8k in the forward-and-rearward direction. That is, when the upper layer member 8k is moved in the forward-and-rearward direction, the upper layer member 8k and the lower layer member 8j are integrally moved. Therefore, the positional relationship between the upper layer member 8k and the operation lever 8p does not change, and the operation lever 8p can be prevented from reaching a position in which it is difficult to perform the operation in the positional relationship with the upper layer member 8k.

Furthermore, when the upper layer member 8k is moved in the right-and-left direction, the lower layer member 8j on which the operation lever 8p is provided is not moved, and the upper layer member 8k is moved with respect to the lower layer member 8j. Accordingly, the positional relationship between the upper layer member 8k and the operation lever 8p can be changed, and the seated person can change a viewing state of the operation lever 8p without changing a posture.

Therefore, in the chair 100 and the armrest 8 according to the first embodiment, when visual recognition of the operation lever 8p is not required, the seated person can adjust a position of the armrest 8 in the forward-and-rearward direction without changing operability with respect to the operation lever 8p by moving the upper layer member 8k in the forward-and-rearward direction. Also, when the visual recognition of the operation lever 8p is requested, the seated person can change the positional relationship between the upper layer member 8k and the operation lever 8p by moving the upper layer member 8k in the right-and-left direction. As described above, according to the chair 100 and the armrest 8 of the first embodiment, it is also possible to change or not to change the relative positional relationship between the upper layer member 8k and the operation lever 8p according to a request of the seated person. Therefore, it is also possible to arbitrarily move the upper layer member 8k in a state in which the operation of the operation lever 8p is facilitated and to arbitrarily move the upper layer member 8k which facilitates the visual recognition of the operation lever 8p in the seated state.

Also, in the chair 100 and the armrest 8 according to the first embodiment, when the upper layer member 8k is moved in the forward-and-rearward direction, the positional relationship between the upper layer member 8k and the operation lever 8p does not change. Generally, according to the chair 100 and the armrest 8 of the first embodiment, since it is considered that position adjustment of the armrest 8 is more frequent in the forward-and-rearward direction than in the right-and-left direction, the positional relationship between the upper layer member 8k and the operation lever 8p does not change at the time of the movement in the forward-and-rearward direction which has high adjustment frequency, and thus convenience of the chair 100 and the armrest 8 can be further improved.

Further, the armrest 8 of the chair 100 is located on an outer side in the right-and-left direction with respect to the seat body 4 (seat) on which the person is seated and is provided at a position lower than an eye level of the seated person. That is, the seated person is located on an inner side in the right-and-left direction and visually recognizes the armrest 8 from the upper side. Therefore, the visual recognition of the operation lever 8p can be easier by moving the upper layer member 8k outward in the right-and-left direction.

Also, in the chair 100 and the armrest 8 according to the first embodiment, the operation lever 8p is provided at the front end of the lower layer member 8j in the forward-and-rearward direction. Therefore, the seated person can operate the operation lever 8p while holding his/her arm on the upper layer member 8k.

Also, in the chair 100 and the armrest 8 according to the first embodiment, the upper layer member 8k is disposed so that at least a part of the operation lever 8p can be exposed upward by moving the upper layer member 8k from the base position in the right-and-left direction. Therefore, the operation lever 8p is exposed upward by moving the upper layer member 8k in the right-and-left direction from the base position. Thus, the operation lever 8p can be more easily viewed.

Although the preferred embodiment of the present invention has been described above with reference to the accompanying drawings, the present invention is not limited to the first embodiment. In the above-described first embodiment, the shapes and combinations of the constituent members shown are merely examples, and various modifications can be made based on design requirements or the like without departing from the gist of the present invention.

For example, in the first embodiment, when the upper layer member 8k moves in the forward-and-rearward direction, it moves together with the lower layer member 8j, and when the upper layer member 8k moves in the right-and-left direction, it moves relative to the lower layer member 8j. However, the present invention is not limited thereto, and when the upper layer member 8k moves in the right-and-left direction, it may move together with the lower layer member 8j, and when the upper layer member 8k moves in the forward-and-rearward direction, it may be moved relative to the lower layer member 8j.

Also, in the first embodiment, when the upper layer member 8k rotates along the horizontal plane, the lower layer member 8j rotates together. However, the present invention is not limited thereto, and when the upper layer member 8k rotates along the horizontal plane, it may be moved relative to the lower layer member 8j. In this case, the operation lever 8p can be easily seen by rotating the upper layer member 8k.

Also, in the first embodiment, the constitution in which a part of the operation lever 8p is exposed upward when the upper layer member 8k is moved in the right-and-left direction with respect to the base position has been described. However, the present invention is not limited thereto, and when the upper layer member 8k is moved in the right-and-left direction with respect to the base position, it is not always necessary for a part of the operation lever 8p to be exposed upward. Even in this case, since the positional relationship between the upper layer member 8k and the operation lever 8p in the right-and-left direction is changed by moving the upper layer member 8k in the right-and-left direction and an amount by which the upper layer member 8k covers the operation lever 8p changes, it is possible to simplify the operation for the seated person to visually recognize the operation lever 8p.

Also, in the first embodiment, the upper layer member 8k covers the operation lever 8p from only the upper side at the base position. However, the present invention is not limited thereto, and it is possible for the upper layer member 8k to cover the operation lever 8p not only from the upper side but also from the front side or the right and left sides at the base position.

Also, in the first embodiment, the constitution in which the operation portion of the present invention is the operation lever 8p has been described. However, the present invention is not limited thereto, and other types such as an operation button may be provided as the operation portion.

Second Embodiment

Hereinafter, a chair according to a second embodiment of the present invention will be described with reference to the drawings.

Figure 8:
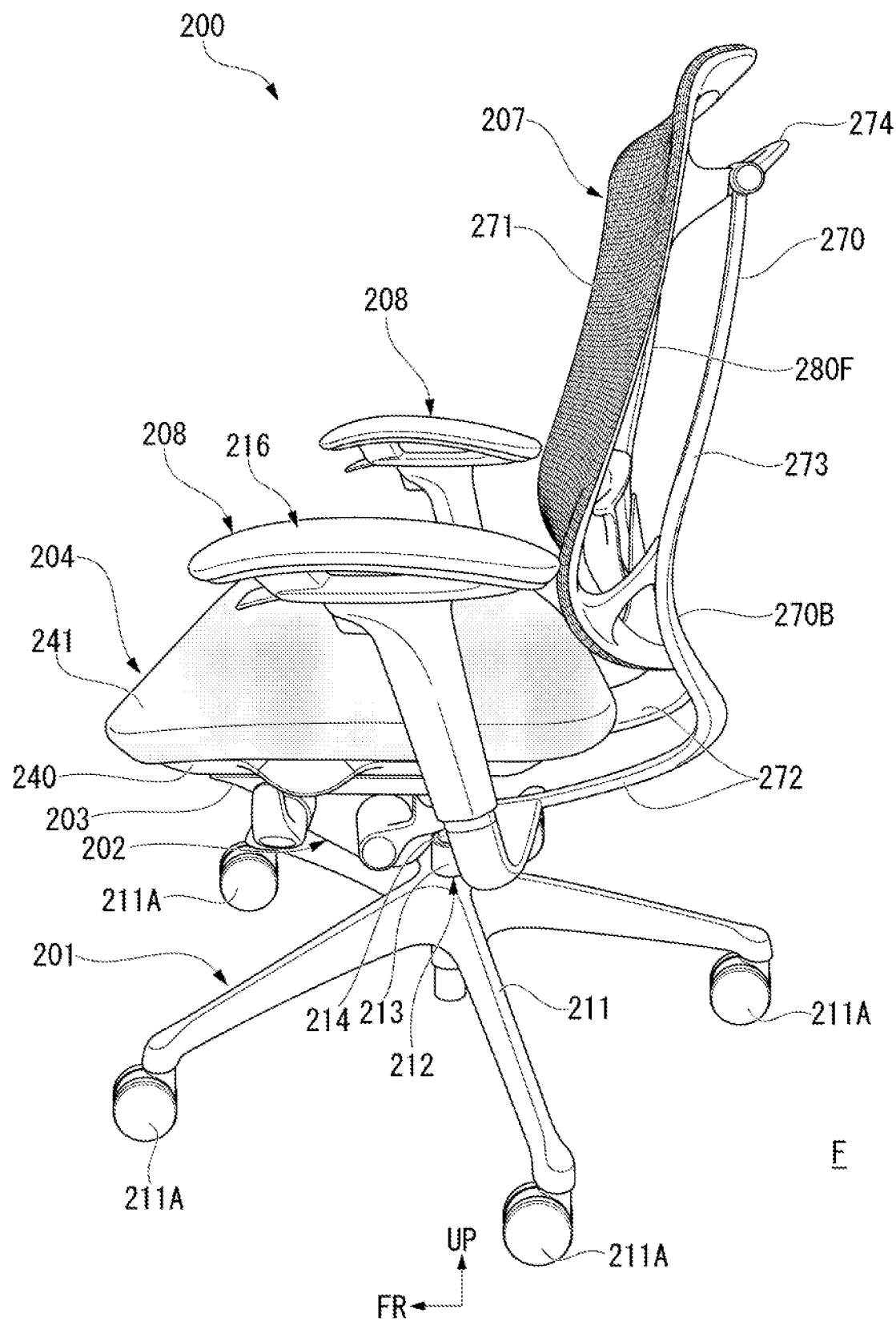
FIG. 8 is a perspective view of a chair according to a second embodiment of the present invention.
Figure 9:
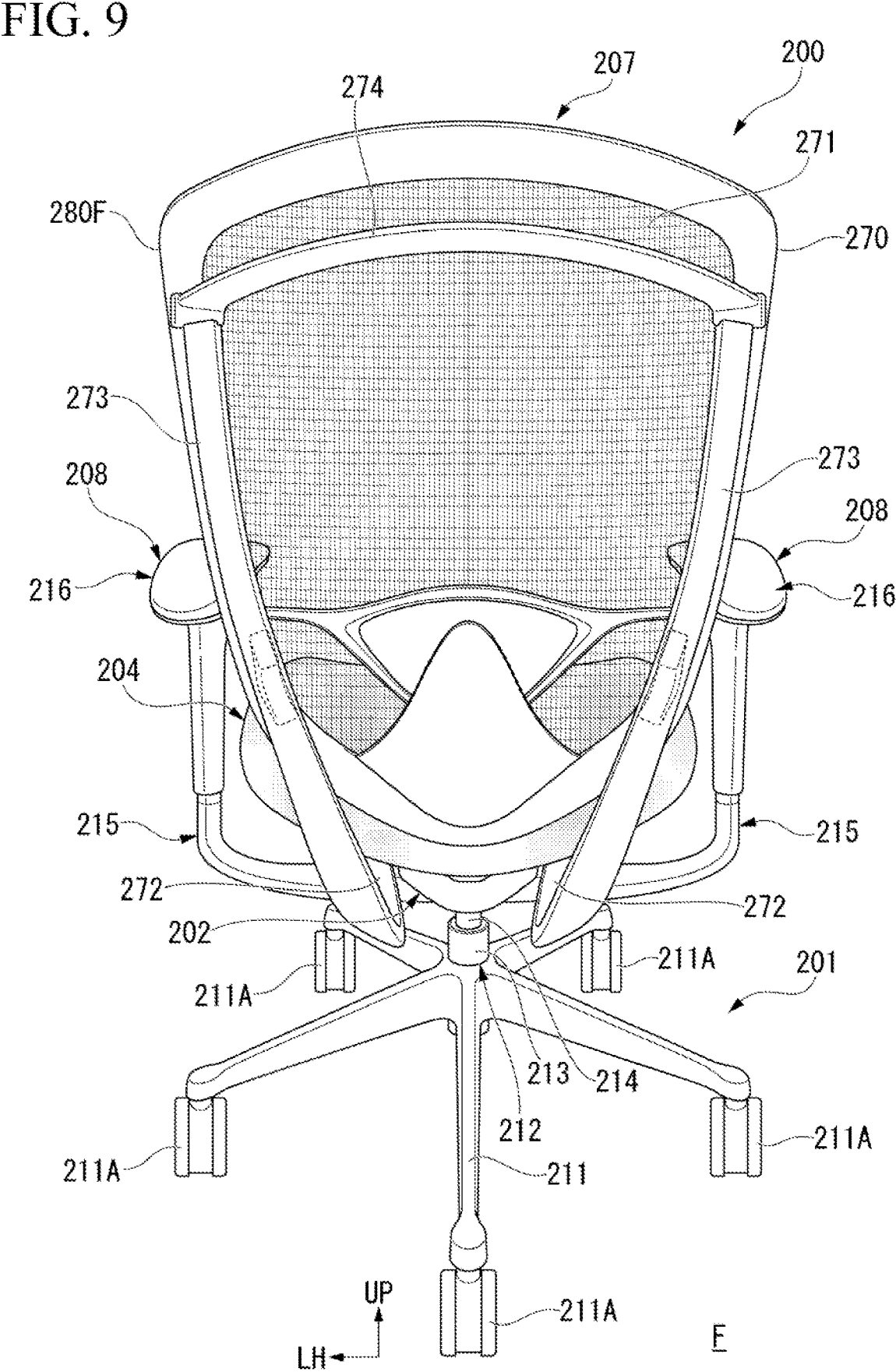
FIG. 9 is a perspective view of the chair according to the second embodiment of the present invention.

FIG. 8 is a view of a chair 200 according to a second embodiment of the present invention when seen from an upper side of a side portion, and FIG. 9 is a view showing the chair 200 according to the second embodiment of the present invention when seen from an upper side (back rest side) of a rear portion.

As shown in FIGS. 8 and 9, a chair 200 includes a leg portion 201 installed on a floor surface F, a box-shaped support base 202 installed on an upper portion of the leg portion 201, a seat receiving member 203 installed on an upper portion of the support base 202, a seat body 204 supported on the seat receiving member 203 to be slidable forward and rearward and on which a person sits, a back rest 207 extending from the support base 202 to an upper side of a rear portion of the seat body 204 and supporting a back of the person seated on the seat body 204, and a pair of armrests 208 disposed in the vicinity of an extending portion of the back rest 207 from the support base 202 and extending upward from right and left sides of the seat body 204.

In the following description, for convenience, a direction in which the person seated on the seat body 204 faces forward is referred to as "frontward," and an opposite direction is referred to as "rearward". Also, a direction connecting the floor surface F-side on which the chair 200 is installed to the opposite side is referred to as a "vertical direction". Also, a width direction of the chair 200, that is, a horizontal direction orthogonal to a forward-and-rearward direction is referred to as a "width direction". Further, in the drawing, the forward direction is indicated by an arrow FR, an upward direction is indicated by an arrow UP, and a left side of the width direction is indicated by an arrow LH.

The leg portion 201 has multi-branched legs 11 with a caster 211A, and a leg post 212 standing up from a center of the multi-branched legs 211 and in which a gas spring (not shown) is built as a lifting mechanism.

An outer cylinder 213 constituting a lower portion of the leg post 212 is fitted to and supported on the multi-branched leg 211 in a non-rotatable manner. An inner cylinder 214 constituting an upper portion of the leg port 212 fixes and supports the support base 202 at an upper end thereof, and a lower portion thereof is supported by the outer cylinder 213 to be rotatable in the horizontal direction.

A lifting adjustment mechanism of the leg post 212 and a tilt adjustment mechanism of the back rest 207 are built in the support base 202.

The seat receiving member 203 includes four link arms (not shown) installed on the upper portion of the support base 202, and a pair of right and left fixed frames (not shown) for connecting the link arms to each other.

The seat body 204 has a seat frame 240 and a tension member 241 stretched around the seat frame 240. An upper surface of the tension member 241 serves as a load supporting surface which receives a load of the seated person.

The back rest 207 has a back frame 270 and a tension member 271 stretched around the back frame 270. A front surface of the tension member 271 serves as a load supporting surface which receives the load of the seated person.

The back frame 270 includes a rear frame 270B of which a lower end is connected to the support base 202, and a front frame 280F provided in front of the rear frame 270B.

The rear frame 270B has a pair of right and left lower side portions 272, a side portion 273, and an upper side portion 274 which connects the right and left lower side portions 273 to each other. The lower side portions 272, the side portion 273 and the upper side portion 274 are formed integrally of, for example, a metal such as an aluminum alloy or a resin having a predetermined strength.

The right and left lower side portions 272 are connected to the tilt adjustment mechanism in the support base 202 and extend rearward from both right and left sides of a rear portion of the support base 202. The lower side portions 272 are gradually inclined upward toward a rear side. Also, the armrest 208 which will be described later and which is disposed laterally of the seat body 204 is provided on a side surface of each of the lower side portions 272 on an outer side in the width direction of the chair.

The side portion 273 is continuously formed at a rear end of each of the lower side portions 272. The right and left side portions 273 are inclined toward an outer side in the width direction of the chair so that a separation width between the side portions 273 gradually increases toward an upper side.

The armrest 208 is provided on each of a left side and a right side of the chair 200 in the width direction. These armrests 208 including an armrest installed on the left side of the chair 200 and an armrest installed on the right side of the chair have a bilaterally symmetrical shape. Therefore, in the following description, the armrest 208 installed on the right side of the chair 200 will be described in detail with reference to the drawings, and a description of the armrest 208 installed on the left side of the chair 200 will be omitted.

Figure 10:
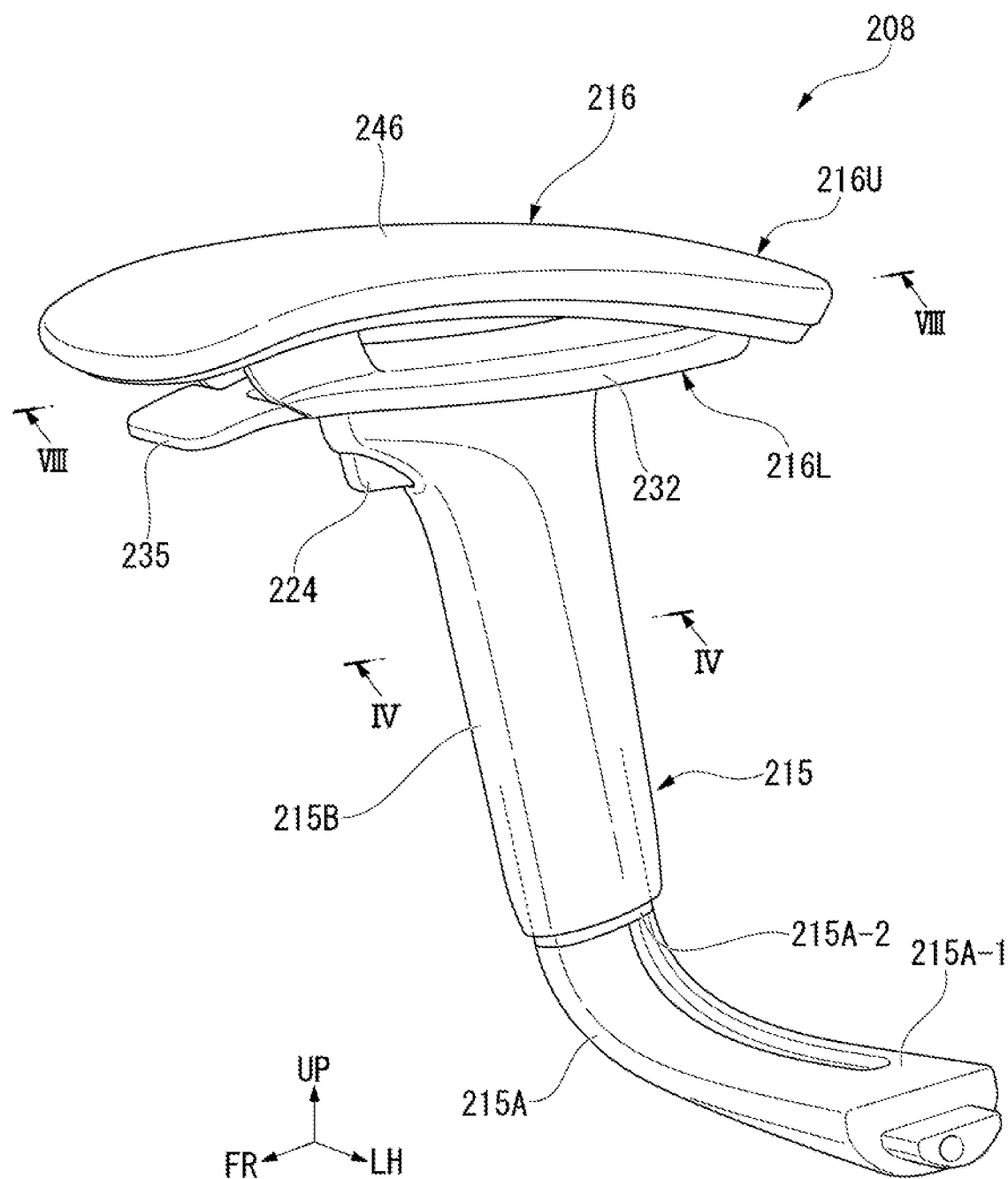
FIG. 10 is a perspective view of an armrest according to the second embodiment of the present invention.
Figure 11:
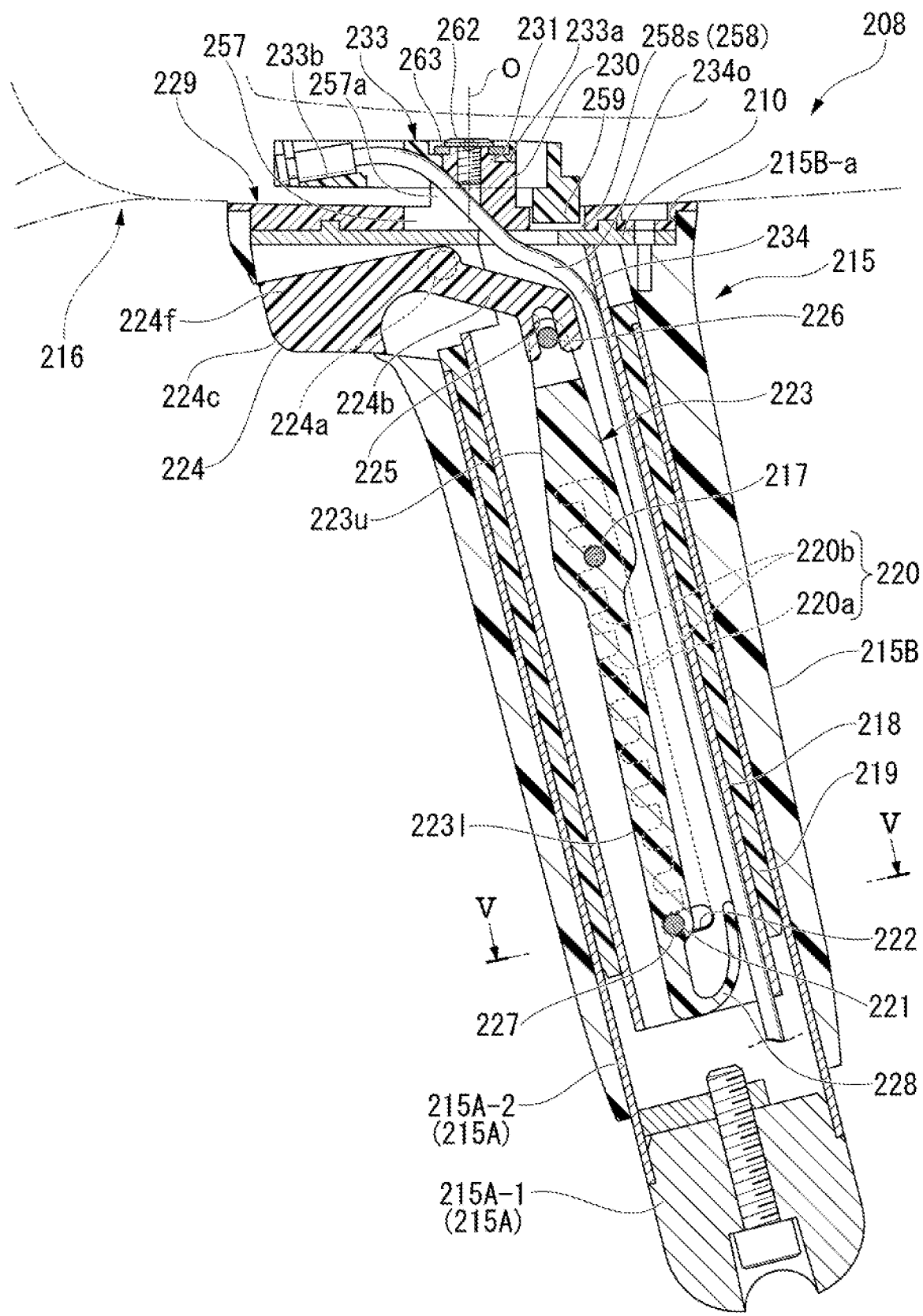
FIG. 11 is a cross-sectional view of the armrest according to the second embodiment of the present invention which is taken along line IV-IV of FIG. 10.
Figure 12:
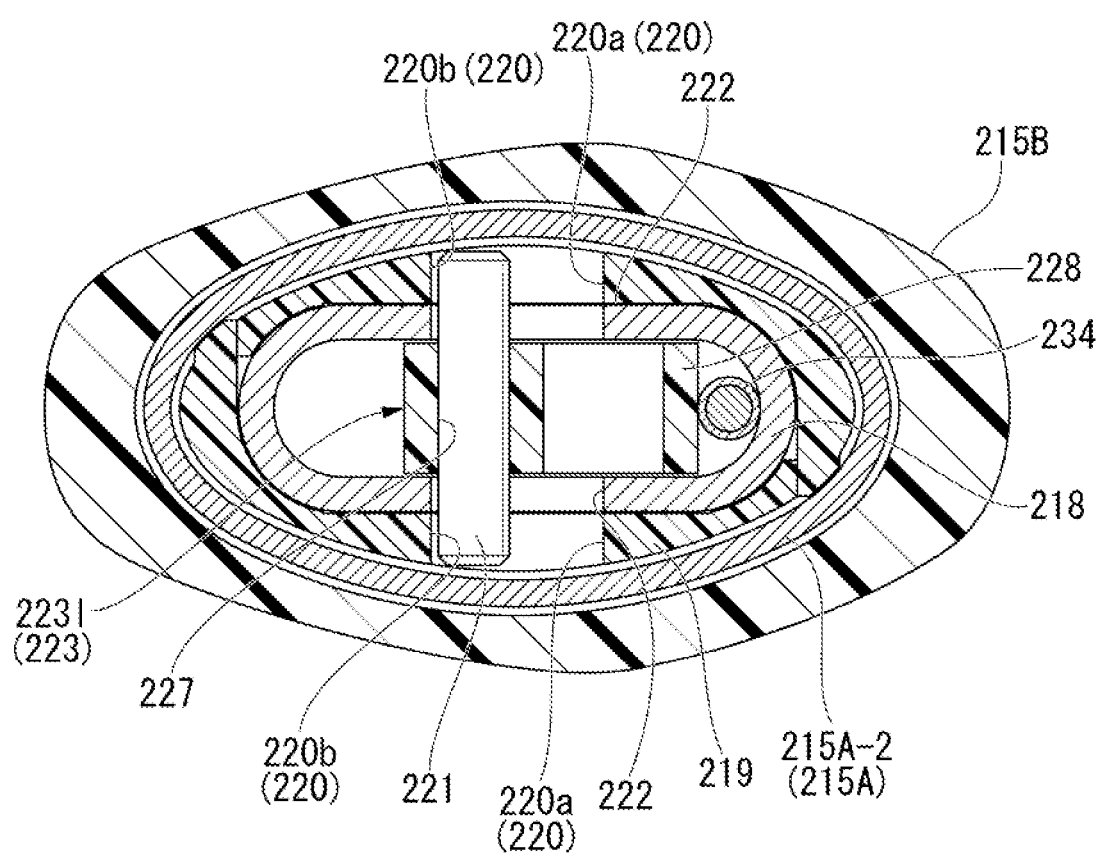
FIG. 12 is a cross-sectional view of the armrest according to the second embodiment of the present invention which is taken along line V. V of FIG. 11.
Figure 13:
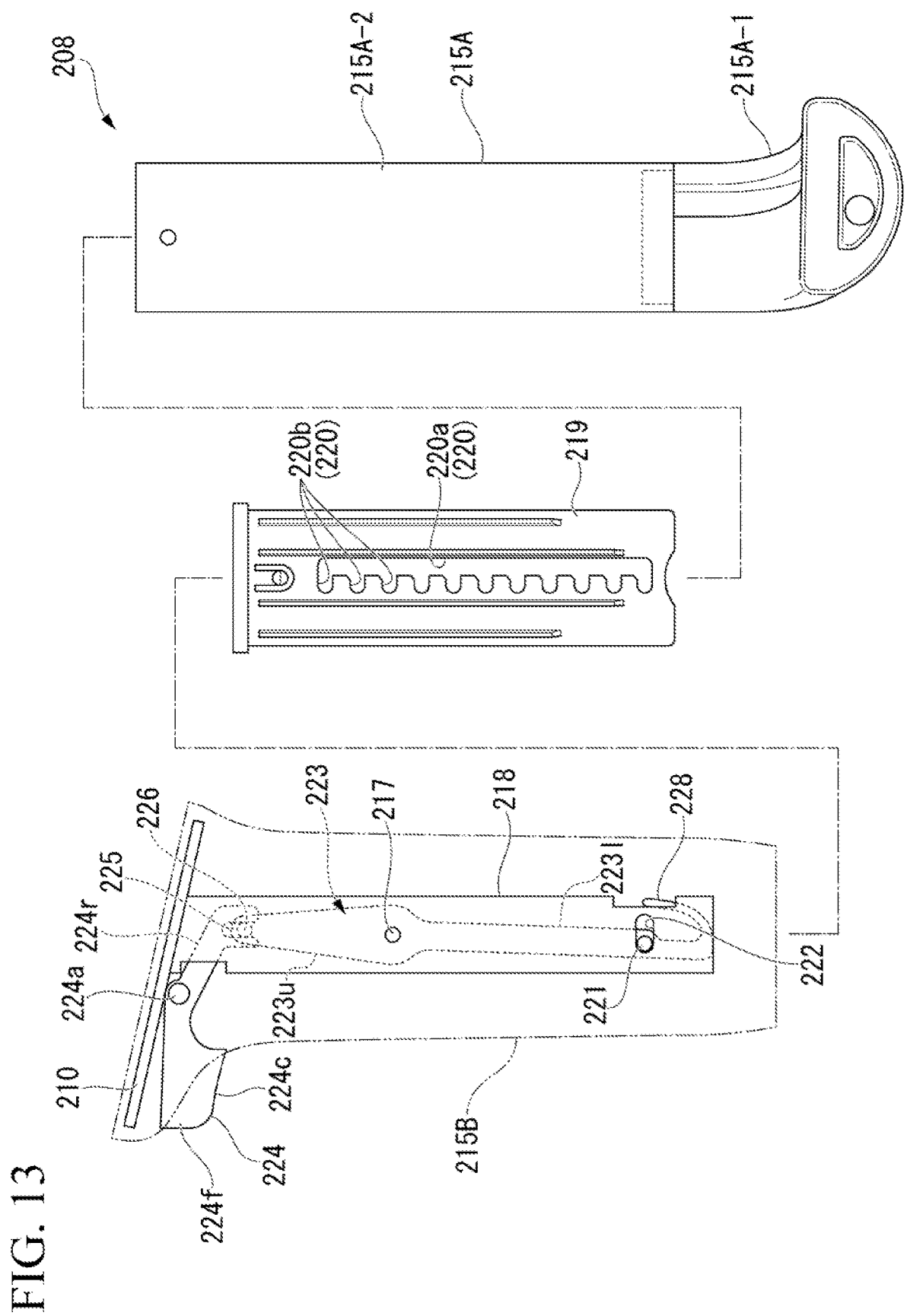
FIG. 13 is an exploded side view of the armrest according to the second embodiment of the present invention.

FIG. 10 is a view of the armrest 208 on the right side when seen from the upper side of an inner side of the chair in the width direction, and FIG. 11 is a cross-sectional view of the armrest 208 on the right side which is taken along line IV-IV of FIG. 10. Also, FIG. 12 is a cross-sectional view of the armrest 208 on the right side which is taken along line V-V of FIG. 11, and FIG. 13 is a view showing the armrest 208 on the right side when disassembled and seen from the inner side of the chair in the width direction.

The armrest 208 includes an armrest support 215 (support structure) which has an L shape in a front view and extends outward from the lower side portion 272 of the rear frame 270B to the outer side in the width direction of the chair, is then curved upward and extends, and an armrest main body 216 supported by an upper end of the armrest support 215 and extending in the forward-and-rearward direction.

The armrest support 215 includes a lower support column 215A of which a lower end is connected to the lower side portion 272 of the rear frame 270B, and a lifting cylinder 215B externally fitted in an upper region of the lower support column 215A to be slidable in the substantially vertical direction. The lifting cylinder 215B is formed to perform a lifting adjustment operation with respect to the lower support column 215A fixed to the lower side portion 272 of the back rest 207.

The armrest main body 216 is a member in which an elbow or an arm of the seated person is placed on an upper surface thereof and is installed on an upper portion of the armrest support 215 to allow forward and rearward movement, right and left movements and oscillating movement (rotation) in the substantially horizontal direction.

The lower support column 215A includes a support column base 215A-1 which extends outward from the lower side portion 272 of the rear frame 270B in the width direction of the chair and is then curved upward, and a support column pipe 215A-2 which is fixed to an upper end of the support column base 215A-1 in a fitted state. The support column base 215A-1 is formed of a solid metal member made of, for example, an aluminum alloy. The support column pipe 215A-2 is formed of a metal pipe having a substantially elliptical cross section which is long in the forward-and-rearward direction. An inner sleeve 219 formed of a resin is attached to an inner surface of the support column pipe 215A-2. The inner sleeve 219 is fixed to the support column pipe 215A-2 by, for example, a snap fit or the like.

In the lifting cylinder 215B, an upper portion thereof is enlarged stepwise, and a region thereof lower than the enlarged portion is formed in a cylindrical shape having a substantially elliptical cross section. The lifting cylinder 215B is integrally formed of, for example, a resin. The support column pipe 215A-2 is fitted inside an elliptical inner circumferential portion of the lifting cylinder 215B to be slidable in a longitudinal direction. Also, an inner pipe 218 formed of a metallic material having a substantially elliptic cross section and fitted slidably inside the inner sleeve 219 is disposed inside the lifting cylinder 215B. An upper end of the inner pipe 218 is fixed to a top plate 210, and the top plate 210 is fixed in a recessed portion 215B-a provided in an upper surface of the lifting cylinder 215B. Therefore, the inner pipe 218 is fixed and installed in the lifting cylinder 215B via the top plate 210.

The inner sleeve 219 fixed in the support column pipe 215A-2 has a height adjustment slit 220 formed in right and left side walls thereof. The height adjustment slit 220 includes a lifting guide slit 220a which extends in an axial direction (approximately vertical direction) of the inner sleeve 219, and a plurality of locking slits 220b which extend forward from the lifting guide slit 220a. The plurality of locking slits 220b are formed at substantially regular intervals in the axial direction (approximately vertical direction) of the inner sleeve 219.

An elongated hole-shaped pin moving hole 222 which is long in the forward-and-rearward direction is formed in a region near lower ends of right and left side walls of the inner pipe 218. A locking pin 221 which can be locked to one of the locking slits 220b of the height adjustment slit 220 of the inner sleeve 219 is held in the right and left pin moving holes 222. Both ends of the locking pin 221 protrude laterally from the right and left pin moving holes 222 of the inner pipe 218, and the right and left ends protruding from the pin moving holes 222 can be locked to one of the locking slits 220b of the height adjustment slit 220. Both side portions of the locking pin 221 are held in the right and left pin moving holes 222 to be movable forward and rearward.

When the locking pin 221 moves to a front end side of the pin moving hole 222, both ends are locked to one of the locking slits 220b of the height adjustment slit 220. At this time, the lifting of the armrest main body 216 is locked by the lifting cylinder 215B and the inner pipe 218, which are integral with the armrest main body 216, being locked to one of the locking slits 220b of the height adjustment slit 220 through the locking pin 221. In this armrest 208, a fixing height of the armrest main body 216 can be adjusted in multiple stages by changing the locking slit 220b for locking the locking pin 221 to one of them.

Further, when the locking pin 221 moves to a rear end side of the pin moving hole 222, it releases the locking due to the locking slit 220b and reaches an inner side of the lifting guide slit 220a. At this time, lifting lock of the armrest main body 216 is released, and the armrest main body 216 can be lifted up and down freely.

A support shaft 217 which extends substantially in the width direction of the chair is held in a region near upper portions of the right and left side walls of the inner pipe 218. A swing lever 223 disposed in the inner pipe 218 is rotatably supported by the support shaft 217. The swing lever 223 includes an upward extending portion 223u which extends upward from a shaft support portion of the support shaft 217, and a downward extending portion 223l which extends downward of the shaft support portion. An engagement pin 226 which slidably engages with a rear lower engagement groove 225 of a lifting operation lever 224 which will be described later is held at an upper end of the upward extending portion 223u. A pin holding portion 227 which holds the locking pin 221 is provided at a lower edge portion of the downward extending portion 223l. A spring piece 228 which extends downward from the pin holding portion 227 and is then curved arcuately upward from a rear portion of a lower end thereof is provided below the pin holding portion 227 of the downward extending portion 223l.

The top plate 210 fixed to the upper end of the inner pipe 218 overhangs largely around the inner pipe 218 in a plan view, particularly in the forward-and-rearward direction. A pivot 224a of the lifting operation lever 224 for operating the swing lever 223 is disposed below the overhanging portion of the top plate 210 on the front side. The pivot 224a of the lifting operation lever 224 is rotatably supported by a side wall on an upper side of the lifting cylinder 215B. The lifting operation lever 224 includes the above-described pivot 224a, a forward extending portion 224f which extends forward of the pivot 224a, and a rearward extending portion 224b which extends rearward of the pivot 224a. An operation portion 224c which protrudes to an outer side of the upper end of the lifting cylinder 215B and enables a user to push it upward is provided at a front lower portion of the forward extending portion 224f. The rear lower engagement groove 225 which engages with the engagement pin 226 located at an upper end of the swing lever 223 is provided below a rear end of the rearward extending portion 224b.

The swing lever 223 is biased to displace the lower end forward by the rear upper end of the spring piece 228 coming into contact with an inner wall of the inner pipe 218 from the front (including a case in which it comes into contact with the inner pipe 218 via an operation cable 234 passing through the inner pipe 218). At this time, the locking pin 221 moves to the front end of the pin moving hole 222 and engages with one of the locking slits 220b of the height adjustment slit 220. When a lower end of the swing lever 223 is biased forward, the upper end of the swing lever 223 is displaced rearward to displace a rear end of the rearward extending portion 224b of the lifting operation lever 224 upward, and thus the operation portion 224c protrudes to an outer side of the upper end of the lifting cylinder 215B. When the operation portion 224c is pushed upward by an operator, the rear end of the lifting operation lever 224 displaces the upper end of the swing lever 223 forward and displaces the lower end of the swing lever 223 rearward against a biasing force of the spring piece 228. Then, the locking pin 221 moves to the rear end of the pin moving hole 222, releases the locking to the locking slit 220b of the height adjustment slit 220, reaches the inner side of the lifting guide slit 220a and allows the armrest main body 216 to be lifted up and down freely.

An end plate 229 is installed on an upper surface of the lifting cylinder 215B to form the upper end surface of the lifting cylinder 215B. A part of a lower surface side of the end plate 229 is inserted into a recessed portion 215B-a and is fastened to the lifting cylinder 215B in a state in which it overlaps with an upper surface of the top plate 210.

In the second embodiment, the end plate 229 constitutes an upper wall portion of a support structure of the armrest 208.

Figure 14:
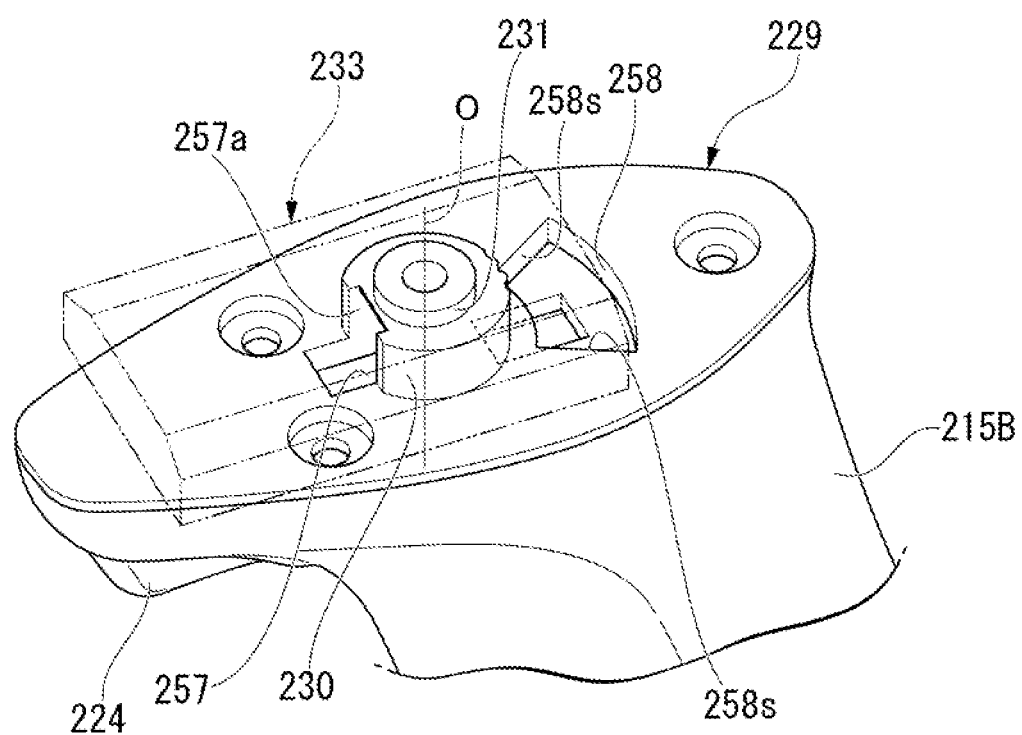
FIG. 14 is a perspective view of a support structure according to the second embodiment of the present invention.
Figure 15:
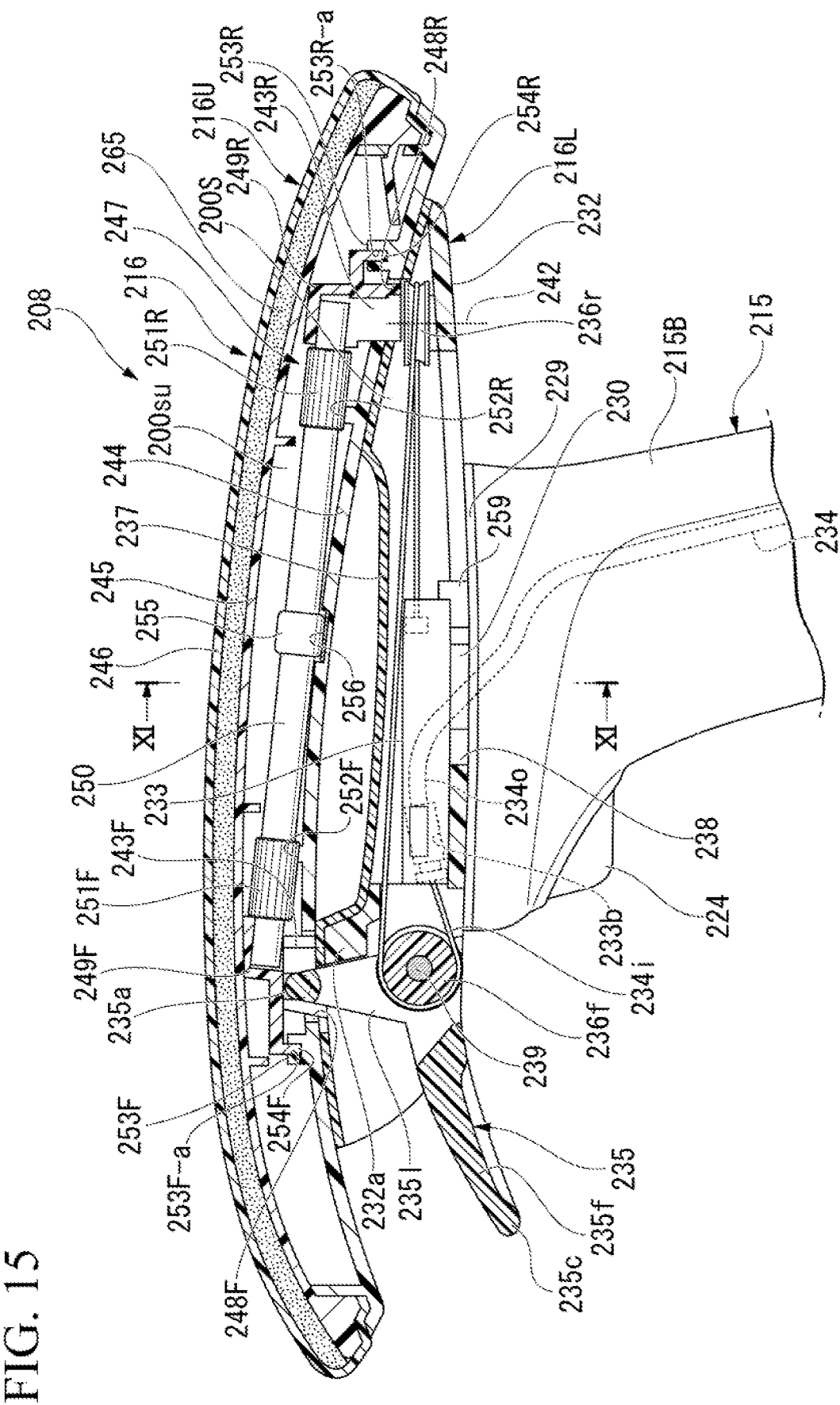
FIG. 15 is a cross-sectional view of the armrest according to the second embodiment of the present invention which is taken along line VIII-VIII of FIG. 10.

FIG. 14 is a view of the lifting cylinder 215B in which the end plate 229 is installed on an upper portion thereof when seen diagonally from an inner upper side in the width direction of the chair, and FIG. 15 is a view showing the armrest main body 216 in a cross section taken along line VIII-VIII in FIG. 10.

As shown in FIG. 14, in a plan view, a swollen portion 230 having a short axis cylindrical shape and a small diameter portion 231 having a short axis cylindrical shape of which an outer diameter is smaller than that of the swollen portion 230 are provided at an approximate center of the end plate 229 in a protruding manner.

The small diameter portion 231 protrudes stepwise from an upper surface of the swollen portion 230, and the swollen portion 230 and the small diameter portion 231 are formed so that axial centers o thereof match each other. In the second embodiment, the swollen portion 230 and the small diameter portion 231 constitute a pivot portion. The armrest main body 216 is rotatably supported by upper portions of the small diameter portion 231 and the swollen portion 230 of the end plate 229. As shown in FIG. 15, the armrest main body 216 includes a lower unit 216L placed on the end plate 229, and an upper unit 216U placed on the lower unit 216L.

Figure 16:
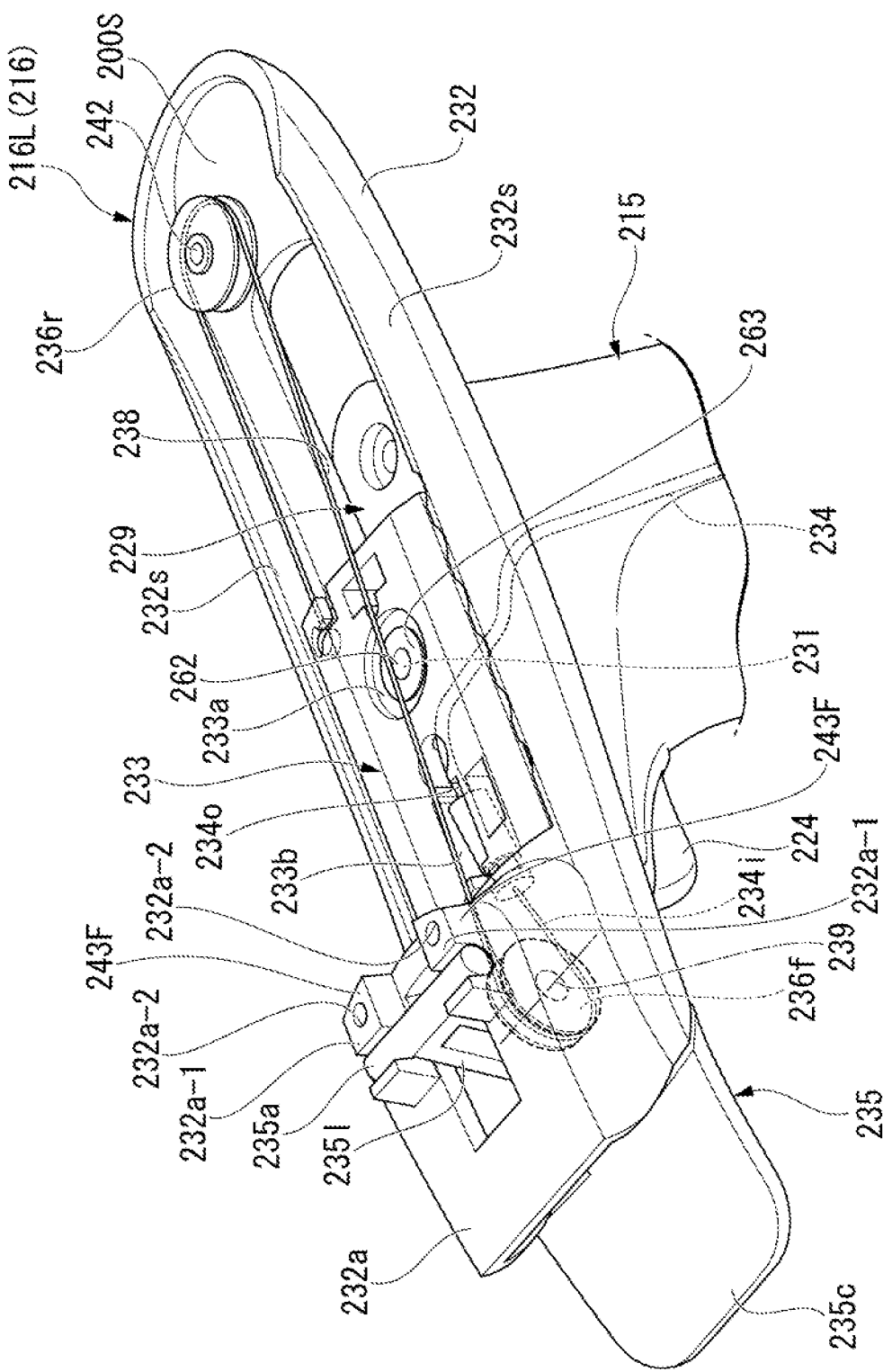
FIG. 16 is a perspective view showing a state in which some components of the armrest according to the second embodiment of the present invention are removed.

FIG. 16 is a view of the armrest 208 from which a cover member 237 of the lower unit 216L has been removed when seen diagonally from an inner upper side in the width direction of the chair.

The lower unit 216L includes a base member 232 placed on the end plate 229 while forming an accommodation space 200s opened at an upper side thereof and projecting the small diameter portion 231 into the accommodation space 200s, a clamping block 233 which is engaged with the base member 232 in the accommodation space 200s to be relatively non-rotatable and relatively movable (slidable) only in one direction and is rotatably supported by the small diameter portion 231 and the swollen portion 230 via a bearing portion 233a, an operation lever 235 which remotely operates a mechanism inside the support base 202 via the operation cable 234, a front pulley 236f and a rear pulley 236r which wind an inner cable 234i of the operation cable 234 in the lower unit 216L, and a cover member 237 which closes the upper opening portion of the accommodation space 200s.

In the base member 232, side walls 232s which stand substantially in the forward-and-rearward direction extend from the right and left of a substantially rectangular bottom wall elongated in the forward and rearward. Further, a front stepped portion 232a which rotatably supports the operation lever 235 is formed on a front portion side of the base member 232 to protrude upward. An elongated hole-shaped insertion hole 238 through which the swollen portion 230 and the small diameter portion 231 of the end plate 229 are inserted upward is provided in the bottom wall of the base member 232.

The clamping block 233 is formed in a flat rectangular parallelepiped shape in which a height thereof in the vertical direction (a direction along the axis o of the small diameter portion 231 and the swollen portion 230) is limited. In the clamping block 233, the bearing portion 233a is rotatably fitted to the small diameter portion 231 and the swollen portion 230 of the end plate 229 passing upward through the insertion hole 238 of the base member 232, and in this state, the clamping block 233 is fixed to the end plate 229 via the washer 263 and the bolt 262. In this state, right and left end surfaces of the clamping block 233 are slidably in contact with inner faces of the right and left side walls 232s of the base member 232.

In the second embodiment, the right and left end surfaces of the clamping block 233 and the inner surfaces of the side walls 232s of the base member 232 constitute a guide mechanism which allows only relative movement of the clamping block 233 and the base member 232 in one direction which is substantially horizontal. Also, the small diameter portion 231 and the swollen portion 230 of the end plate 229 and the bearing portion 233a of the clamping block 233 constitutes a rotation mechanism which connects the armrest main body 216 to the armrest support 215 (support structure) to be rotatable in the substantially horizontal direction.

Figure 17:
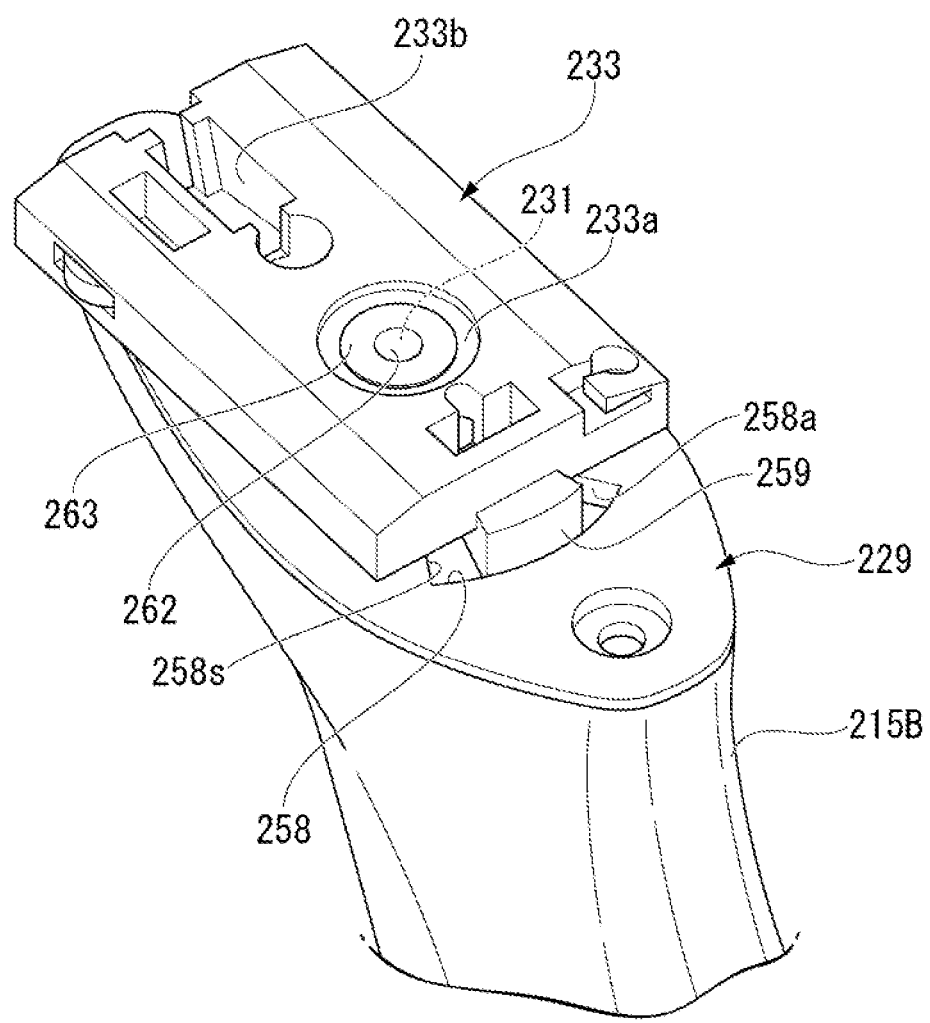
FIG. 17 is a perspective view showing the state in which some of the components of the armrest according to the second embodiment of the present invention are removed.
Figure 18:
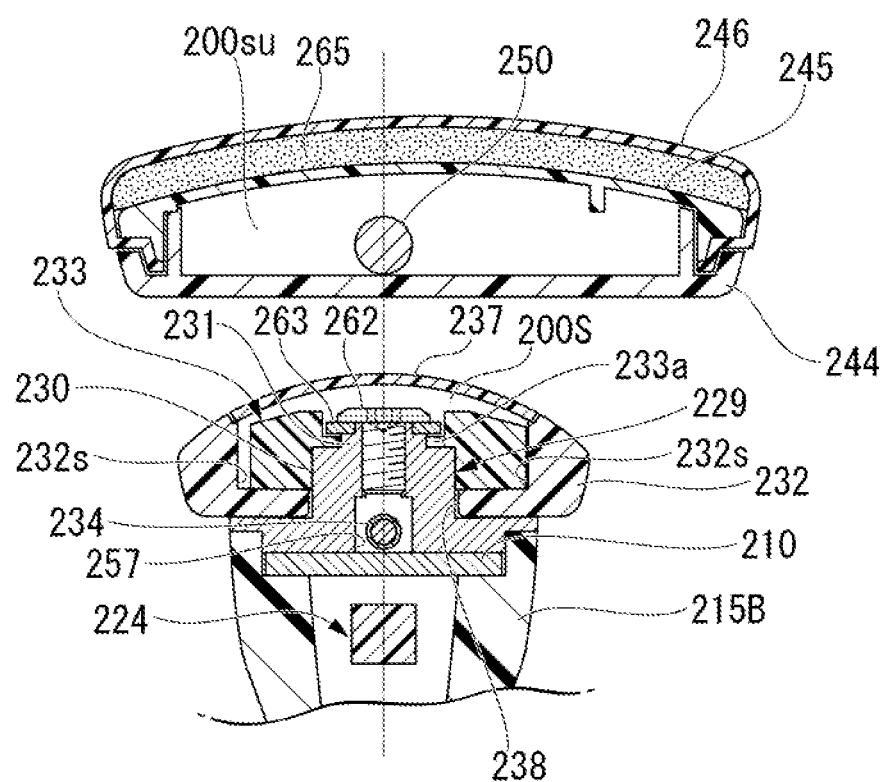
FIG. 18 is a cross-sectional view of the armrest according to the second embodiment of the present invention which is taken along line XI-XI of FIG. 15.

FIG. 17 is a perspective view showing a state in which only the clamping block 233 on the armrest main body 216 is assembled on an upper portion of the armrest support 215, and FIG. 18 a view showing the armrest 208 in a cross section taken along line XI-XI of FIG. 15.

The end plate 229 includes a cable insertion portion 257 which causes the operation cable 234 to pass below the axis o of the small diameter portion 231 from an inside of the armrest support 215 (support structure) and guides the operation cable 234 from the vicinity of the small diameter portion 231 into an inside of the armrest main body 216. The cable insertion portion 257 is constituted of a continuous hole which extends from a lower surface of the small diameter portion 231 of the end plate 229 on the rear side of the axis o to an upper surface of the small diameter portion 231 of the end plate 229 on the front side of the axis o and to a front surface of the swollen portion 230. A part of an arcuate surface of a front portion of the swollen portion 230 is cut out to be flat, and an opening 257a of the cable insertion portion 257 which faces the inside of the armrest main body 216 is formed to straddle a flat surface of the swollen portion 230 on the front side and an upper surface of the end plate 229 on the front side.

Further, the end plate 229, and the clamping block 233 rotatably connected to the upper portions of the small diameter portion 231 and the swollen portion 230 of the end plate 229 are provided with a rotation restricting mechanism which restricts a relative rotation angle therebetween. The rotation restricting mechanism includes right and left side walls 258s of a substantially fan-shaped rotation allowance hole 258 formed on the rear side of the swollen portion 230 of the end plate 229 (the side opposite to the opening 257a of the cable insertion portion 257, the axis o of the small diameter portion 231 being disposed between the side and the opening 257a), and a substantially fan-shaped displacement restricting protrusion 259 protruding downward from the clamping block 233 and inserted into the rotation allowance hole 258.

In the second embodiment, the right and left side walls 258s of the rotation allowance hole 258 formed in the end plate 229 constitute a rotation restricting element on the support structure of the rotation restricting mechanism, and the displacement restricting protrusion 259 protruding from the clamping block 233 constitutes a rotation restricting element on the armrest main body 216 of the rotation restricting mechanism. The right and left side walls 258s of the rotation allowance hole 258 constituting the rotation restricting element on the support structure, and the displacement restricting protrusion 259 constituting the rotation restricting element on the armrest main body 216 are disposed inside the armrest support 215 which is the support structure.

Here, the displacement restricting protrusion 259 provided on the clamping block 233 passes through the insertion hole 238 of the bottom wall of the base member 232 disposed between the clamping block 233 and the end plate 229 downward from above and protrudes into the rotation allowance hole 258 in the end plate 229 in that state. The insertion hole 238 of the bottom wall of the base member 232 is an elongated hole which projects the swollen portion 230 and the small diameter portion 231 of the end plate 229 above the base member 232. However, in the second embodiment, the same insertion hole 238 is used as a hole for allowing the displacement restricting protrusion 259 to protrude below the base member 232.

The operation lever 235 is formed in an L shape in a side view. The operation lever 235 includes a support shaft 235a which extends in the right-and-left direction and is rotatably supported by the front stepped portion 232a of the base member 232, a downward extending portion 235l which extends downward from the support shaft 235a, and a forward extending portion 235f which extends forward from a lower end of the downward extending portion 235l. The operation lever 235 is formed to swing around the support shaft 235a in a swing space inside the front stepped portion 232a. A front portion of the forward extending portion 235f is an operation portion 235c which protrudes forward of a lower portion of the front stepped portion 232a. The operation portion 235c is located below a front portion of the upper unit 216U of the armrest main body 216. The operation portion 235c is formed so that a user whose an arm is placed on the upper unit 216U can pull it up with a fingertip.

The front pulley 236f is rotatably supported by a lower end of the downward extending portion 235l of the operation lever 235 via a support shaft 239 extending in the right-and-left direction. When the downward extending portion 235l rotates forward and upward due to the pulling-up operation of the operation portion 235c of the operation lever 235, the front pulley 236f moves forward and upward in accordance with the rotation of the downward extending portion 235l.

The rear pulley 236r is rotatably supported by the rear end of the bottom wall of the base member 232 via a support shaft 242 extending in the vertical direction.

The operation cable 234 includes an outer cable 234o and an inner cable 234i. The operation cable 234 extends from the support base 202 through an inside of the armrest support 215 and reaches an inside of the lower unit 216L of the armrest main body 216. A tip end of the outer cable 234o of the operation cable 234 is engaged with an outer cable engaging portion 233b formed at the clamping block 233. The inner cable 234i of the operation cable 234 extends forward from the tip end of the outer cable 234o, wound upward from the lower side on the front pulley 236f and then turned rearward. The inner cable 234i is turned rearward by the front pulley 236f, then wound around the rear pulley 236r from one side to the other side (in the drawing, the outside from the inside in the width direction) in the width direction and turned back to the front side.

After the inner cable 234i is turned back to the front side by the rear pulley 236r, a tip end thereof is locked to an outer side of the rear end of the clamping block 233 in the width direction.

In the above-described constitution, when the operation portion 235c of the operation lever 235 is pulled up, the front pulley 236f moves forward and upward to draw out the inner cable 234i and actuates the mechanism inside the support base 202.

Here, the front pulley 236f also moves in the forward-and-rearward direction when the armrest main body 216 is moved in the forward-and-rearward direction. However, at this time, the front pulley 236f moves forward and rearward in front of the tip end of the outer cable 234o, and the rear pulley 236r moves forward and rearward behind the tip end of the inner cable 234i. Therefore, even when the length of the inner cable 234i in front of the tip end of the outer cable 234o increases or decreases, the length of the inner cable 234i behind the tip end of the inner cable 234i decreases or increases by the same amount. Accordingly, a change in the drawing length of the inner cable 234*i* is limited, and thus the inner cable 234*i* is prevented from being pulled when the armrest main body 216 moves forward, or the inner cable 234*i* is prevented from being loosened when the armrest main body 216 moves rearward.

A front side support block 243F and a rear side support block 243R protrude upward in a front side region and an upper side region of the cover member 237 of the lower unit 216L. An upper portion of each of the front side support block 243F and the rear side support block 243R protrudes into the upper unit 216U of the armrest main body 216.

The upper unit 216U includes an upper base member 244 disposed on the cover member 237 of the lower unit 216L, an upper cover member 245 which overlaps the upper base member 244 with an accommodation space 200*su* therebetween, a pad member 246 which covers the upper cover member 245 from an upper side, and a cushion member 265 interposed between the upper cover member 245 and the pad member 246 and formed of urethane or the like. The upper unit 216U has a gentle curved shape which protrudes upward in a side view, and a front portion thereof is inclined forward and downward, and a rear portion thereof is inclined rearward and downward.

Figure 19:
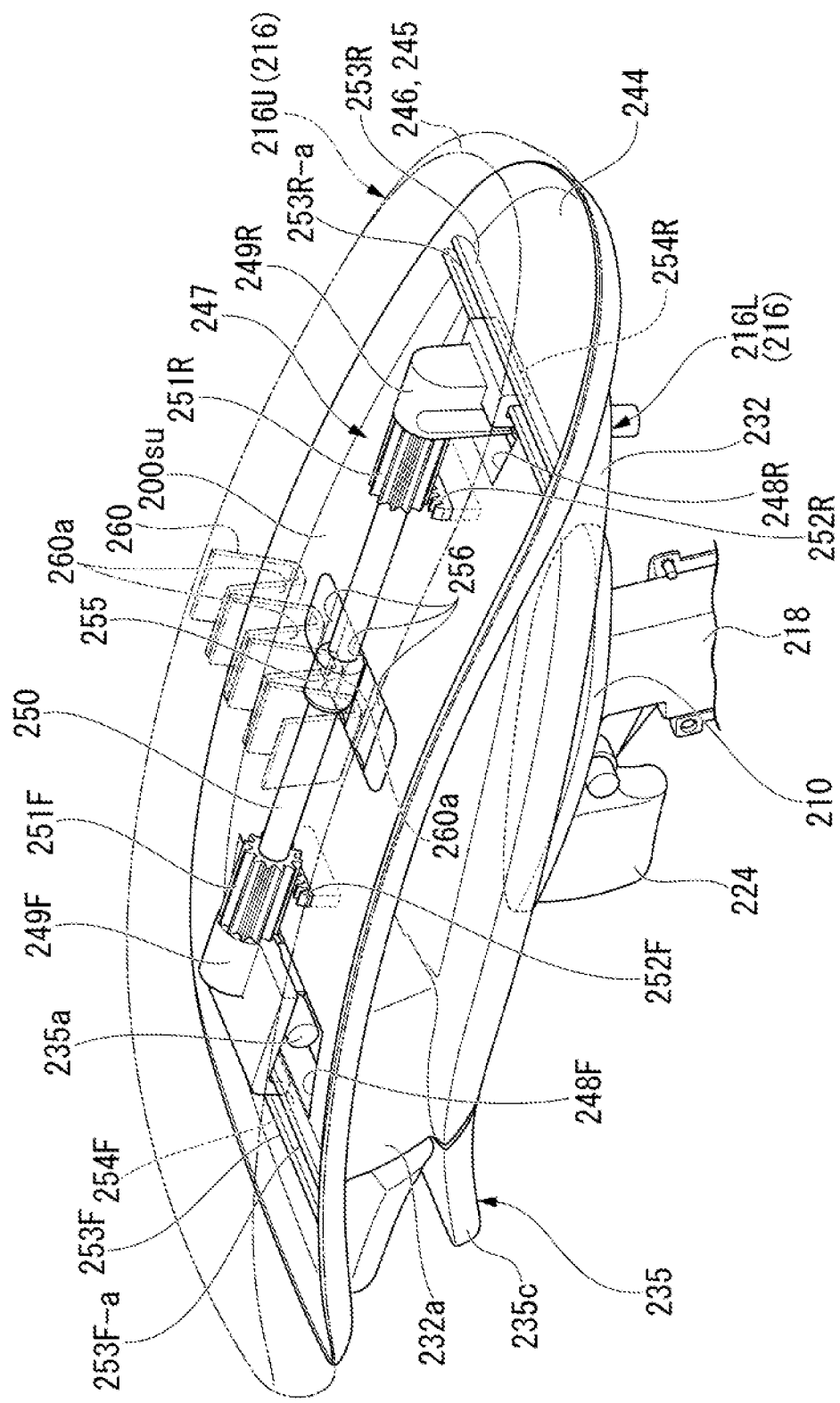
FIG. 19 is a perspective view showing the state in which some of the components of the armrest according to the second embodiment of the present invention are removed.

FIG. 19 is a view of the armrest 208 in which the upper cover member 245, the cushion member 265 and the pad member 246 of the upper unit 216U are removed when seen from an inner upper side in the width direction of the chair.

As shown in FIGS. 15 and 19, a movement equalizing mechanism 247 which will be described later and moves right and left the upper unit 216U of the armrest main body 216 which is long in the forward-and-rearward direction in parallel is provided in the accommodation space 200*su* of the upper unit 216U.

When the upper unit 216U which is long in the forward-and-rearward direction is moved in the right-and-left direction, a tilt in a plan view may be generated in the upper unit 2161U and may obstruct smooth right and left movement, or the armrest main body 216 may unintentionally rotate around the small diameter portion 231 during an operation performed by grasping any one of the front and rear ends of the upper unit 216U. Meanwhile, it is possible to assist the parallel movement of the upper unit 216U in the right-and-left direction by equalizing the right and left movement of the front and rear ends of the upper unit 216U due to the movement equalizing mechanism 247.

Insertion holes 248F and 248R which extend the right-and-left direction are provided in a front side region and a rear side region of the bottom wall of the upper base member 244. As shown in FIG. 15, the front side support block 243F and the rear side support block 243R protruding from the lower unit 216L are inserted into each of the insertion holes 248F and 248R from a lower side. Bearing blocks 249F and 249R (holding members) are respectively fixed to the front side support block 243F and the rear side support block 243R protruding upward through the insertion holes 248F and 248R.

As shown in FIG. 16, the front side support block 243F is formed integrally with rear portions of right and left bearing portions 232*a*-1 which support the support shaft 235*a* of the operation lever 235. A screw hole 232*a*-2 is formed in each upper surface of the right and left front side support blocks 243F. The front bearing block 249F is overlapped on the upper surfaces of the right and left front side support blocks 243F and screwed to each screw hole 232*a*-2 of the right and left front side support blocks 243F.

Front and rear ends of a rotating shaft 250 which extends in the forward-and-rearward direction (in the longitudinal direction of the upper base member 244) are rotatably held in the front and rear bearing blocks 249F and 249R. A pinion gear 251F in the form of a pulley is integrally provided in the vicinity of the front bearing block 249F of the rotating shaft 250. Similarly, a pinion gear 251R in the form of a pulley is integrally provided in the vicinity of the rear bearing block 249R of the rotating shaft 250.

Meanwhile, rack gears 252F and 252R which mesh with the pinion gears 251F and 251R are fixed to and installed at a position corresponding to each of the front and rear pinion gears 251F and 251R on the upper base member 244. Tooth surfaces of the front and rear rack gears 252F and 252R are formed to extend in the forward-and-rearward direction, and tooth surfaces of the corresponding pinion gears 251F and 251R are also similarly formed to extend in the forward-and-rearward direction. Further, the number of teeth and a pitch of the front pinion gear 251F are set to be equal to the number of teeth and a pitch of the rear pinion gear 251R.

In the case of the second embodiment, pairs of the front and rear pinion gears 251F and 251R and the rack gears 252F and 252R mesh with each other and serve as a guide mechanism (a first guide mechanism) for guiding a displacement of the upper unit 216U (the upper layer member) with respect to the lower unit 216L (lower layer member) in a direction substantially orthogonal to the longitudinal direction.

Here, when an operation load in the right-and-left direction is input to one of the front and rear of the upper unit 216U, a rotational force in a direction corresponding to an operation direction is transmitted to the corresponding pinion gear 251F or 251R through one of the front and rear rack gears 252F or 252R, and the rotational force is transmitted to the other pinion gear 251R or 251F through the rotating shaft 250 which is a rotation transmitting element. Then, the rack gear 252R or 252F which meshes with the other pinion gear 251R or 251F is displaced by the same amount in the same direction in synchronization with the displacement of the one rack gear 252F or 252R. Therefore, the right and left of the upper unit 216U are displaced by the same amount in the same direction with respect to the lower unit 2161.

In the second embodiment, the bearing blocks 249F and 249R, the pinion gears 251F and 251R, the rack gears 252F and 252R, the rotating shaft 250 and so on mainly constitute the movement equalizing mechanism 247.

Also, in the case of the second embodiment, raised portions 253F and 253R which protrude upward are provided on a front side of the front insertion hole 248F of the upper base member 244 and a rear side of the rear side insertion hole 248R thereof, and guide grooves 253F-a and 253R-a are formed in the raised portions 253F and 253R to open upward. Each of the guide grooves 253F-a and 253R-a is formed in the right-and-left direction (in a direction substantially orthogonal to the longitudinal direction of the upper base member 44). Meanwhile, guide protrusions 254F and 254R slidably inserted into the front and rear guide grooves 253F-a and 253R-a are provided on the front bearing block 249F and the rear bearing block 249R to protrude. In the case of the second embodiment, the displacement of the upper unit 216U with respect to the lower unit 216L in the right-and-left direction is guided not only by the guide mechanism (the first guide mechanism) due to the pinion gears 251F and 251R and the rack gears 252F and 252R but also by a guide mechanism (a second guide mechanism) due to the guide protrusions 254F and 254R and the guide grooves 253F-a and 253R-a.

Also, a large diameter portion 255 having an outer diameter larger than the other portions in the front and rear is integrally provided at a substantially intermediate position of the rotating shaft 250 in the axial direction. Meanwhile, a plurality of concave portions 256 (holding portions) capable of elastically holding the large diameter portion 255 of the rotating shaft 250 at an arbitrary relative position of the lower unit 216L and the upper unit 216U in the right-and-left direction (in a direction substantially orthogonal to the longitudinal direction) are formed at a substantially intermediate position of an upper surface of the upper base member 244 in the longitudinal direction. The concave portion 256 is fitted to the large diameter portion 255 of the rotating shaft 250, thereby imparting holding resistance to the rotating shaft 250 and thus can give a sense of moderation to the operator of the upper unit 216U. In the second embodiment, the plurality of concave portions 256 are formed of a resin member having elasticity.

Also, in the second embodiment, the plurality of concave portions 256 (the holding portions) capable of elastically holding the large diameter portion 255 of the rotating shaft 250 are formed in the upper surface of the upper base member 244. However, as indicated by imaginary lines in FIG. 19, a holding member 260 may be provided on a lower surface of the upper cover member 245 to protrude, and a plurality of holding grooves 260a which elastically hold the large diameter portion 255 of the rotating shaft 250 may be provided in the holding member 260.

In the armrest 208 according to the second embodiment, when the upper unit 216U of the armrest main body 216 is gripped by the seated person and an operation load in the forward-and-rearward direction, the right-and-left direction and the oscillating direction (rotation direction) is applied to the upper unit 216U, each part in the armrest 208 is operated as follows.

When the operation load in the forward-and-rearward direction is applied to the upper unit 216U, the lower unit 216L of the armrest main body 216 is displaced together with the upper unit 216U in the forward-and-rearward direction with respect to the small diameter portion 231 on the armrest support 215 and the clamping block 233 supported by the swollen portion 230. At this time, the right and left side walls 232s of the base member 232 of the lower unit 216L slide on the right and left end surfaces of the clamping block 233, whereby the displacement of the lower unit 216L in the forward-and-rearward direction is guided.

When the operation load in the right-and-left direction is applied to the upper unit 216U, the upper unit 216U is displaced in the right-and-left direction with respect to the lower unit 216L supported by the small diameter portion 231 and the swollen portion 230 of the armrest support 215 via the clamping block 233. At this time, the upper unit 216U is guided in the right-and-left direction with respect to the lower unit 216L by the above-described guide mechanism, and the right and left movements of the front side and the rear side of the upper unit 216U are equalized via the movement equalizing mechanism 247.

When the operation load in the horizontal rotation direction is applied to the upper unit 216U, the clamping block 233 is rotated by the bearing portion 233a with respect to the small diameter portion 231 on the armrest support 215 and the upper portion of the swollen portion 230, and thus the base member 232 of the lower unit 216L which is engaged with the clamping block 233 to be non-rotatable rotates integrally with the clamping block 233. As a result, the upper unit 216U supported by the lower unit 216L also rotates in the same direction.

Further, when the lower unit 216L rotates by a predetermined angle or more, the displacement restricting protrusion 259 which protrudes from the clamping block 233 into the rotation allowance hole 258 of the end plate 229 comes into contact with one of the side walls 258s in the rotation allowance hole 258, and thus the rotation of the armrest main body 216 is restricted.

As described above, in the armrest 208 according to the second embodiment, the cable insertion portion 257 which passes through the lower side of the axis o of the small diameter portion 231 of the armrest support 215 opens into the armrest main body 216 in the vicinity of the small diameter portion 231, the displacement restricting protrusion 259 of the clamping block 233 of the armrest main body 216 is disposed at a position opposite to the opening 257a of the cable insertion portion 257, in which the axis o of the small diameter portion 231 is disposed between the opening 257a and the position, and the displacement restricting protrusion 259 faces the side wall 258s of the rotation allowance hole 258. Therefore, in the armrest 208 according to the second embodiment which is a structure having the rotation restricting mechanism, the operation cable 234 is pulled out from the vicinity of the small diameter portion 231 into the armrest main body 216, and thus a bending angle of the operation cable 234 can be restricted from increasing when a rotating operation of the armrest main body 216 is performed.

Therefore, the operation of the mechanism due to the operation cable 234 can be performed smoothly and durability of the operation cable 234 is also improved by having the armrest 208 according to the second embodiment.

Also, in the armrest 208 according to the second embodiment, the small diameter portion 231, the swollen portion 230 and the bearing portion 233a which constitute the rotation mechanism are disposed inside the armrest main body 216, the displacement restricting protrusion 259 of the clamping block 233 and the side wall 258s of the rotation allowance hole 258 constituting the rotation restricting mechanism are disposed inside the armrest support 215, and the displacement restricting protrusion 259 of the clamping block 233 protrudes downward from a position opposite to the opening 257a of the cable insertion portion 257, in which the axis o of the small diameter portion 231 is disposed between the opening 257a and the position. Accordingly, in the armrest 208 according to the second embodiment, since the rotation mechanism and the rotation restricting mechanism do not largely occupy the inside of the armrest main body 216 in the substantially horizontal direction, it is possible to prevent the armrest main body 216 from becoming large in the substantially horizontal direction.

Also, in the armrest 208 according to the second embodiment, the armrest main body 216 includes the base member 232 provided with the insertion hole 238 through which the pivot portion is inserted, and the clamping block 233 rotatably attached via the bearing portion 233a to the small diameter portion 231 and the swollen portion 230 of the base member 232, which protrude upward, and the right and left end surfaces of the clamping block 233 are slidably engaged with the side walls 232s of the base member 232. Therefore, the base member 232 of the upper unit 216U is rotatably installed at the upper portions of the small diameter portion 231 and the swollen portion 230 on the armrest support 215 in a state in which it is restricted from being separated from the upper side due to the clamping block 233, and in the base member 232 and the clamping block 233 of the armrest main body 216, only the relative displacement in one direction is permitted by the guide mechanism constituted by the right and left side end surfaces of the clamping block 233 and the side walls 232s of the base member 232.

Therefore, in the armrest 208 according to the second embodiment, the base member 232 of the armrest main body 216 is relatively displaced with respect to the clamping block 233 in only one direction, but the separation of the base member 232 from the small diameter portion 231 and the swollen portion 230 of the armrest support 215 can be securely restricted by the clamping block 233.

Also, in the armrest 208 according to the second embodiment, the displacement restricting protrusion 259 of the clamping block 233 which is the rotation restricting element on the armrest main body 216 passes downward through the insertion hole 238 for inserting the pivot portion of the base member 232 and protrudes inward of the armrest support 215. Therefore, the insertion hole 238 of the base member 232 for inserting the pivot portion is used as a hole for allowing the displacement restricting protrusion 259 to protrude downward. Since the base member 232 always rotates integrally with the clamping block 233 around the small diameter portion 231, the insertion hole 238 formed in the base member 232 can be formed into an elongated hole shape having a relatively narrow width which allows the movement of the displacement restricting protrusion 259 when the clamping block 233 and the base member 232 slide and are displaced in one direction.

Therefore, according to the above-described constitution, an opening area of the insertion hole 238 formed in the base member 232 can be easily formed to be small, and thus manufacturing cost can be reduced.

Also, in the case of the armrest 208 according to the second embodiment, the cable insertion portion 257 is formed of the continuous hole which extends from the lower surface of the end plate 229 on one side with the axis o of the small diameter portion 231 therebetween to the upper surface of the end plate 229 on the other side with the axis o of the small diameter portion 231 therebetween and the outer surface of the swollen portion 230. Therefore, the operation cable 234 can be gently curved and drawn into the armrest main body 216 by inserting the operation cable 234 through the cable insertion portion 257.

Therefore, according to the above-described constitution, it is possible to reduce the bending of the operation cable 234 pulled into the armrest main body 216 and to smoothly perform the operation of the operation cable 234.

The present invention is not limited to the above-described embodiment, and various design changes are possible without departing from the gist thereof.

For example, in the second embodiment, the opening 257a of the cable insertion portion 257 opens to the front side of the pivot portion (the small diameter portion and the swollen portion), and the rotation restricting element (the displacement restricting protrusion 259, the side walls 258s of the rotation allowance hole 258) of the rotation restricting mechanism is disposed on the rear side of the pivot portion. However, the opening of the cable insertion portion may be disposed on the rear side of the pivot portion, and the rotation restricting element of the rotation restricting mechanism may be disposed on the front side of the pivot portion. In this case, the operation lever (the operation portion) for operating the operation cable in the armrest main body may be disposed on the rear side of the armrest main body in the viewpoint of reducing the bending of the operation cable in the armrest main body.

Also, the present invention is not limited thereto, and the opening of the cable insertion portion may be disposed on either one of the right and left of the pivot portion, and the rotation restricting element of the rotation restricting mechanism may be disposed on the other one of the right and left of the pivot portion. In this case, the operation lever (the operation portion) may be disposed at a side portion of the armrest main body on the same side as an opening side of the cable insertion portion in the viewpoint of reducing the bending of the operation cable in the armrest main body.

Third Embodiment

Hereinafter, a chair according to a third embodiment of the present invention will be described with reference to the drawings.

Figure 20:
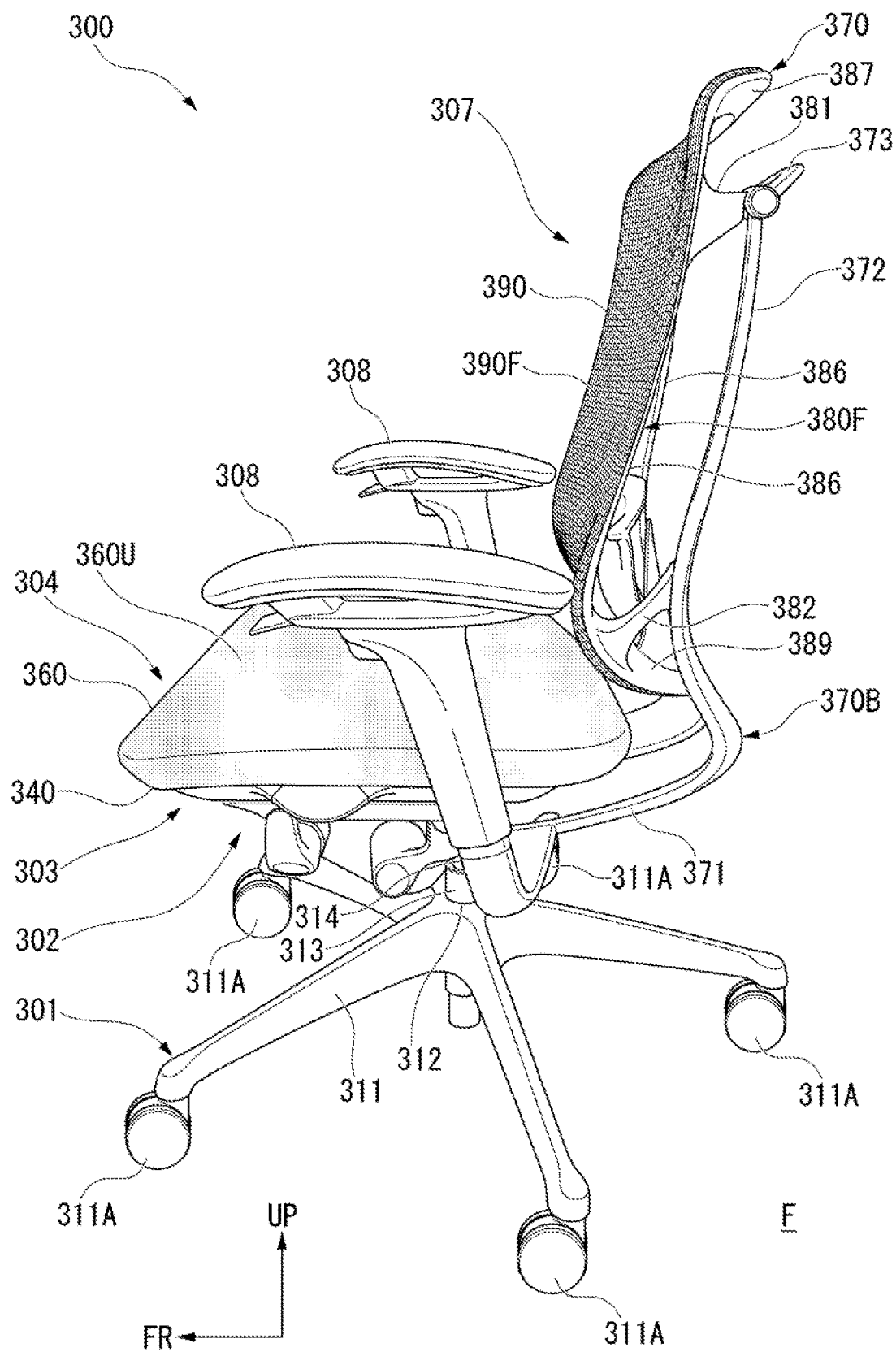
FIG. 20 is a perspective view of a chair according to a third embodiment of the present invention as seen from the left side.
Figure 21:
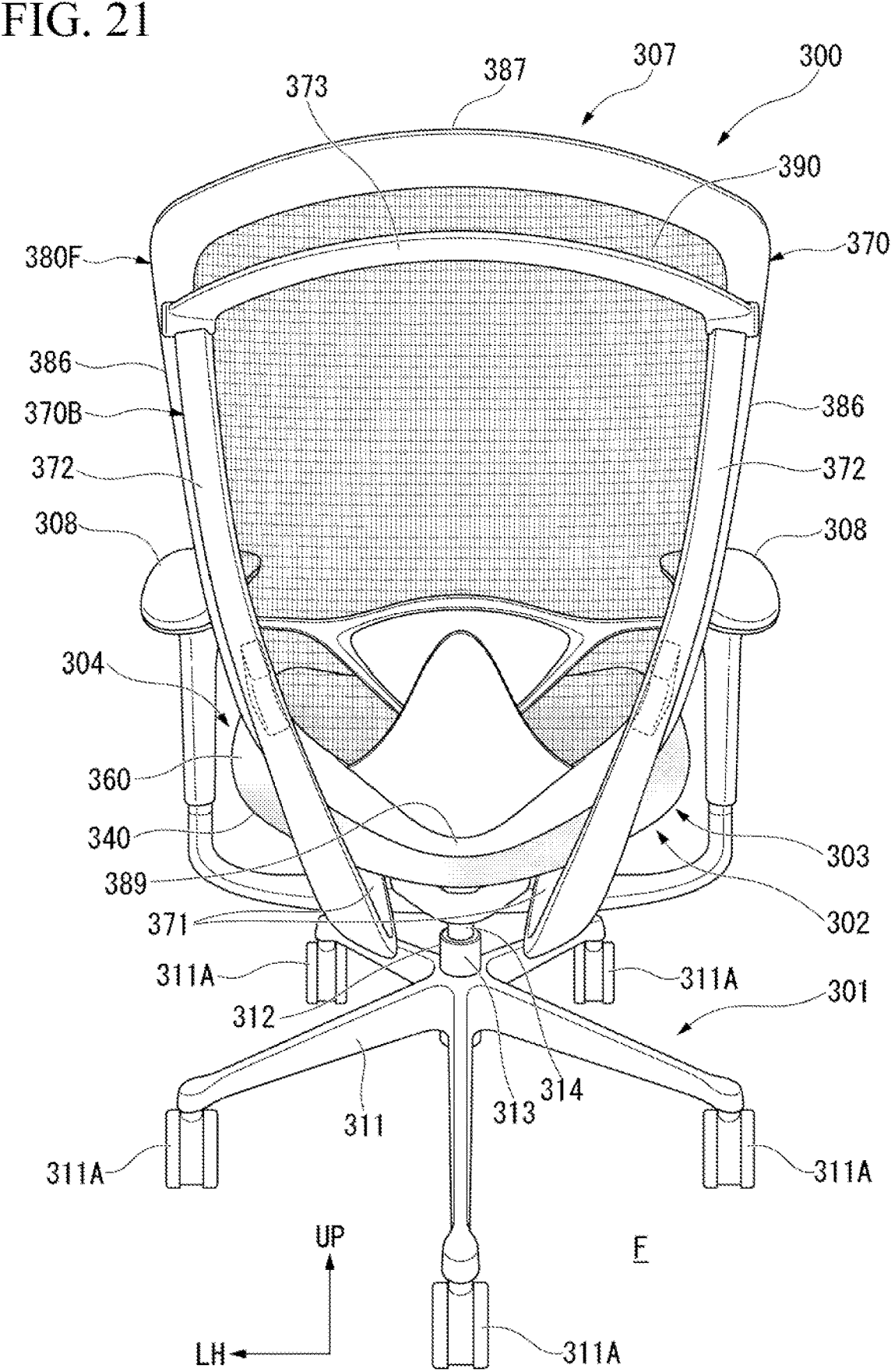
FIG. 21 is a perspective view of the chair as seen from behind.

As shown in FIGS. 20 and 21, a chair 300 includes a leg portion 301 installed on a floor surface F, a box-shaped support base 302 installed on an upper portion of the leg portion 301, a seat receiving member 303 installed on an upper portion of the support base 302, a seat body 304 supported on the seat receiving member 303 to be slidable and on which a person sits, a back rest 307 extending from the support base 302 and supporting a back of the person seated on the seat body 304, and a pair of armrests 308 disposed on right and left sides of the seat body 304.

In the following description, for convenience, a direction in which the person seated on the seat body 304 faces forward is referred to as "frontward," and an opposite direction is referred to as "rearward". Also, a direction connecting the floor surface F-side on which the chair 300 is installed and the opposite side is referred to as a "vertical direction". Also, a width direction of the chair 300, that is, a horizontal direction orthogonal to a forward-and-rearward direction and the vertical direction is referred to as a "right and left direction". Further, in the drawing, the forward direction is indicated by an arrow FR, an upward direction is indicated by an arrow UP, and a left side is indicated by an arrow LH.

The leg portion 301 has multi-branched legs 311 with a caster 311A, and a leg post 312 standing up from a center of the multi-branched legs 311 and in which a gas spring (not shown) is built as a lifting mechanism. An outer cylinder 313 constituting a lower portion of the leg post 312 is fitted to and supported on the multi-branched leg 311 in a non-rotatable manner. An inner cylinder 314 constituting an upper portion of the leg post 312 fixes and supports the support base 302 at an upper end thereof, and a lower portion thereof is supported by the outer cylinder 313 to be rotatable in the horizontal direction.

A lifting adjustment mechanism of the leg post 312 and a tilt adjustment mechanism of the back rest 307 are built in the support base 302.

The seat receiving member 303 includes four link arms (not shown) installed on the upper portion of the support base 302, and a pair of right and left fixed frames (not shown) for connecting the link arms to each other.

The seat body 304 has a seat frame 340 and a tension member 360 stretched around the seat frame 340. An upper surface of the tension member 360 serves as a load supporting surface 360U which receives a load of the seated person.

The back rest 307 has a back frame 370 and a tension member 390 stretched around the back frame 370. A front surface of the tension member 390 serves as a load supporting surface 390F which receives the load of the seated person. The back frame 370 includes a rear frame 370B connected to the support base 302, and a front frame 380F provided in front of the rear frame 370B.

The rear frame 370B has a pair of right and left lower side portions 371, a side portion 372, and an upper side portion 373. The rear frame 370B is formed integrally of, for example, a metal such as aluminum or a resin having a predetermined strength.

The right and left lower side portions 371 are connected to the tilt adjustment mechanism in the support base 302 and extend from both right and left sides of a rear portion of the support base 302. The right and left lower side portions 371 are gradually inclined rearward toward an upper side. The right and left armrests 308 are respectively supported on the right and left lower side portions 371.

The right and left side portions 372 are respectively connected to upper ends of the right and left lower side portions 371. The right and left side portions 372 are gradually inclined outward toward an upper side in the right-and-left direction. Lower portions of the right and left side portions 372 are gradually inclined forward toward the upper side. Upper portions of the right and left side portions 372 are gradually inclined rearward toward the upper side. Upper ends of the right and left side portions 372 are connected by the upper side portion 373.

The front frame 380F includes an upper arm portion 381 connected to the upper portion of the side portion 372 of the rear frame 370B, a lower arm portion 382 connected to a lower portion of the side portion 372, a pair of vertical rods 386 disposed to be spaced apart from each other in the right-and-left direction (along the load supporting surface 390F), an upper rod 387 which connects upper ends of the pair of vertical rods 386 to each other, and a lower end connecting portion 389 which connects lower ends of the pair of vertical rods 386. The front frame 380F is integrally formed of, for example, a resin or the like. The right and left vertical rods 386 and the upper rod 387 are elastically deformable according to a force acting from the tension member 390.

The right and left vertical rods 386 are connected to the rear frame 370B via the upper arm portion 381 at upper portions thereof and connected to the rear frame 370B at lower portions via the lower arm portion 382. The right and left vertical rods 386 are gradually inclined inward toward a lower side in the right-and-left direction. Lower ends of the right and left vertical rods 386 are connected to each other via a U-shaped lower end connecting portion 389.

The right and left armrests 308 are provided in a bilaterally symmetrical shape while spaced apart from each other in the width direction (the right and left direction) of the chair 300. In the following description, the armrest 308 installed on the right side of the chair 300 will be described with reference to the drawings unless otherwise specified, and since the armrest 308 disposed on the left side of the chair 300 is bilaterally symmetrical, a detailed description thereof will be omitted. In the chair 300, a chair main body is formed including the leg portion 301, the support base 302, the seat receiving member 303, the seat body 304 and the back rest 307.

Figure 22:
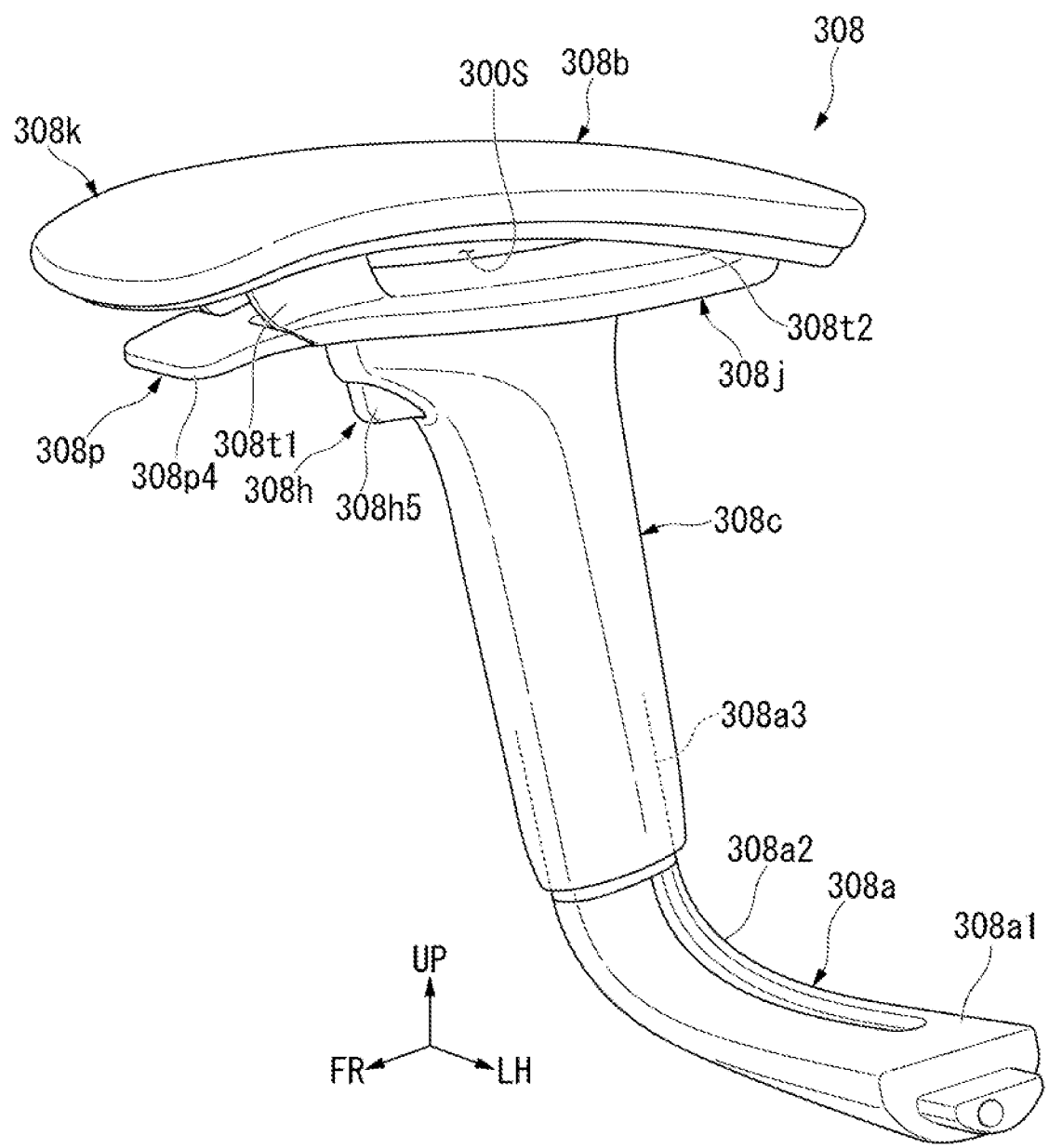
FIG. 22 is a perspective view of the armrest on the right side of the chair.

Also referring to FIG. 22, the armrest 308 includes a support rod 308a (support structure) which has an L shape in a front view and extends outward from the lower side portion 371 of the back frame 370 in the width direction, is then curved upward and extends, and an armrest main body 308b supported by an upper end of the support rod 308a and extending in the forward-and-rearward direction.

Figure 33:
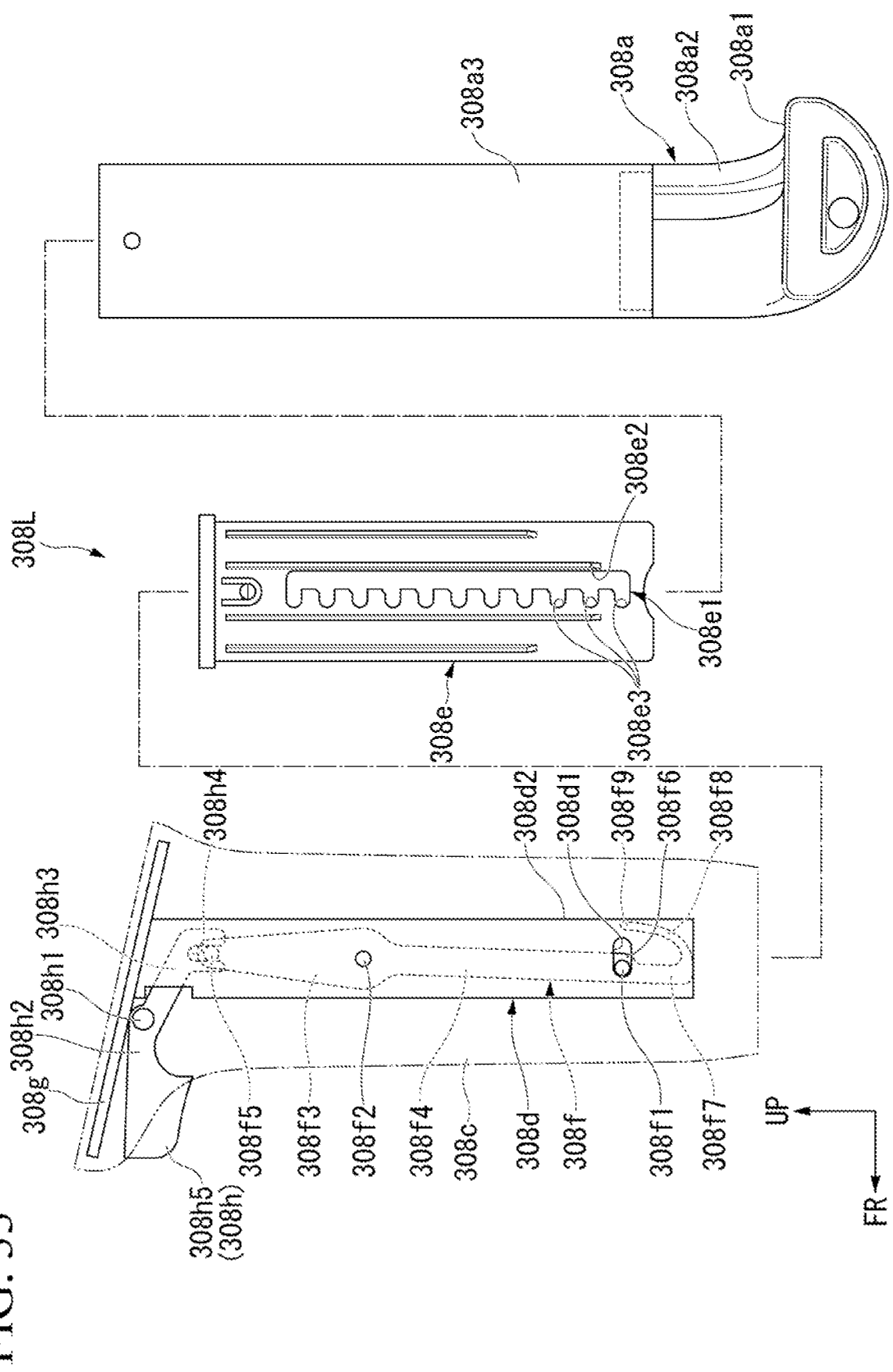
FIG. 33 is an exploded side view of a lifting mechanism of the armrest.
Figure 34:
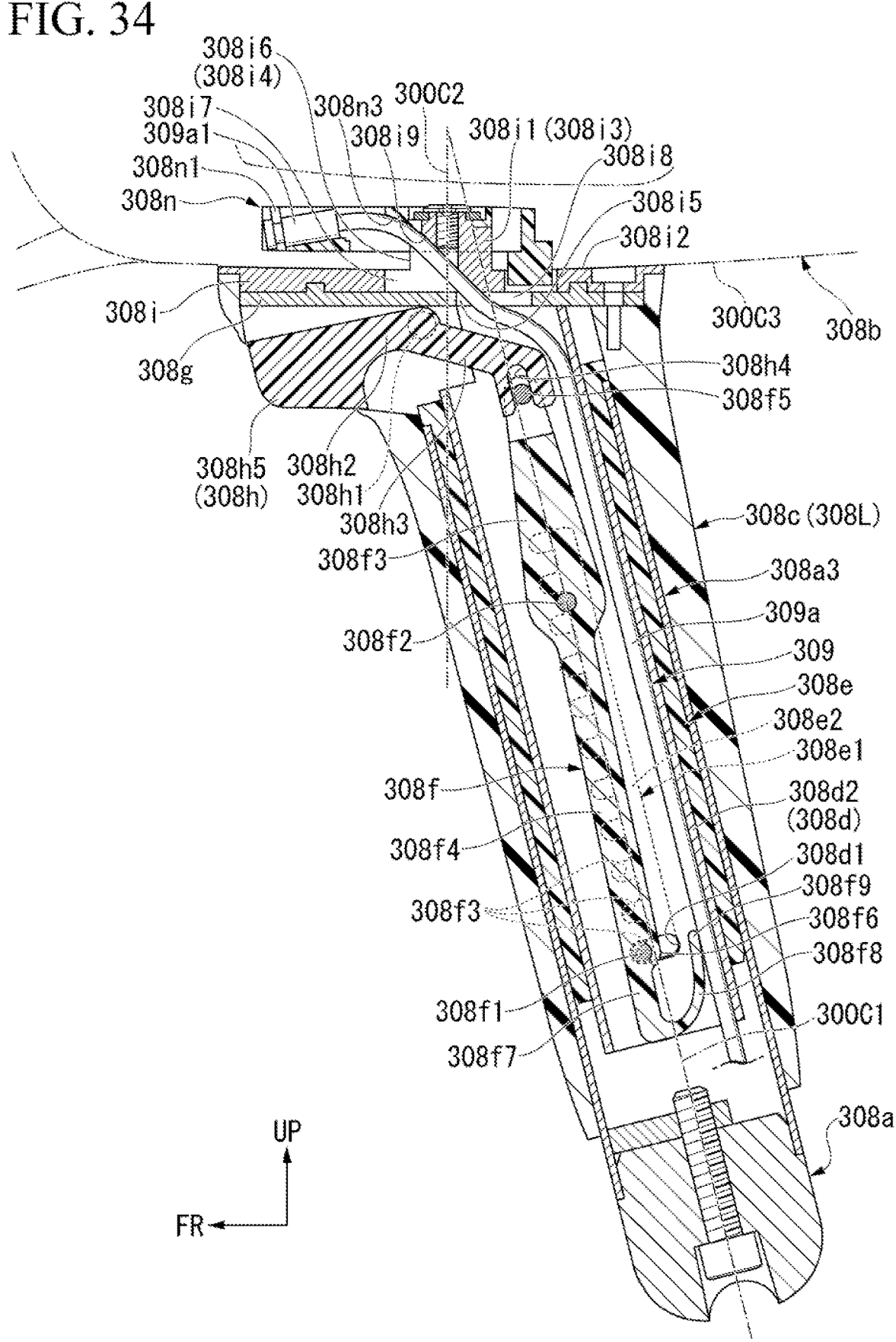
FIG. 34 is a cross-sectional view orthogonal to the right-and-left direction in which the armrest is cut at the center of the pivot.

Also referring to FIGS. 33 and 34, the support rod 308a includes an outer extending portion 308a1 which extends outward from the lower side portion 371 of the back frame 370 in the width direction, an upper curved portion 308a2 curved upward from an outer side of the outer extending portion 308a1 in the width direction, and an upward extending portion 308a3 which continues to an upper side of the upper curved portion 308a2.

The outer extending portion 308a1 and the upper curved portion 308a2 are integrally formed as a solid lower support rod formed of, for example, an aluminum alloy. The outer extending portion 308a1 extends substantially horizontally outward in the width direction from the lower side portion 371 of the back frame 370 (specifically, curved slightly upward toward the outer side in the width direction). The upper curved portion 308a2 is inclined slightly forward and curved upward.

The upward extending portion 308a3 is formed as a hollow upper support rod formed of, for example, a steel plate to have a pipe shape which linearly extends in the vertical direction. The upward extending portion 308a3 extends upward in the vertical direction (more specifically, inclined slightly forward like the upper curved portion 308a2). The upward extending portion 308a3 extends in the vertical direction when seen in the forward-and-rearward direction. A line 300C1 in FIG. 34 indicates a center axis in an extension direction (a first extension direction) of the upward extending portion 308a3. Hereinafter, a direction along the axis 300C1 may be referred to as a direction of the axis 300C1.

A lifting cylinder 308c capable of being lifted up and down in the direction of the axis 300C1 is externally fitted to the upward extending portion 308a3, and an inner pipe 308d capable of being lifted up and down in the direction of the axis 300C1 is internally fitted thereto.

Figure 24:
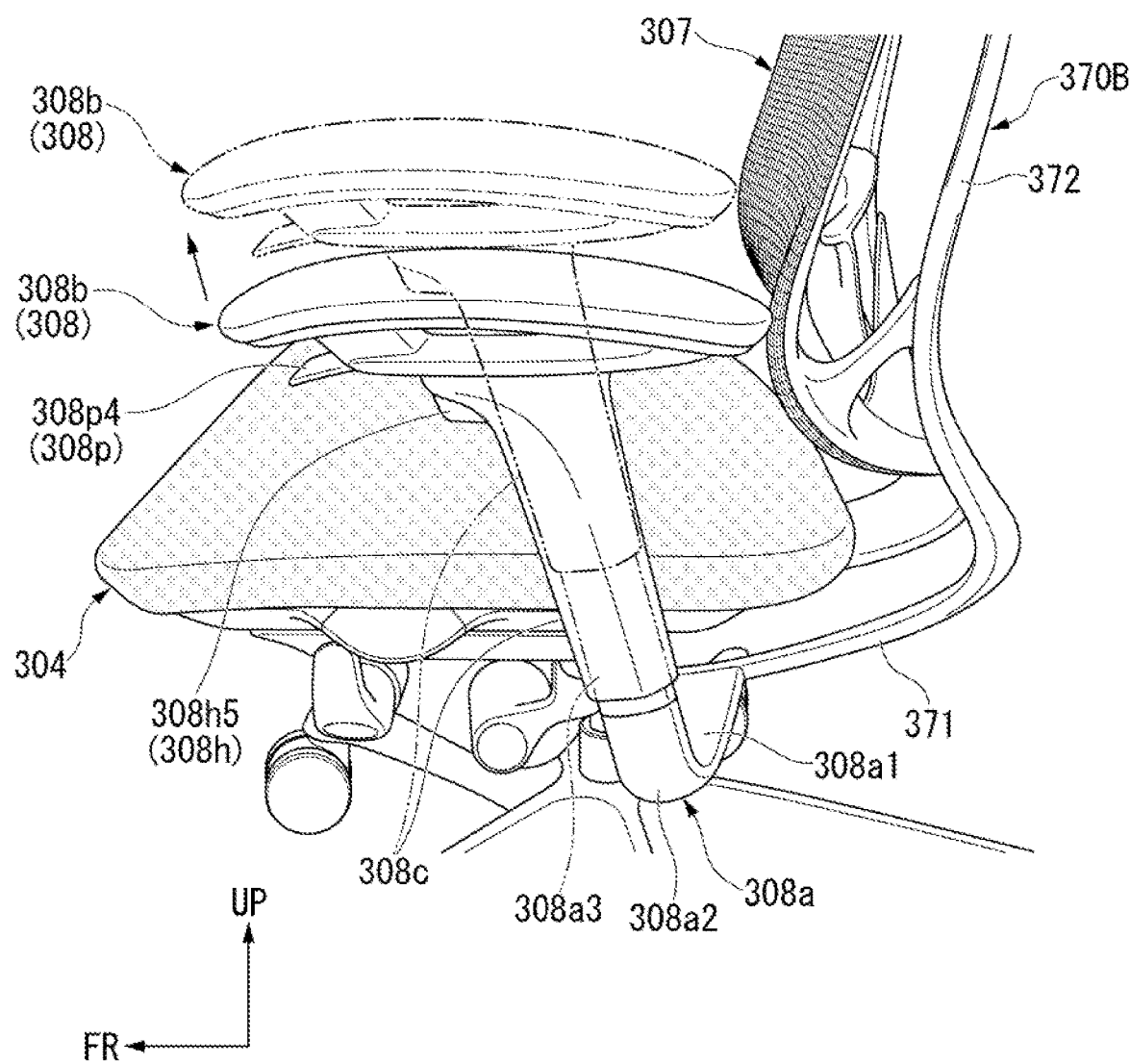
FIG. 24 is a perspective view showing a lifting motion of the armrest on the left side of the chair.

As shown in FIG. 24, the lifting cylinder 308c and the inner pipe 308d can be lifted up and down integrally with the armrest main body 308b.

Figure 23A:
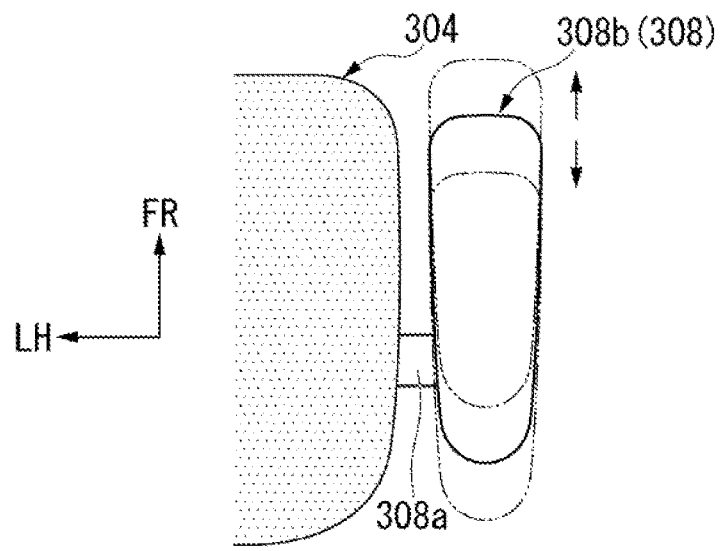
FIG. 23A is a plan view showing a motion in forward and rearward movement of the armrest.
Figure 23B:
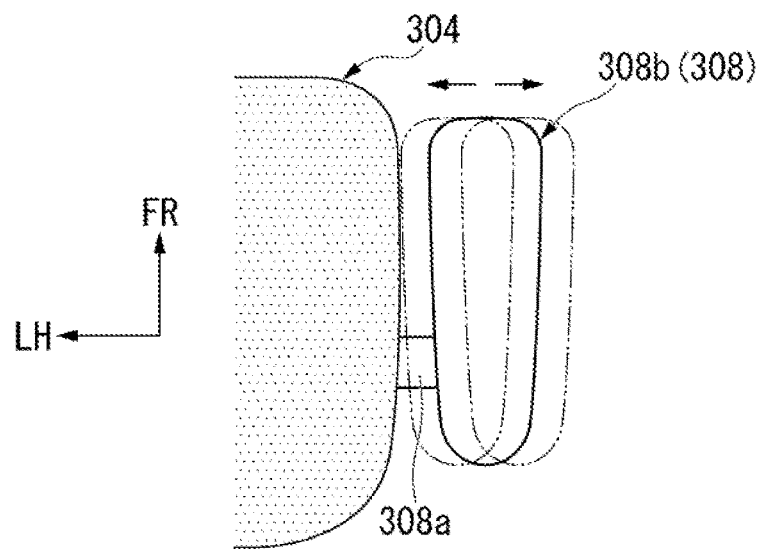
FIG. 23B is a plan view showing a motion in right and left movement of the armrest.
Figure 23C:
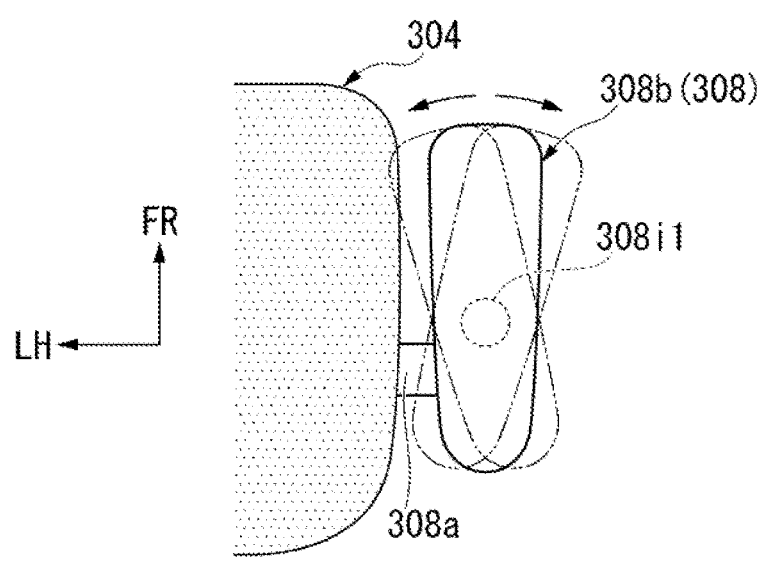
FIG. 23C is a plan view showing a state of rotation of the armrest.

Also, as shown in FIGS. 23A to 23C, the armrest main body 308b is movable in the forward-and-rearward direction with respect to the support rod 308a (the lifting cylinder 308c) (refer to FIG. 23A) and is also rotatable about a center of a pivot 308i1 which will be described later in a plan view (refer to FIG. 23C), and an upper layer member 308k which will be described later can also move in the right-and-left direction with respect to a lower layer member 308j and the support rod 308a (refer to FIG. 23B).

Figure 35:
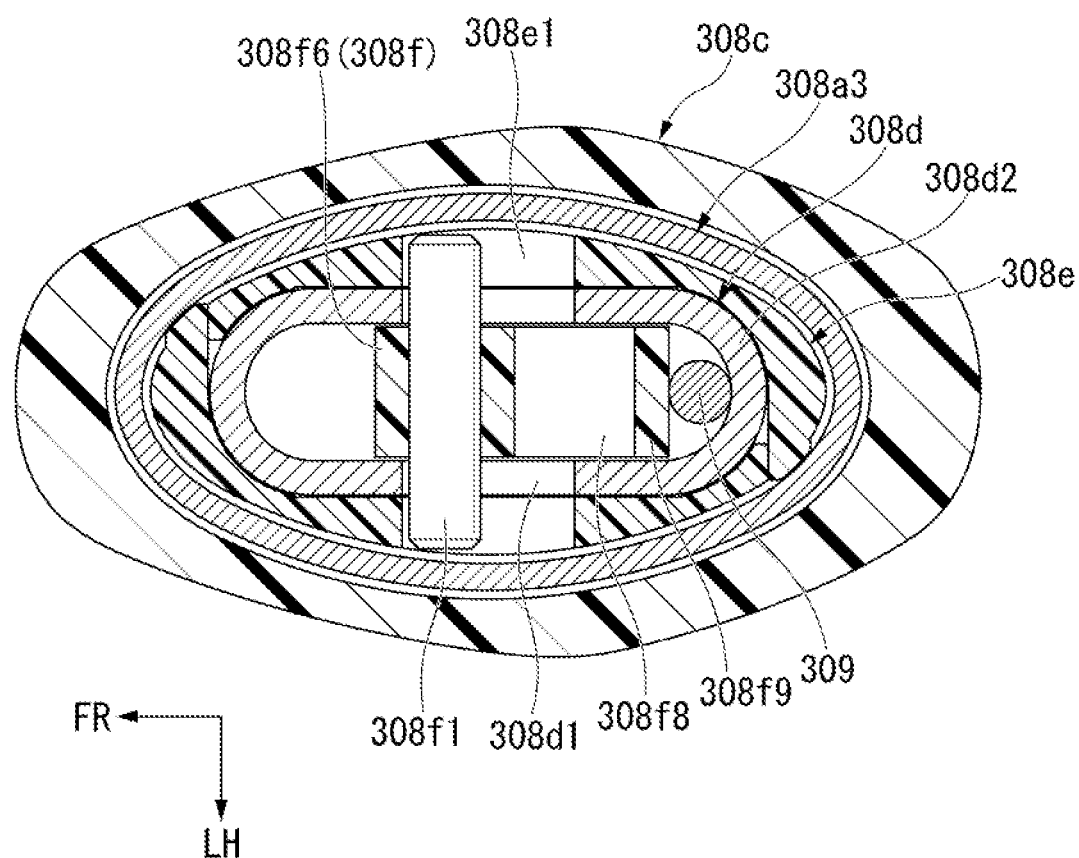
FIG. 35 is a cross-sectional view orthogonal to an axis 300C1 in which the armrest is cut at a center of a locking pin of an operation lever.

As shown in FIGS. 33 to 35, an inner sleeve 308e in which a comb-shaped height adjustment slit 308e1 in a side view is formed is internally fitted to the upward extending portion 308a3. The inner sleeve 308e is fitted into the upward extending portion 308a3 and fixed by being prevented from being separated due to screws or the like. The height adjustment slit 308e1 includes a lifting guide slit 308e2 which extends in the direction of the axis 300C1, and a plurality of locking slits 308e3 which extend forward at a substantially right angle from the lifting guide slit 308e2.

A locking pin 308f1 which can be lockable to one of the locking slits 308e3 of the height adjustment slit 308e1 is held in the inner pipe 308d. The locking pin 308f1 extends in the right-and-left direction, and right and left side portions thereof are inserted through a pin moving holes 308d1 of right and left side walls of the inner pipe 308d. The pin moving hole 308d1 is formed in an elongated hole shape which is long in the forward-and-rearward direction to follow the locking slit 308e3 in a side view. Right and left ends of the locking pin 308f1 are inserted into the pin moving hole 308d1 to be movable in the forward-and-rearward direction.

When the locking pin 308f1 is moved to a front end of the pin moving hole 308d1, it can be locked to any one of the locking slits 308e3 of the height adjustment slit 308e1 and can lock lifting of the armrest main body 308*b*. That is, a fixing height of the armrest main body 308*b* can be adjusted in multiple stages according to the locking slits 308*e*3 to which the locking pin 308*f*1 is locked.

When the locking pin 308*f*1 moves to a rear end of the pin moving hole 308*d*1, it releases the locking to the locking slit 308*e*3, reaches the lifting guide slit 308*e*2 and releases the lifting lock of the armrest main body 308*b*. Therefore, the armrest main body 308*b* can be lifted up and down (a height thereof can be changed).

A lifting mechanism 308L capable of adjusting the height of the armrest main body 308*b* is constituted including the upward extending portion 308*a*3, the lifting cylinder 308*c*, the inner pipe 308*d*, the inner sleeve 308*e* and the locking pin 308*f*1, and a swing lever 308*f* and a lifting operation lever 308*h*, which will be described later, in the support rod 308*a*.

The swing lever 308*f* is swingably supported inside the inner pipe 308*d* via a support shaft 308*f*2 extending in the right-and-left direction. The swing lever 308*f* includes an upward extending portion 308*f*3 which extends upward of the support shaft 308*f*2 and a downward extending portion 308*f*4 which extends downward of the support shaft 308*f*2. An engagement pin 308*f*5 which slidably engages with a rear lower engagement groove 308*h*4 of the lifting operation lever 308*h* is provided at an upper end of the upward extending portion 30813. A pin holding portion 308*f*6 which holds the locking pin 308*f*1 is provided at a lower end of the downward extending portion 308*f*4. An extending portion 308*f*7 which extends downward is provided and a spring piece 308*f*8 which folds upward in an arc shape from a rear side of a lower end of the extending portion 308*f*7 in a side view is also provided below the pin holding portion 308*f*6.

A top plate 308*g* which overhangs around the inner pipe 308*d* in a plan view is fixed to an upper end of the inner pipe 308*d*. The lifting operation lever 308*h* is swingably supported below the top plate 308*g* and in front of the inner pipe 308*d* via a support shaft 308*h*1 extending in the right-and-left direction. The lifting operation lever 308*h* includes a forward extending portion 308*h*2 which extends forward of the support shaft 308*h*1 and a rearward extending portion 308*h*3 which extends rearward of the support shaft 308*h*1. An operation portion 308*h*5 protruding to an outer side (a front lower side) of an upper end of the lifting cylinder 308*c* and capable of being pushed up by a user is provided in a lower portion of the forward extending portion 308*h*2. The rear lower engagement groove 308*h*4 which opens downward is provided on the lower side of the rear end of the rearward extending portion 308*h*3, and the engagement pin 308*f*5 at the upper end of the swing lever 308*f* is engaged.

The swing lever 308*f* is biased by the spring piece 308*f*8 to move a lower end (the pin holding portion 308*f*6) forward.

Here, the inner pipe 308*d* is formed in an elliptical shape of which a cross-sectional shape is long in the forward-and-rearward direction. An operation cable 309 is inserted through an inner side of a rear portion of the inner pipe 308*d* to pass through an inner side of a concave rear inner wall 308*d*2.

The spring piece 308*f*8 is supported from a rear side in a state in which a rear upper end 308*f*9 folded upward applies a biasing reaction force to a rear inner wall 308*d*2 of the inner pipe 308*d* with the operation cable 309 interposed therebetween.

The rear upper end 308*f*9 of the spring piece 308*f*8 is formed in a linear shape which extends in the right-and-left direction. The operation cable 309 is held between the rear upper end 308*f*9 of the spring piece 308*f*8 and the rear inner wall 308*d*2 of the inner pipe 308*d* using the biasing reaction force of the spring piece 308*f*8. The inner pipe 308*d* may support the rear upper end 308*f*9 of the spring piece 308*f*8 and may reduce the biasing reaction force applied to the operation cable 309.

As the spring piece 308*f*8 moves the lower end forward, the swing lever 308*f* moves the locking pin 308*f*1 to a front end of the pin moving hole 308*d*1 and locks the locking pin 308*f*1 to one of the locking slits 308*e*3 of the height adjustment slit 308*e*1. Therefore, the lifting of the armrest main body 308*b* is locked.

At this time, the swing lever 308*f* moves the engagement pin 308*f*5 rearward together with the upper end. Due to such movement of the engagement pin 308*f*5, the lifting operation lever 308*h* swings to move the rearward extending portion 308*h*3 upward, such that the operation portion 308*h*5 protrudes forward and downward of the upper end of the lifting cylinder 308*c*.

When the operation portion 308*h*5 protruding to the outer side of the lifting cylinder 308*c* is pushed upward, the rearward extending portion 308*h*3 of the lifting operation lever 308*h* moves the engagement pin 308*f*5 forward. Due to the swinging of the swing lever 308*f* following this movement, the lower end of the swing lever 308*f* moves rearward against the biasing force of the spring piece 308*f*8 and moves the locking pin 308*f*1 to a rear end of the pin moving hole 308*d*. Therefore, the locking pin 308*f*1 releases the locking to the locking slit 308*e*3 of the height adjustment slit 308*e*1, the locking pin 308*f*1 reaches the lifting guide slit 308*e*2, and the lifting lock of the armrest main body 308*b* is released.

Figure 29:
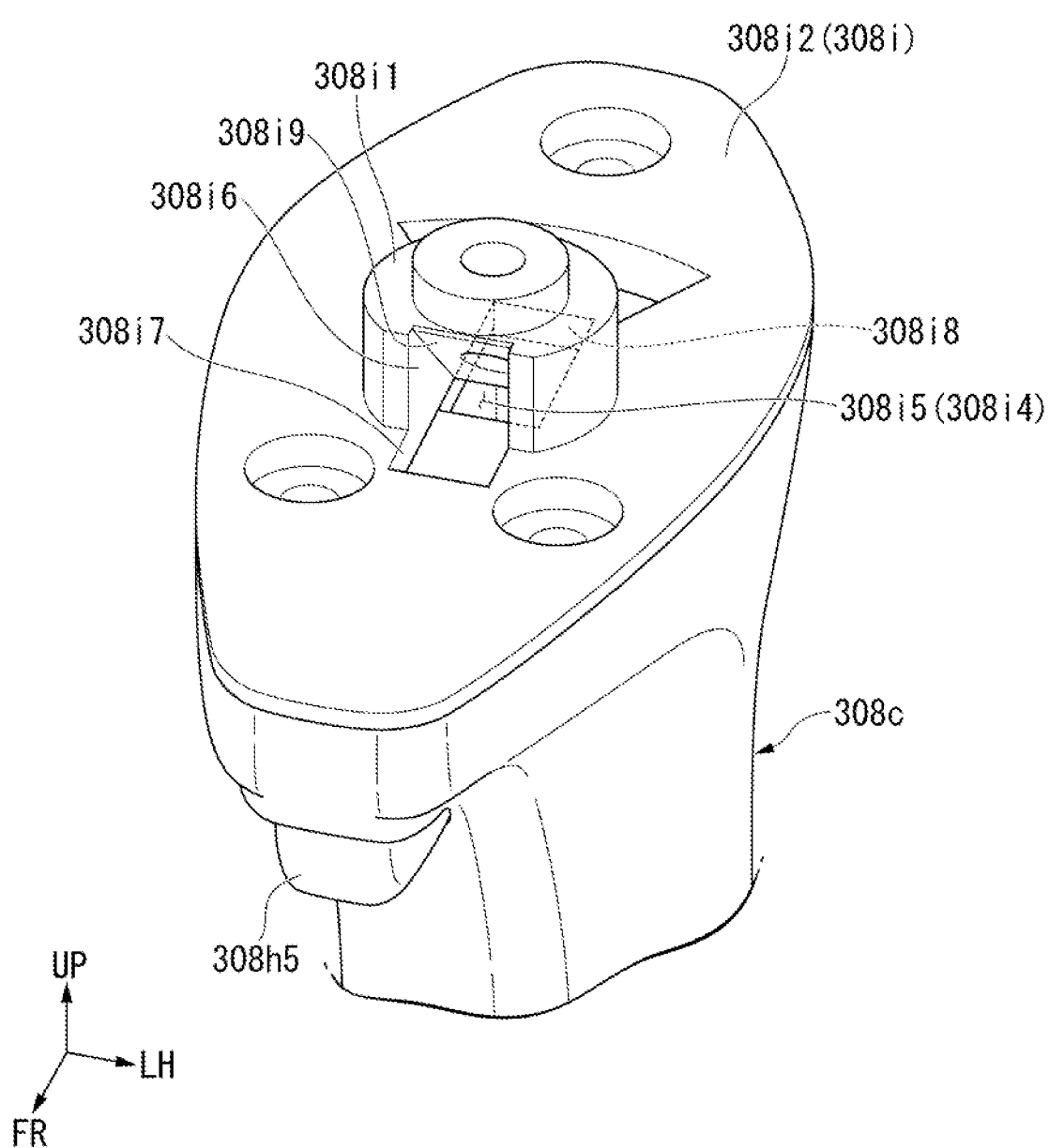
FIG. 29 is a perspective view from in front of the upper end of the lifting cylinder.
Figure 30:
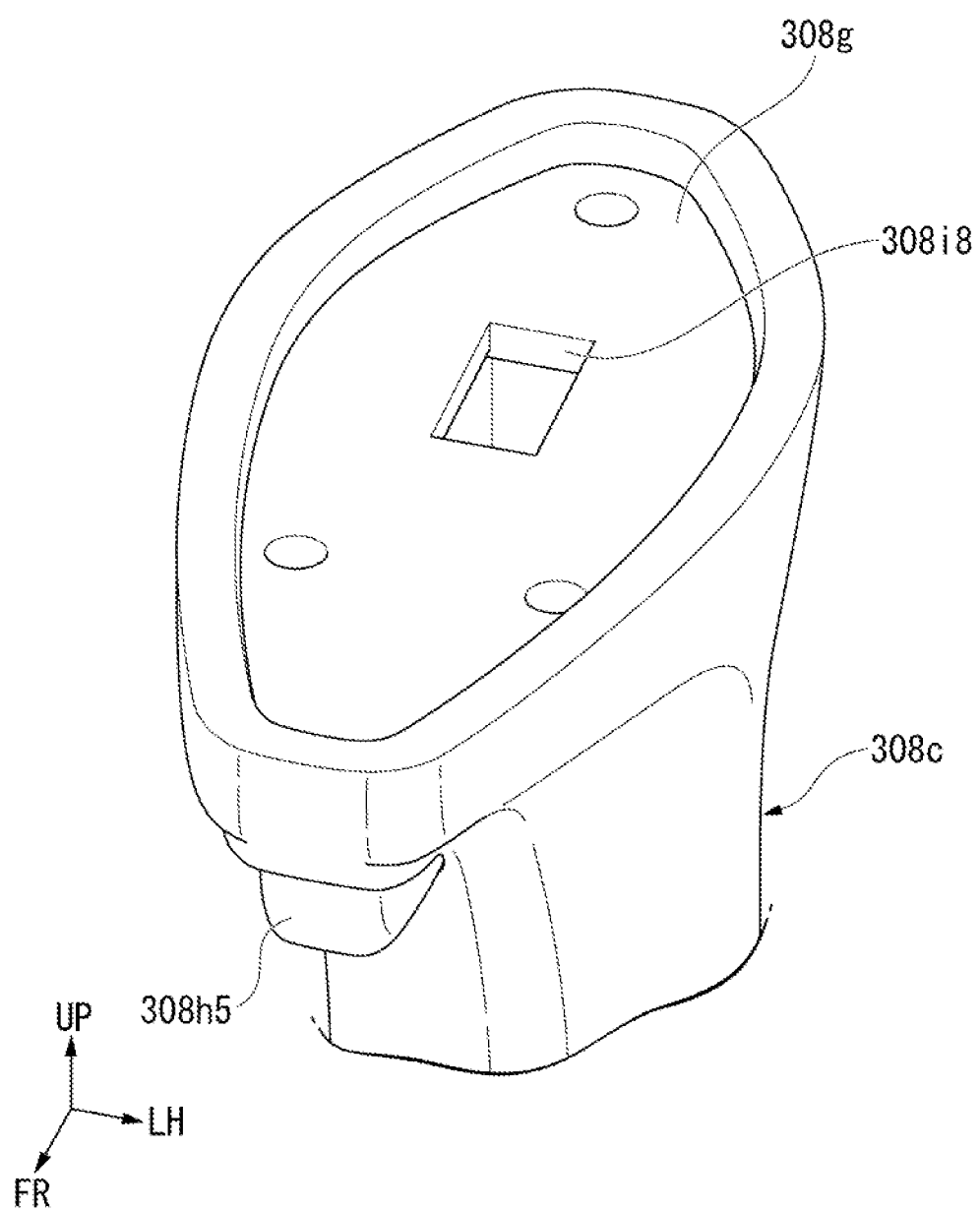
FIG. 30 is a perspective view showing a state in which an end plate is removed in FIG. 29.

As shown in FIGS. 29, 30 and 34, an end plate 308*i* having the pivot 308*i*1 is fixed onto the top plate 308*g* of the inner pipe 308*d*. The top plate 308*g* and the end plate 308*i* are disposed to close an upper end opening of the lifting cylinder 308*c*. The end plate 308*i* forms the lifting cylinder 308*c* and an upper end surface 308*i*2 of the support rod 308*a*. The armrest main body 308*b* is supported on the end plate 308*i* to be rotatable around the pivot 308*i*1. The upper end surface 308*i*2 is a boundary surface between the lifting cylinder 308*c* (the upward extending portion 308*a*3) and the armrest main body 308*b*.

A line 300C2 in the drawing shows a central axis of the pivot 308*i*. The upper end surface 308*i*2 is formed substantially horizontally. Specifically, the upper end surface 308*i*2 is formed in a curved shape which is convex slightly downward in a side view with respect to a horizontal plane to be matched with a lower surface of a base member 308*m* of a lower layer member 308*j* of the armrest main body 308*b*. A direction along the upper end surface 308*i*2 in a side view is the forward and rearward movement direction (a first movement direction) of the armrest main body 308*b*. The forward and rearward movement direction is also the extension direction (a second extension direction) of the armrest main body 308*b*. The armrest main body 308*b* extends substantially in the forward-and-rearward direction (the second extension direction). A line 300C3 in the drawing shows a reference axis in the forward and backward movement direction (the second extension direction) of the armrest main body 308*b* in a side view. The axis 300C3 may be referred to as a direction of the axis 300C3.

As shown in FIGS. 22, 25, 31 and 32, the armrest main body 308*b* includes the lower layer member 308*j* placed on the end plate 308*i*, and the upper layer member 308*k* placed on the lower layer member 308*j*.

The lower layer member 308*j* includes a base member 308*m* which forms an accommodation space 300K1 which opens upward and is placed on the end plate 308*i* in a state in which the pivot 308*i*1 protrudes into the accommodation space 300K 1, a rotary member 308*n* fitted to the base member 308*m* to be relatively non-rotatable and to be movable forward and rearward within the accommodation space 300K1 and fitted to the pivot 308*i*1 to be rotatable, an operation lever 308*p* which remotely operates a device (the lifting adjustment mechanism of the leg post 12 and the tilt adjustment mechanism of the back rest 7) in the support base 2 via the operation cable 309, a front pulley (a first turning member, pulley) 308*q* and a rear pulley (a second turning member, pulley) 308*r* which winds an inner cable 309*b* of the operation cable 309 within the lower layer member 308*j*, and the cover member 308*s* which closes an upper opening portion of the accommodation space 300K1.

The base member 308*m* (and the cover member 308*s*) is constituted as a movable body which supports the operation lever 308*p* and is movable in the forward-and-rearward direction with respect to the support rod 308*a*. A front stepped portion 308*m*1 which is changed stepwise upward with respect to the accommodation space 300K1 is formed at a front end of the base member 308*m* to support a front portion of the upper layer member 308*k*. A rear inclined portion 308*m*2 which is inclined rearward and downward is formed at a rear end of the base member 308*m* to support a rear portion of the upper layer member 308*k*. The rear inclined portion 308*m*2 is formed so that a depth of a rear end of the accommodation space 300K1 becomes shallower toward a rear side. An elongate hole 308*m*3 which extends in the forward-and-rearward direction and through which the pivot 308*i*1 passes to be movable forward and rearward is formed in a bottom wall of the base member 308*m*.

The rotary member 308*n* is constituted as a fixed body which is connected to the pivot 308*i*1 of the support rod 308*a* not to be movable in the forward-and-rearward direction with respect to the support rod 308*a*. The rotary member 308*n* is formed in a flat rectangular parallelepiped shape in which the width in the vertical direction (a direction along an axis 300C2 of the pivot 308*i*1) is limited. In a plan view, the rotary member 308*n* is disposed so that front and rear surfaces thereof are directed in the right-and-left direction and right and left side surfaces thereof are directed in the forward-and-rearward direction (a direction along right and left side walls of the base member 308*m*). A connecting portion 308*i*3 which includes the rotary member 308*n* and the end plate 308*i* and connects the upward extending portion 308*a*3 to the armrest main body 308*b* is formed.

The operation lever 308*p* is formed in an L shape in a side view. The operation lever 308*p* includes a support shaft 308*p*1 which extends in the right-and-left direction and is rotatably supported on the front stepped portion 308*m*1, a downward extending portion 308*p*2 which extends downward from the support shaft 308*p*1, a forward extending portion 308*p*3 which extends forward from a lower end of the downward extending portion 308*p*2. The operation lever 308*p* is swingable around the support shaft 308*p*1 in a swing space inside the front stepped portion 308*m*1. A front portion of the forward extending portion 308*p*3 is an operation portion 308*p*4 which protrudes forward of a lower portion of the front stepped portion 308*m*1. The operation portion 308*p*4 is located below a front portion of the upper layer member 308*k* and is formed so that a seated person whose an arm is placed on the upper layer member 308*k* can pull it up with a fingertip.

As shown in FIGS. 25, 26A to 26C and 31, the front pulley 308*q* is rotatably supported by the lower end of the downward extending portion 308*p*2 of the operation lever 308*p* via a support shaft 308*q*1 extending in the right-and-left direction. When the downward extending portion 308*p*2 rotates forward and upward due to the pulling-up operation of the operation portion 308*p*4; the front pulley 308*q* moves forward and upward in accordance with rotation of the downward extending portion 308*p*2.

The rear pulley 308*r* is rotatably supported by a rear end of the bottom wall of the base member 308*m* via a support shaft 308*r*1 extending in the vertical direction. The rear pulley 308*r* is disposed at the rear end of the accommodation space 300K1 in which the depth thereof is reduced by the rear inclined portion 308*n*2. The rear pulley 308*r* is disposed in a fallen attitude in which a radial direction thereof is substantially horizontal, and thus it is easy to dispose the rear pulley 308*r* even in a shallow space as compared with the case in which it is disposed in an upright attitude in which the radial direction is substantially vertical like the front pulley 308*q*.

The operation cable 309 has an outer cable 309*a* and an inner cable 309*b*.

Figure 28:
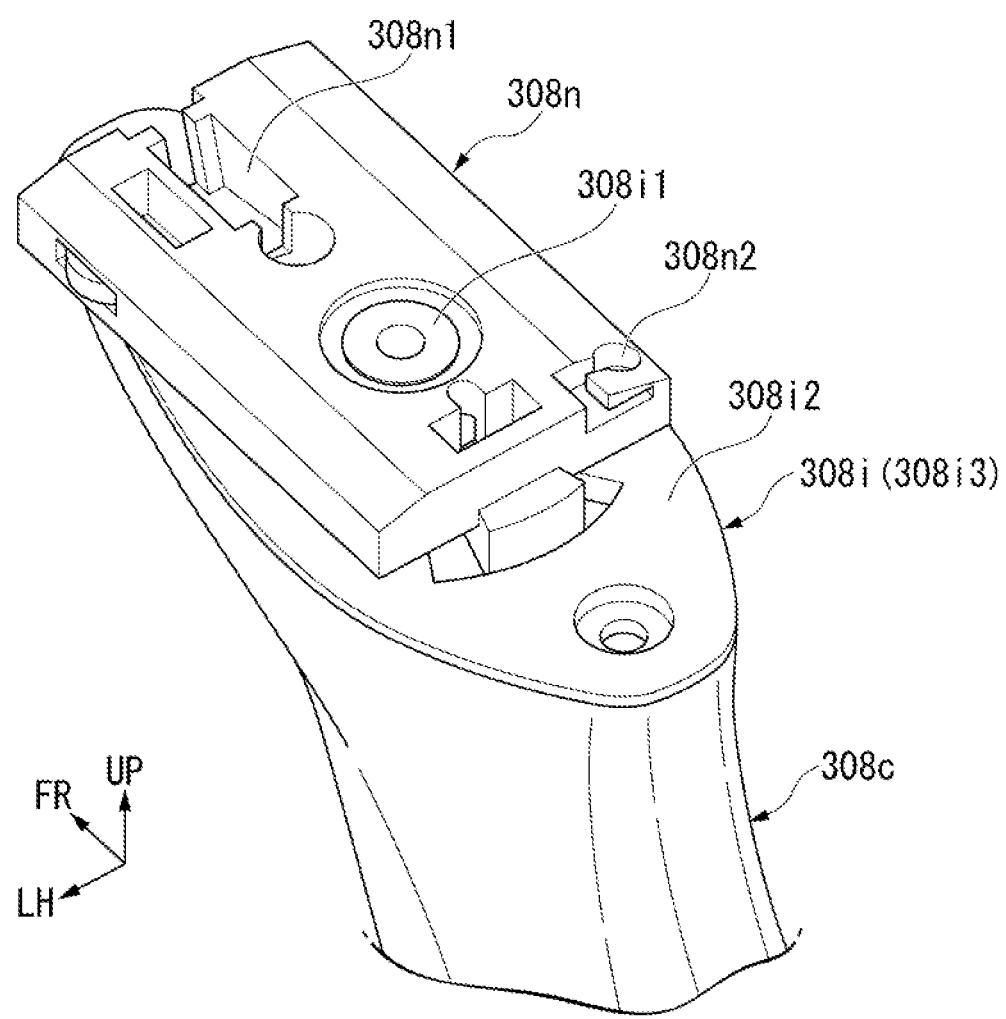
FIG. 28 is a perspective view from behind the upper end of the lifting cylinder.

The operation cable 309 extends from the support base 202 through an inner side of the inner pipe 308*d* and reaches an inner side of the lower layer member 308*j*. Referring to FIG. 28, in the outer cable 309*a* of the operation cable 309, a tip end (a locking end 309*a*1) thereof which reached the inner side of the lower layer member 308*j* is locked to an outer locking portion 308*n*1 formed inside the rotary member 308*n*.

The inner cable 309*b* of the operation cable 309 extends forward from the locking end 309*a*1 of the outer cable 309*a* and is then wound upward from a lower side on the front pulley 308*q* and turns rearward. Thereafter, the inner cable 309*b* is wound on the rear pulley 308*r* from one side in the width direction to the other side (from an inner side in the width direction to an outer side in the third embodiment) and is turned forward. Then, a tip end (a locking end 309*b*1) of the inner cable 309*b* is locked to an inner locking portion 308*n*2 formed on an outer side of a rear end of the rotary member 308*n* in the width direction.

When the operation portion 308*p*4 of the operation lever 308*p* is pulled up with the above-described constitution, the front pulley 308*q* moves forward and upward to draw out the inner cable 309*b* and operates the device in the support base 2.

Here, also when the armrest main body 308*b* is moved in the forward-and-rearward direction, the front pulley 308*q* moves in the forward-and-rearward direction, but at this time, the front pulley 308*q* moves forward and rearward in front of the locking end 309*a*1 of the outer cable 309*a*, and the rear pulley 308*r* moves forward and rearward behind the locking end 309*b*1 of the inner cable 309*b*.

Therefore, even when the length of the inner cable 309*b* in front of the locking end 309*a*1 of the outer cable 309*a* increases or decreases, the length of the inner cable 309*b* behind the locking end 309*b*1 of the inner cable 309*b* decreases or increases by the same dimension. Therefore, a change in the drawing length of the inner cable 309*b* is limited, and thus the inner cable 309*b* is prevented from being pulled when the armrest main body 308*b* moves forward, or the inner cable 309*b* is prevented from being loosened when the armrest main body 308*b* moves rearward.

In other words, an inner drawing length maintaining mechanism 308X including the front and rear pulleys 308*q* and 308*r* is formed in the base member 308*m* which is the moving body. The inner drawing length maintaining mechanism 308X changes an arrangement path of the inner cable 309*b* when the armrest main body 308*b* moves forward and rearward and limits the change in the length of the inner cable 309*b* drawn from the outer cable 309*a*.

The inner cable 309*b* is wound on the front pulley 308*q* in front of the locking end 309*a*1 of the outer cable 309*a* to extend in the forward-and-rearward direction and is turned to protrude forward. The inner cable 309*b* is disposed such that two portions of the inner cable 309*b* are arranged up and down in front of the locking end 309*a*1 of the outer cable 309*a* and behind the front pulley.

The inner cable 309*b* is wound on the rear pulley 308*r* behind the locking end 309*b*1 of the inner cable 309*b* to extend in the forward-and-rearward direction and is turned to protrude rearward. The inner cable 309*b* is disposed to be lined right and left behind the locking end 309*b*1 of the inner cable 309*b* and in front of the rear pulley 308*r*.

Figure 25:
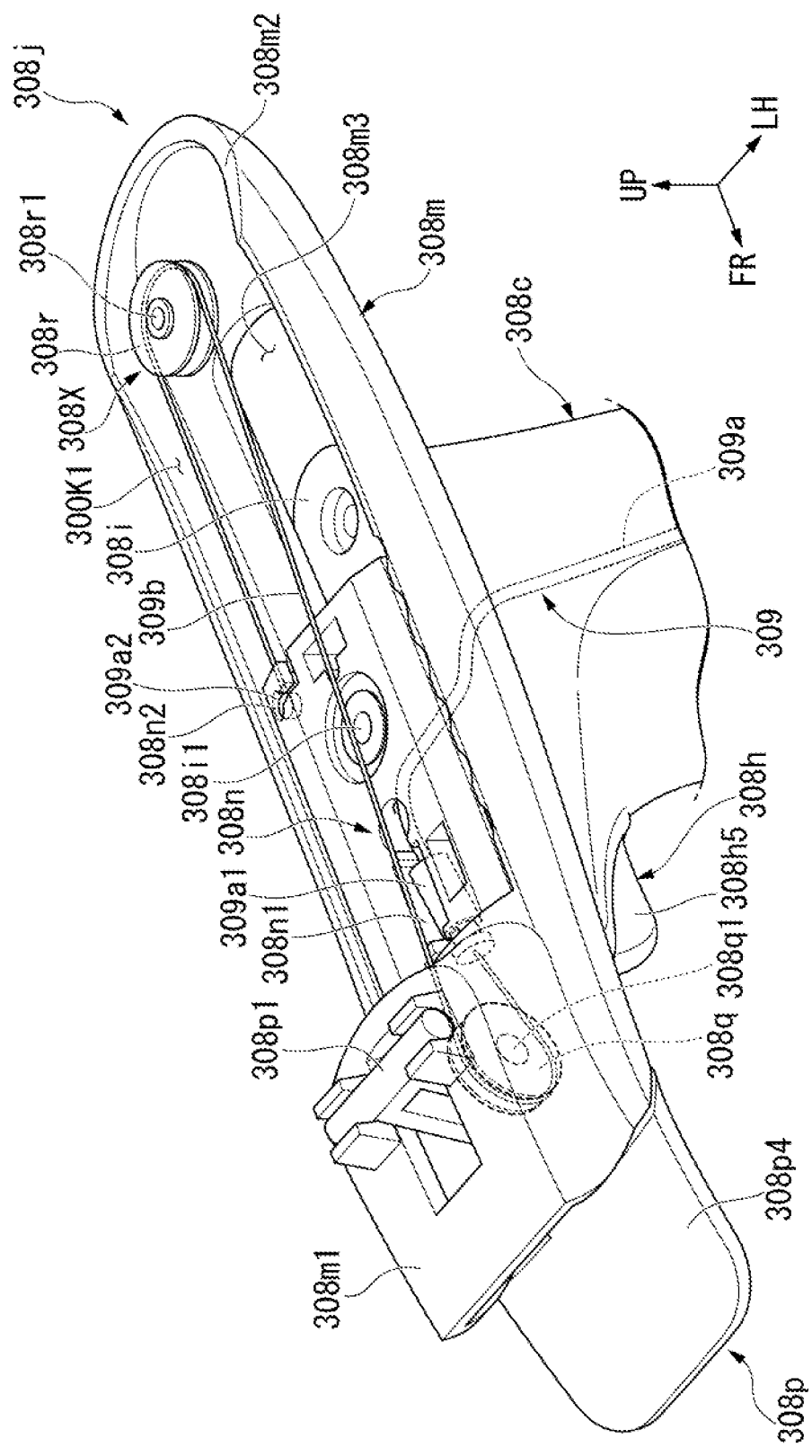
FIG. 25 is a perspective view showing a state in which the cover member of the lower layer member of the armrest is detached.
Figure 26A:
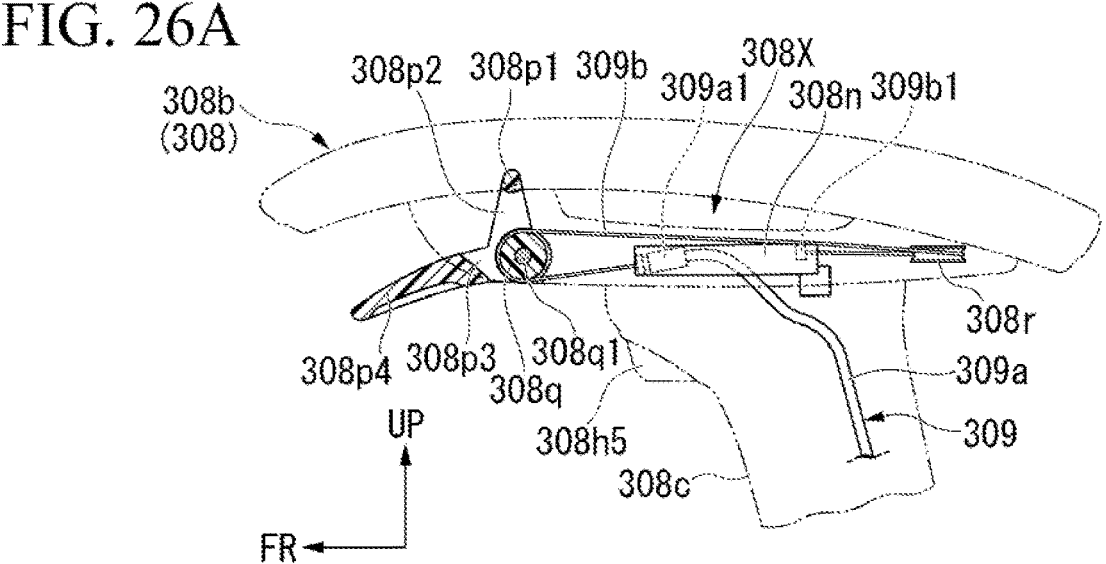
FIG. 26A is a side view of an intermediate position of the armrest in a forward-and-rearward direction which shows an action of an inner drawing length maintaining mechanism of the armrest.
Figure 26B:
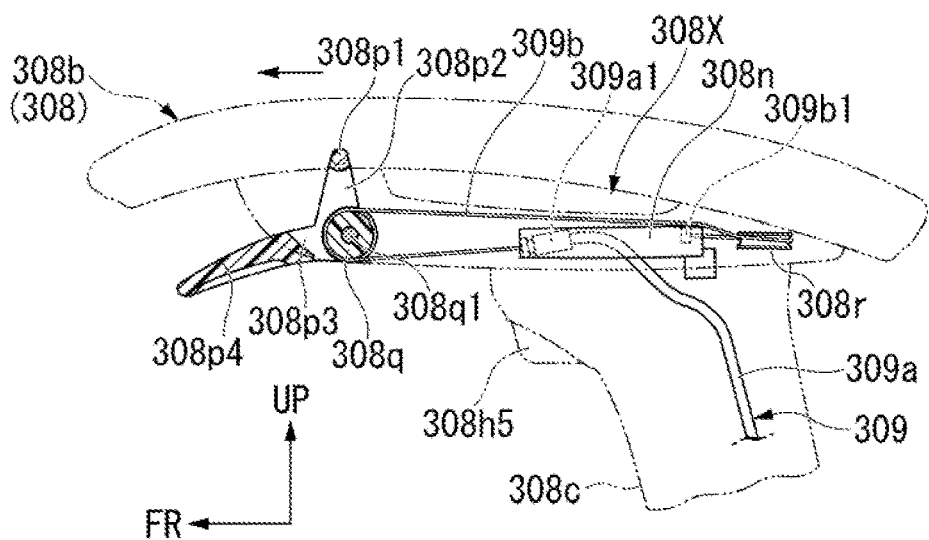
FIG. 26B is a side view of a forward movement position of the armrest which shows the action of the inner drawing length maintaining mechanism of the armrest.
Figure 26C:
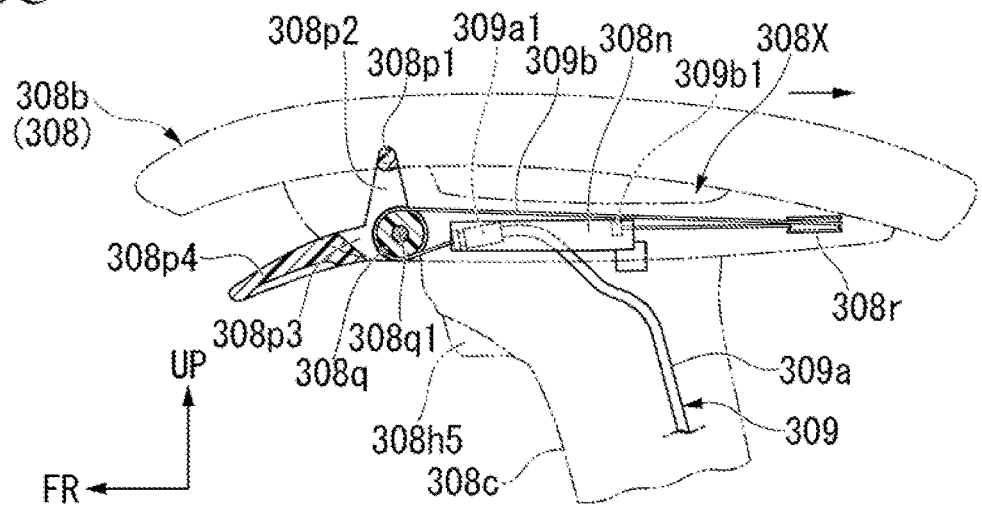
FIG. 26C is a side view of a rearward movement position of the armrest which shows the action of the inner drawing length maintaining mechanism of the armrest.
Figure 31:
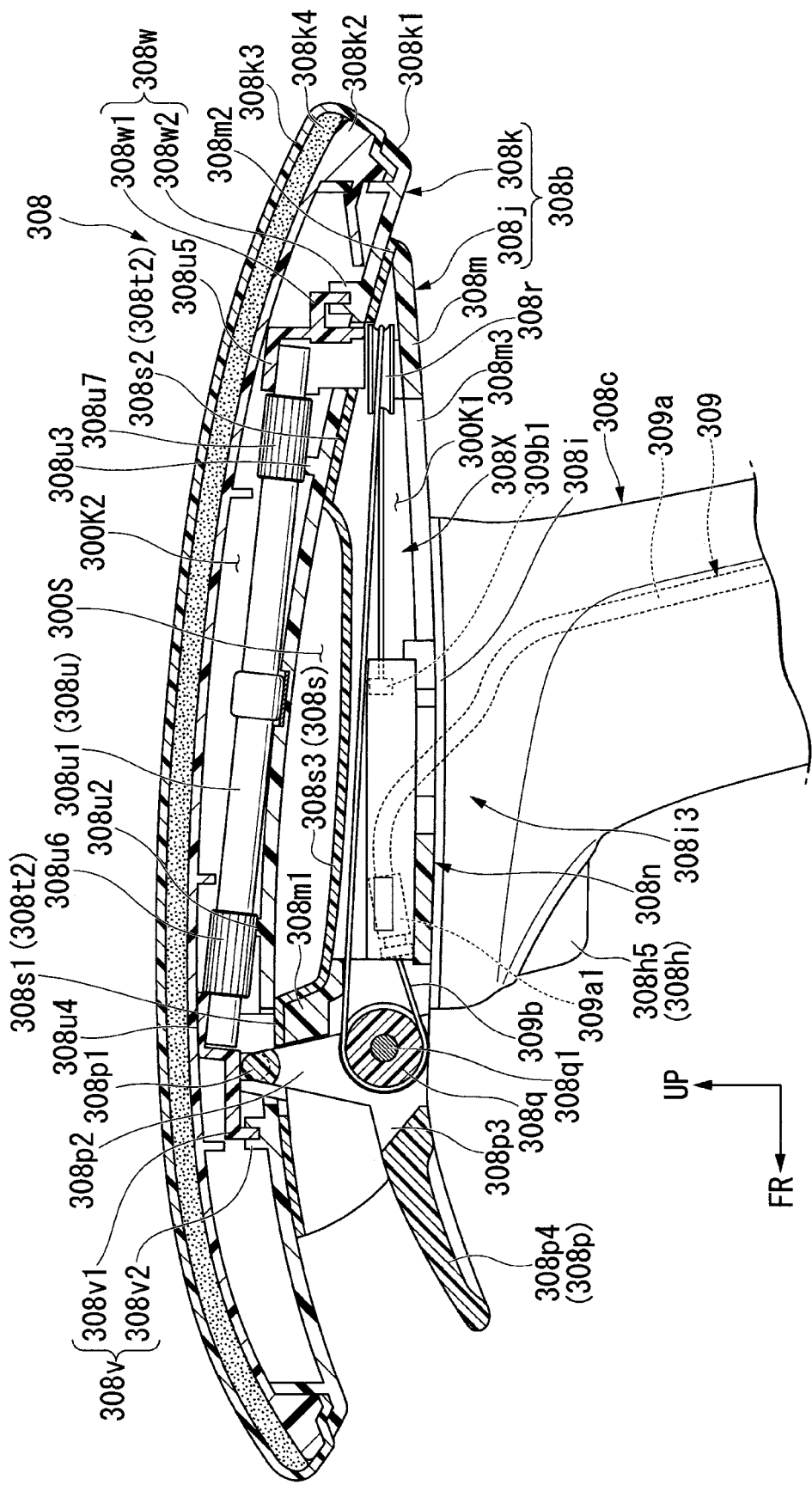
FIG. 31 is a cross section orthogonal to right-and-left direction in which the armrest is cut at an intermediate portion in the right-and-left direction.

As shown in FIGS. 22, 25 and 31, the cover member 308*s* includes a front stepped cover portion 308*s*1 formed stepwise to be matched with the front stepped portion 308*m*1, a rear inclined cover portion 308*s*2 which is inclined to be matched with the rear inclined portion 308*m*2 and extends forward of the rear inclined portion 308*m*2, and an intermediate wall portion 8*s*3 provided to be spaced apart from the upper layer member 308*k* between the front stepped cover portion 308*s*1 and the rear inclined cover portion 308*s*2. The front stepped cover portion 8*s*1 stands upward from a front end of the intermediate wall portion 308*s*3, and the rear inclined cover portion 308*s*2 stands upward from a rear end of the intermediate wall portion 8*s*3 to be relatively low and gentle.

A through-space 300S which passes through the armrest main body 308*b* in the right-and-left direction is formed between the intermediate wall portion 308*s*3 and the upper layer member 308*k*. A front support portion 308*t*1 formed by the front stepped portion 308*m*1 and the front stepped cover portion 308*s*1 to support the front portion of the upper layer member 308*k* is provided in front of the through-space 300S. A rear support portion 308*t*2 formed by the rear inclined portion 308*m*2 and the rear inclined cover portion 308*s*2 to support the rear portion of the upper layer member 308*k* is provided behind the through-space 300S.

Figure 32:
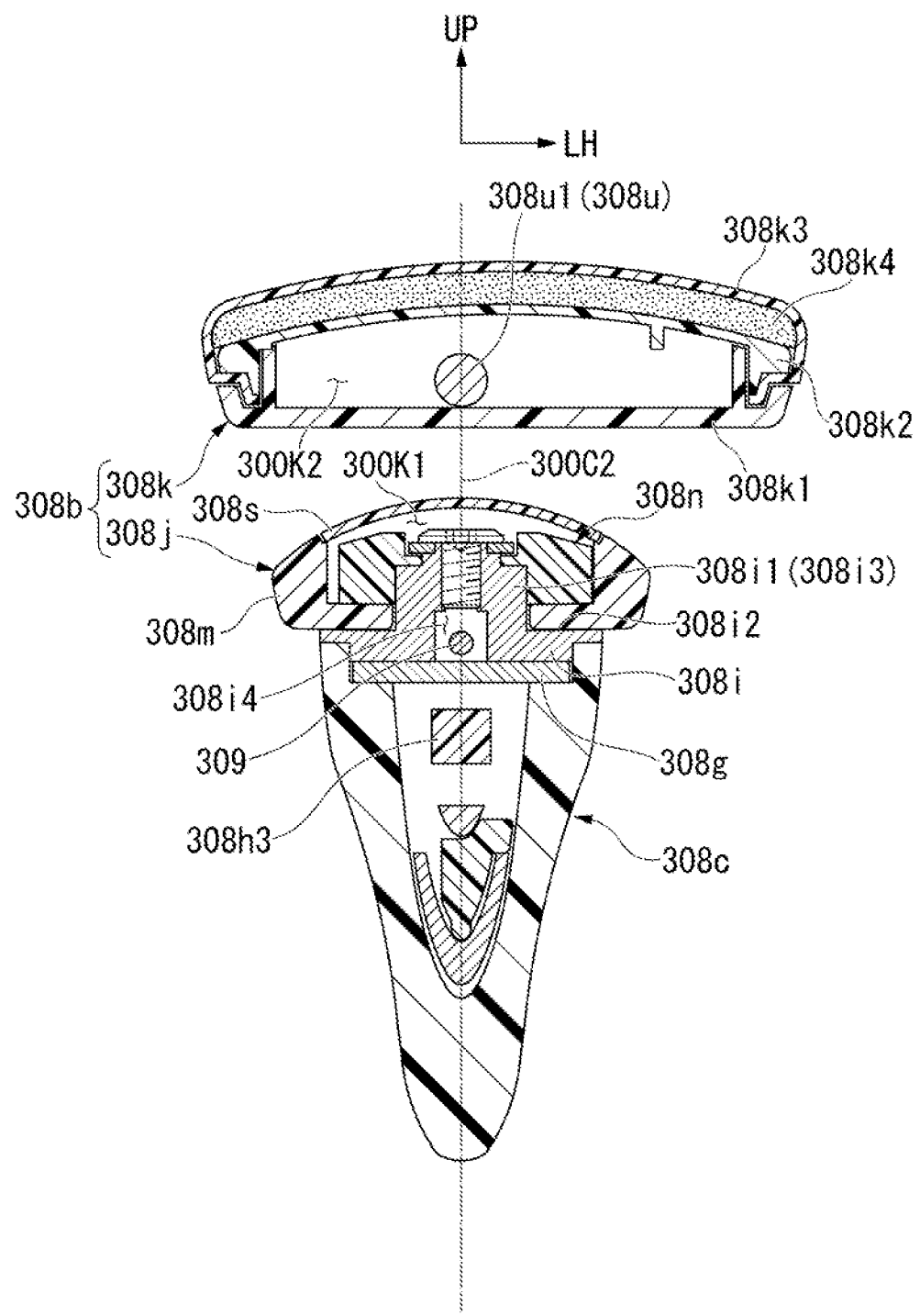
FIG. 32 is a cross-sectional view orthogonal to the forward-and-rearward direction in which the armrest is cut at a center of a pivot.

As shown in FIGS. 31 and 32, the upper layer member 308*k* includes a base member 308*k*1 fixed on the front and rear support portion 308*t*1 and 308*t*2 of the lower layer member 308*j*, a cover member 308*k*2 overlapped on the base member 308*k*1 with an accommodation space 300K2 therebetween, a pad member 308*k*3 which covers the cover member 308*k*2 from an upper side, and a cushion member 308*k*4 formed of urethane or the like which is interposed between the cover member 308*k*2 and the pad member 308*k*3. In a side view, the upper layer member 308*k* has a gentle curved shape protruding upward, the front portion thereof is inclined forward and downward, and the rear portion thereof is inclined rearward and downward.

A movement equalizing mechanism 308*u* for moving right and left the upper layer member 308*k* which is long in the forward-and-rearward direction in parallel is provided in the accommodation space 300K2 of the upper layer member 308*k*.

The movement equalizing mechanism 308*u* includes an interlocking shaft 308*u*1 which extends in the forward-and-rearward direction in the accommodation space 300K2 of the upper layer member 308*k*, a front rack gear 308*u*2 and a rear rack gear 308*u*3 fixedly provided on the base member 308*k*1 to extend in the right-and-left direction, a front bearing portion 308*u*4 disposed on a front side of the interlocking shaft 308*u*, and a rear bearing portion 308*u*5 disposed on a rear side of the interlocking shaft 308*u*1.

A front end of the interlocking shaft 308*u*1 is supported by the front bearing portion 308*u*4 to be rotatable in the upper layer member 308*k*. A rear end of the interlocking shaft 308*u*1 is supported by the rear bearing portion 308*u*5 to be rotatable in the upper layer member 308*k*. A front pinion gear 308*u*6 is formed at a front portion of the interlocking shaft 308*u*1. A rear pinion gear 308*u*7 is formed at a rear portion of the interlocking shaft 308*u*1. The front rack gear 308*u*2 is meshed with the front pinion gear 308*u*6. The rear rack gear 308*u*3 is meshed with the rear pinion gear 308*u*7. The front bearing portion 308*u*4 and the rear bearing portion 308*u*5 are fixed to the lower layer member 308*j* and moves relative to the upper layer member 308*k* when the upper layer member 308*k* moves right and left.

A guide protruding portion 308*v*1 of which a tip end is directed downward is provided at a front end of the front bearing portion 308*u*4. A guide groove portion 308*v*2 formed in the right-and-left direction (a movement direction of the upper layer member 308*k*) is provided in a front upper surface of the base member 308*k*1. The guide protruding portion 308*v*1 slidably engages with the guide groove portion 308*v*2. The guide protruding portion 308*v*1 and the guide groove portion 308*v*2 form a front guide portion 308*v* which guides the right and left movement of the front portion of the upper layer member 308*k*.

A guide protruding portion 308*w*1 of which a tip end is directed downward is provided at a rear end of the rear bearing portion 308*u*5. A guide groove portion 308*w*2 formed in the right-and-left direction (the movement direction of the upper layer member 308*k*) is provided in a rear upper surface of the base member 308*k*1. The guide protruding portion 308*w*1 slidably engages with the guide groove portion 308*w*2. The guide protruding portion 308*w*1 and the guide groove portion 308*w*2 form a rear guide portion 308*w* which guides the right and left movement of the rear portion of the upper layer member 308*k*.

In the above-described constitution, when a user grips the front end or the rear end of the upper layer member 308*k* and attempts to move the upper layer member 308*k* in the right-and-left direction, the rack gear at the end on a side (a drive side) among the front and rear ends of the upper layer member 308*k* which is gripped by the user moves right and left, and the interlocking shaft 308*u*1 is rotated via the pinion gear which meshes with the rack gear. Then, the end on an opposite side (a driven side) of the upper layer member 308*k* which is separated by the length of the interlocking shaft 308*u*1 moves right and left by the same amount as the end on the driving side due to the pinion gear and the rack gear located at the end on the opposite side.

When the upper layer member 308*k* which is long in the forward-and-rearward direction is moved in the right-and-left direction, a tilt in a plan view may be generated in the upper layer member 308*k* and may obstruct smooth right and left movement, or the armrest main body 308*b* may unintentionally rotate around the pivot 308*i*1 during an operation performed by grasping any one of the front and rear ends of the upper layer member 308*k*. Meanwhile, it is possible to assist the parallel movement of the upper layer member 308*k* in the right-and-left direction by equalizing the right and left movement of the front and rear ends of the upper layer member 308*k* due to the movement equalizing mechanism 308*u*.

As shown in FIGS. 25 and 34, a cable insertion portion 308*i*4 through which the operation cable 309 can be inserted is provided in the connecting portion 308*i*3 connecting the upward extending portion 308*a*3 to the armrest main body 308*b*. The cable insertion portion 308*i*4 has a first opening portion 308*i*5 which opens downward in the extension direction of the upward extending portion 308*a*3 (the direction of the axis 300C1, the first extension direction) below the upper end surface 308*i*2 of the upward extending portion 308*a*3, and a second opening portion 308*i*6 which opens forward in the extension direction of the armrest main body 308*b* (the direction of the axis line 300C3, the second extension direction) above the upper end surface 308*i*2

Figure 27:
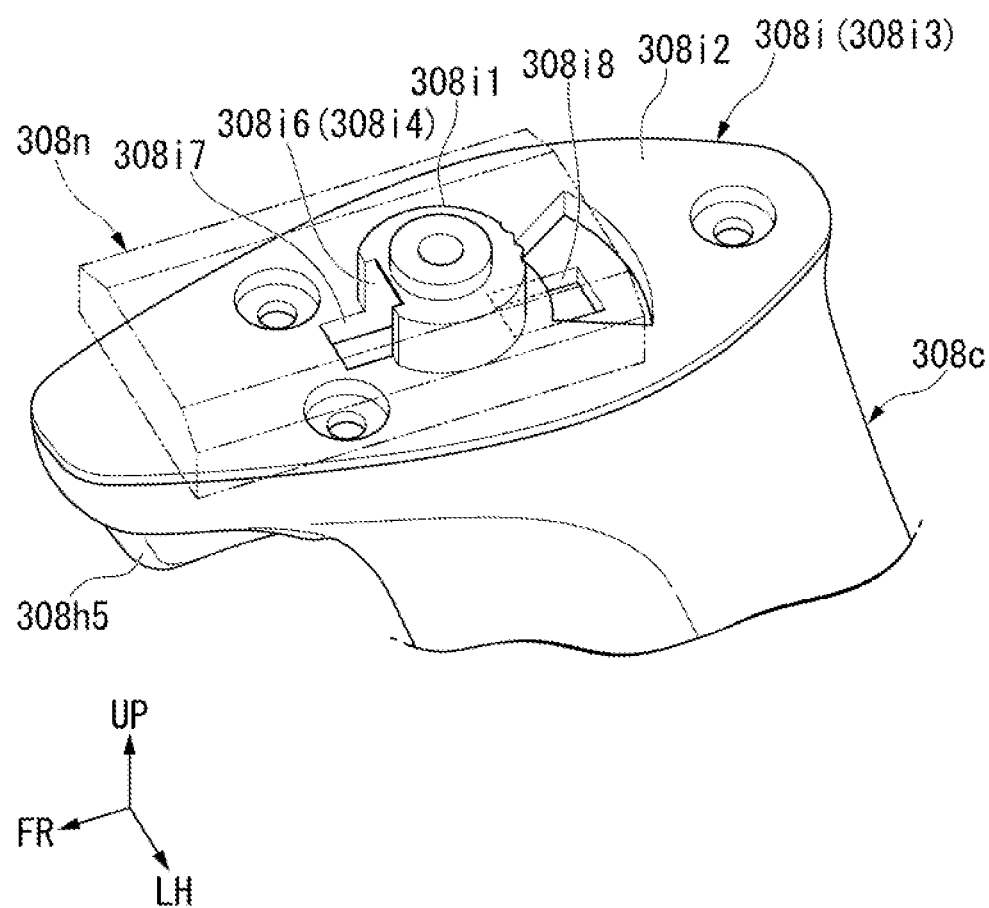
FIG. 27 is a perspective view of an upper end of a lifting cylinder of the armrest.

Also referring to FIGS. 27, 29 and 30, in the cable insertion portion 308*i*4, the first opening portion 308*i*5 is formed below the pivot 308*i*1, and the second opening portion 308*i*6 is formed in a front end of an outer circumferential surface of the pivot 308*i*1. An intermediate opening portion 308*i*7 having a rectangular shape in a plan view is formed in the lower surface of the end plate 308*i*. A lower stage opening portion 308*i*8 which is displaced rearward with respect to the intermediate opening portion 308*i*7 and has a rectangular shape in a plan view is formed in the top plate 308*g* overlapping a lower side of the end plate 308*i*. A rear portion of the intermediate opening portion 308*i*7 and a front portion of the lower stage opening portion 308*i*8 overlap each other in the vertical direction, and this overlapping portion forms the first opening portion 308*i*5 which communicates in the vertical direction.

The cable insertion portion 308*i*4 forms an inclined surface 308*i*9 inclined forward and upward from the first opening portion 308*i*5 (the intermediate opening portion 308*i*7) toward the second opening portion 308*i*6 in a side view. The cable insertion portion 308*i*4 is formed to obliquely pass through (cut out) the pivot 308*i*1 (the end plate 308*i*) along the inclined surface 308*i*9.

The inclined surface 308*i*9 is inclined to form an equivalent obtuse angle with respect to the direction of the axis 300C1 and the direction of the axis 300C3. Therefore, when the operation cable 309 is disposed across the upward extending portion 308*a*3 and the armrest main body 308*b* of which the extension directions intersect with each other, the operation cable 309 is gently bent and guided along the inclined surface 308*i*9.

Further, immediately in front of the second opening portion 308*i*6, a front guide surface 308*n*3 which is continuous to extend the inclined surface 308*i*9 and is curved so that a front portion thereof is substantially horizontal is formed on the rotary member 308*n*. Therefore, the bending when the operation cable 309 reaches the front of the cable insertion portion 308*i*4 is also gently guided.

The outer locking portion 308*n*1 of the rotary member 308*n* holds the locking end 309*a*1 of the outer cable 309*a* to be inclined forward and downward, such that the inner cable 309*b* is drawn toward a height of a lower end of the front pulley 308*q*. Therefore, the effect of bending the operation cable 309 downward in front of the second opening portion 308*i*6 is great.

When the operation cable 309 reaches below the cable insertion portion 308*i*4, the operation cable 309 comes into contact with the rearward extending portion 308*h*3 of the lifting operation lever 308*h* from an upper rear side, has a curved shape which is convex upward and rearward and then reaches rearward in the direction of the axis 300C3 of the armrest main body 308*b* more than the axis 300C1 of the upward extending portion 308*a*3. Thereafter, the operation cable 309 is curved downward and is disposed along the rear inner wall 308*d*2 of the inner pipe 308*d*.

As described above, the armrest 308 of the chair 300 in the third embodiment includes the support rod 308*a* installed on the chair main body, the armrest main body 308*b* supported by the support rod 308*a*, the operation lever 308*p* supported by the armrest main body 308*b* and subjected to an operation prescribed by the user, and the operation cable 309 which transmits the operation performed on the operation lever 308*p* to the support rod 308*a*. The armrest main body 308*b* includes the movable body (the base member 308*m* and the cover member 308*s*) which supports the operation lever 308*p* and is capable of moving in the first movement direction (the forward and backward movement direction) with respect to the support rod 308*a*, and the fixed body (the rotary member 308*n*) connected to the support rod 308*a* and incapable of moving in the first movement direction with respect to the support rod 308*a*. The operation cable 309 includes the outer cable 309*a* and the inner cable 309*b*, and the fixed body includes the outer locking portion 308*n*1 which locks the locking end 309*a*1 of the outer cable 309*a*, and the inner locking portion 308*n*2 which locks the locking end 309*b*1 of the inner cable 309*b* drawn out from the outer cable 309*a*. The operation lever 308*p* engages with the inner cable 309*b* on an arrangement path of the inner cable 309*b* drawn out from the outer cable 309*a*, and the movable body has the inner drawing length maintaining mechanism 308X which changes the arrangement path of the inner cable 309*b* when moving in the first movement direction and limits the change in the length of the inner cable 309*b* drawn out from the outer cable 309*a*.

According to such a constitution, since only the inner cable 309*b* is arranged in the armrest main body 308*b* while an operation of a functional portion separated from the armrest main body 308*b* is enabled by an operation of the operation lever 308*p* via the operation cable 309, an increase in the size of the armrest main body 308*b* can be limited, and an increase in sliding resistance of the inner cable 309*b* due to the bending of the outer cable 309*a* in the armrest main body 308*b* can be limited.

Additionally, when the movable body of the armrest main body 308*b* is moved in the first movement direction, the arrangement path of the inner cable 309*b* is changed by the inner drawing length maintaining mechanism 308X provided on the movable body (for example, moved like the movable body), and thus the change in the drawing length of the inner cable 309*b* drawn out from the outer cable 309*a* locked to the fixed body is limited. Therefore, the inner cable 309*b* is prevented from being pulled or loosened when the armrest main body 308*b* moves in the first movement direction, and the unintentional operation of the functional portion and an excessive margin of the operation lever 308*p* can be prevented.

Further, the inner drawing length maintaining mechanism 308X includes the first turning member (the front pulley 308*q*) which extends the inner cable 309*b* in the first movement direction and turns the inner cable 309*b* back to protrude toward one side in the first movement direction, and the second turning member (the rear pulley 308*r*) which extends the inner cable 309*b* in the first movement direction and turns the inner cable 309*b* back to protrude toward the other side in the first movement direction.

According to such a constitution, when the movable body of the armrest main body 308*b* is moved to one side in the first movement direction, the first turning member increases a turning length of the inner cable 309*b*, and the second turning member reduces the turned length of the inner cable 309*b* by the same amount as the increment due to the first turning member. Similarly, when the moving body of the armrest main body 308*b* is moved to the other side in the first movement direction, the first turning member reduces the turning length of the inner cable 309*b*, and the second turning member increases the turning length of the inner cable 309b by the same amount as the reduction due to the first turning member. That is, the increase or decrease in the turning length of the inner cable 309b is offset on both sides in the first movement direction, and the inner cable 309b can be prevented from being pulled or loosened when the armrest main body 308b moves in the first movement direction.

Further, at least one (the rear pulley 308r) of the first turning member and the second turning member is connected to the operation lever 308p to be capable of interlocking therewith.

Due to such a constitution, since the inner cable 309b and the operation lever 308p can engage with each other using the turning member of the inner cable 309b, it is possible to simplify the cable arrangement and to reduce the number of parts, as compared with a case in which means for engaging the inner cable 309b and the operation lever 308p is additionally provided.

Further, at least one (the front and rear pulleys 308q and 308r) of the first turning member and the second turning member is configured with a pulley around which the inner cable 309b is wound.

Due to such a constitution, it is possible to reduce the resistance when the inner cable 309b is turned back and activated and to smoothly move the arrangement path of the inner cable 309b.

Further, the first movement direction is the forward-and-rearward direction of the chair 300, and at least the rear turning member (the rear pulley 308r) located on the rear side among the first turning member and the second turning member turns the inner cable 309b to be lined right and left.

Due to such a constitution, in at least the rear turning member, a height dimension of the turning member and a height dimension of the armrest main boxy 308b are limited as compared with a case in which the inner cable 309b is turned to be lined up and down, and it is possible to limit the increase in size of the armrest main body 308b. In particular, in the case in which a rearward and downward armrest surface is formed, this armrest surface can be easily formed.

The present invention is not limited to the above-described embodiment, and for example, the constitution of the third embodiment is not limited to the armrest of the chair, and for example, it may be applied to other furniture components, such as various movable components, which include a first structure installed in a furniture main body, a second structure supported by the first structure, an operation member supported by the second structure and subjected to an operation prescribed by a user, and an operation cable which transmits an operation performed on the operation member to the first structure. The inner drawing length maintaining means is not limited to the constitution in which the arrangement path of the inner cable is moved in the same manner as the movable body in accordance with the movement of the movable body like the third embodiment, and a shape of the arrangement path of the inner cable may be changed in accordance with the movement of the movable body. Instead of the pulley, a guide member for simply winding the inner cable may be used.

Additionally, it is applicable to an object other than a chair, and various modifications are possible without departing from the gist of the present invention.

INDUSTRIAL APPLICABILITY

According to the present invention, it is possible to change or not to change the relative positional relationship between the upper layer member and the operation portion according to the desire of the seated person, and the movement of the upper layer member which facilitates the operation of the operation portion such as the operation lever and so on as well as the movement of the upper layer member which facilitates the visual recognition of the operation portion in the seated state can be arbitrarily performed, and the usability of the chair and the armrest can be improved.

Also, according to the present invention, the cable insertion portion which passes through the lower side of the pivot portion of the support structure opens into the armrest main body in the vicinity of the pivot portion, and the rotation restricting element on the armrest main body and the rotation restricting element on the support structure are disposed at positions opposite to the opening of the cable insertion portion in the vicinity of the pivot portion, in which the axis of the pivot portion is disposed between the opening and the positions. Therefore, according to the present invention, it is possible to draw out the operation cable from the vicinity of the pivot portion into the armrest main body without trouble while having the structure having the rotation restricting mechanism.

Further, according to the present invention, in the armrest (furniture component) of the chair in which the armrest main body (the second structure) is movably supported by the support structure (the first structure) and a predetermined functional portion is linked to the operation member supported by the armrest main body via the operation cable, it is possible to limit an increase in sliding resistance of the operation cable while limiting an increase in size of the armrest and to limit a change in operability of the operation member due to movement of the armrest main body.

DESCRIPTION OF REFERENCE SIGNS 100, 200, 300 Chair (furniture)
8, 208, 308 Armrest (furniture component)
8a, 215, 308a Support rod (support member, armrest support, support structure)
8b, 216, 308b Armrest main body
8j Lower layer member
8k Upper layer member
8p, 235, 308p Operation lever (operation portion, operation member)
229 End plate (upper wall portion)
230 Swollen portion (pivot portion, rotation mechanism)
231 Small diameter portion (pivot portion, rotation mechanism)
232 Base member
233 Clamping block
233a Bearing portion (rotation mechanism)
234, 309 Operation cable
238 Insertion hole
257 Cable insertion portion
257a Opening
258s Side wall (rotation restricting element on support structure of rotation restricting mechanism)
259 Displacement restricting protrusion (rotation restricting element on armrest main body of rotation restricting mechanism)
308m Base member (movable body)
308n Rotary member (fixed body)
308s Cover member (movable body)
308q Front pulley (first turning member, pulley)
308r Rear pulley (second turning member, pulley)
308X Inner drawing length maintaining mechanism (inner drawing length maintaining means)
309a Outer cable
309b Inner cable

The invention claimed is:

1. An armrest for being provided in a chair, the armrest comprising:
   a support member which is a support structure; and
   an armrest main body, wherein
   the armrest main body includes:
   a lower layer member supported by the support member to be movable in a first horizontal direction and including an operation portion to be operated by a seated person, and
   an upper layer member supported by the lower layer member to be movable in a second horizontal direction different from the first horizontal direction,
   wherein the upper layer member covers the operation portion at a base position thereof in the second horizontal direction, and
   wherein the upper layer member is disposed such that at least a part of the operation portion is exposed upward by moving the upper layer member in the second horizontal direction from the base position.

2. The armrest according to claim 1, wherein
   the lower layer member is supported by the support member to be movable in a forward-and-rearward direction of the chair which is the first horizontal direction, and
   the upper layer member is supported by the lower layer member to be movable in a width direction of the chair which is the second horizontal direction.

3. The armrest according to claim 1, wherein
   the operation portion is provided at a front end of the lower layer member in a forward-and-rearward direction of the chair.

4. A chair comprising the armrest according to claim 1.

* * * * *